(12) United States Patent
Futaki et al.

(10) Patent No.: US 11,765,636 B2
(45) Date of Patent: Sep. 19, 2023

(54) RADIO ACCESS NETWORK NODE, RADIO TERMINAL, CORE NETWORK NODE, AND METHOD THEREFOR

(71) Applicant: NEC CORPORATION, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/385,428

(22) Filed: Jul. 26, 2021

(65) Prior Publication Data

US 2021/0352549 A1 Nov. 11, 2021

Related U.S. Application Data

(63) Continuation of application No. 16/321,998, filed as application No. PCT/JP2017/018227 on May 15, 2017.

(30) Foreign Application Priority Data

Aug. 10, 2016 (JP) ................................. 2016-158282

(51) Int. Cl.
*H04W 36/08* (2009.01)
*H04W 36/14* (2009.01)
(Continued)

(52) U.S. Cl.
CPC ....... *H04W 36/14* (2013.01); *H04W 36/0033* (2013.01); *H04W 36/0038* (2013.01); *H04W 92/20* (2013.01)

(58) Field of Classification Search
None
See application file for complete search history.

(56) References Cited

U.S. PATENT DOCUMENTS 8,553,643 B2 10/2013 Flore et al.
10,028,128 B2 7/2018 Salkintzis
(Continued)

FOREIGN PATENT DOCUMENTS

CN 101052208 A 10/2007
CN 101841824 A 9/2010
(Continued)

OTHER PUBLICATIONS

U.S. Office Action and PTO-892 for U.S. Appl. No. 16/321,998 dated Mar. 15, 2022.
(Continued)

*Primary Examiner* — Duc T Duong
(74) *Attorney, Agent, or Firm* — Sughrue Mion, PLLC

(57) ABSTRACT

In response to receiving from a source RAN node (2), on a direct interface (101), a message requesting a handover of a radio terminal (1) from a first network to a second network, a target RAN node (3) receives at least one of slice information and flow information from a core network (5), and controls communication of the radio terminal (1) based on at least one of the slice information and the flow information. The slice information relates to a network slice in the second network. The flow information relates to at least one session to be established in the second network, serving as a bearer-less network, in order to transfer at least one packet flow of the radio terminal (1). It is thus possible, for example, to provide an Inter-RAT handover procedure involving transfer of handover signaling messages on a direct inter-base-station interface.

16 Claims, 37 Drawing Sheets

(51) Int. Cl.
*H04W 36/24* (2009.01)
*H04W 36/38* (2009.01)
*H04W 92/02* (2009.01)
*H04W 36/00* (2009.01)
*H04W 92/20* (2009.01)

(56) References Cited

U.S. PATENT DOCUMENTS

| | | | |
|---|---|---|---|
| 10,644,955 | B2 | 5/2020 | Zhang et al. |
| 2007/0281697 | A1 | 12/2007 | Davis |
| 2008/0049677 | A1 | 2/2008 | Hayashi |
| 2009/0016259 | A1 | 1/2009 | Zhang et al. |
| 2013/0010611 | A1 | 1/2013 | Wiemann et al. |
| 2013/0128866 | A1 | 5/2013 | Zhang et al. |
| 2014/0051443 | A1 | 2/2014 | Diachina et al. |
| 2015/0139195 | A1* | 5/2015 | Xiao ............... H04W 36/0085 370/332 |
| 2015/0215822 | A1 | 7/2015 | Won et al. |
| 2015/0229491 | A1 | 8/2015 | Solovyev et al. |
| 2015/0282021 | A1 | 10/2015 | Pao et al. |
| 2016/0057783 | A1 | 2/2016 | Rosa et al. |
| 2016/0205578 | A1 | 7/2016 | Lee et al. |
| 2016/0353465 | A1 | 12/2016 | Vrzic et al. |
| 2017/0034749 | A1 | 2/2017 | Chandramouli |
| 2017/0079059 | A1 | 3/2017 | Li et al. |
| 2017/0086118 | A1 | 3/2017 | Vrzic |
| 2017/0164349 | A1 | 6/2017 | Zhu et al. |
| 2017/0195935 | A1* | 7/2017 | Xu ........................ H04W 36/18 |
| 2017/0289019 | A1 | 10/2017 | Faccin et al. |
| 2017/0289046 | A1 | 10/2017 | Faccin et al. |
| 2017/0332295 | A1 | 11/2017 | Sunay |
| 2017/0359768 | A1* | 12/2017 | Byun ................ H04W 72/0406 |
| 2017/0367110 | A1 | 12/2017 | Li et al. |
| 2018/0014224 | A1 | 1/2018 | Cheng et al. |
| 2018/0035339 | A1* | 2/2018 | Mitsui .................. H04W 36/08 |
| 2018/0124660 | A1 | 5/2018 | Zhang et al. |
| 2018/0242304 | A1 | 8/2018 | Rong et al. |
| 2019/0007899 | A1* | 1/2019 | Vrzic ...................... H04W 8/02 |
| 2019/0021043 | A1 | 1/2019 | Youn et al. |
| 2019/0029000 | A1* | 1/2019 | Vikberg ................ H04W 68/00 |
| 2019/0098544 | A1 | 3/2019 | Han et al. |
| 2019/0150219 | A1 | 5/2019 | Wang et al. |
| 2019/0158360 | A1 | 5/2019 | Xu et al. |
| 2019/0159027 | A1 | 5/2019 | Kuge et al. |
| 2019/0174368 | A1* | 6/2019 | Decarreau ............. H04W 76/12 |
| 2019/0174377 | A1 | 6/2019 | Decarreau et al. |
| 2019/0182733 | A1 | 6/2019 | Shimojou et al. |
| 2019/0182737 | A1 | 6/2019 | Futaki et al. |
| 2019/0387393 | A1* | 12/2019 | Xu ........................ H04W 48/10 |
| 2020/0305054 | A1 | 9/2020 | Zee et al. |

FOREIGN PATENT DOCUMENTS

| | | |
|---|---|---|
| CN | 102104927 A | 6/2011 |
| CN | 102215537 A | 10/2011 |
| CN | 102223669 A | 10/2011 |
| CN | 103548387 A | 1/2014 |
| CN | 104221405 A | 12/2014 |
| CN | 105376811 A | 3/2016 |
| CN | 105432135 A | 3/2016 |
| CN | 105637905 A | 6/2016 |
| CN | 109526252 A | 3/2019 |
| CN | 109565732 A | 4/2019 |
| EP | 2870795 A | 5/2015 |
| JP | 2007-214704 A | 8/2007 |
| JP | 2010-28816 A | 2/2010 |
| JP | 201028816 A | 2/2010 |
| JP | 2011-151828 A | 8/2011 |
| JP | 2012-186865 A | 9/2012 |
| JP | 2012186865 A | 9/2012 |
| JP | 2015-527846 A | 9/2015 |
| JP | 2015-192453 A1 | 11/2015 |
| JP | 2020-039182 A | 3/2020 |
| WO | 2013/033883 A1 | 3/2013 |
| WO | 2014/005653 A1 | 1/2014 |
| WO | 2014/161161 A1 | 10/2014 |
| WO | 2014161161 A1 | 10/2014 |
| WO | 2015/115761 A1 | 8/2015 |
| WO | 2015/119547 A1 | 8/2015 |
| WO | 2015119547 A1 | 8/2015 |
| WO | 2015/160329 A1 | 10/2015 |
| WO | 2015/162088 A1 | 10/2015 |
| WO | 2015162088 A1 | 10/2015 |
| WO | 2015/169387 A1 | 11/2015 |
| WO | 2015169387 A1 | 11/2015 |

OTHER PUBLICATIONS

Chinese Office Communication for CN Application No. 201780048078.2 dated Aug. 2, 2021 with English Translation.

Yang Xiao-Long et al., Spectrum handoff model based on preemptive queuing theory in cognitive radio networks, Acta Phys. Sin. vol. 64, No. 10, Apr. 19, 2015.

Zhao Su et al., A Handover Algorithm Based on Prediction of Adjustable Threshold Hysteresis Margin in Ultra Dense Network, Journal of Electronics & Information Technology, vol. 38, No. 3, Mar. 15, 2016.

U.S. Office Action for U.S. Appl. No. 16/321,877 dated Aug. 9, 2021.

U.S. Office Action and PTO-892 for U.S. Appl. No. 16/321,864 dated Nov. 29, 2021.

Samsung, "Assignment of CP and UP network functions during an MM procedure", 3GPP SA WG2 Meeting #116, S2-164041, Jul. 15, 2016, Austria, p. 1-7.

International Search Report for PCT Application No. PCT/JP2017/018323, dated Jun. 20, 2017.

Japanese Office Action for JP Application No. 2021-025225 dated Feb. 22, 2022 with English Translation.

Ericsson, Update of QoS Interim agreements, 3GPP TSG-SA WG2#116, S2-163337, Jul. 5, 2016.

U.S. Office Action for U.S. Appl. No. 16/321,998, dated Sep. 29, 2022.

"3rd Generation Partnership Project; Technical Specification Group Radio Access Network; Evolved Universal Terrestrial Radio Access Network (E-UTRAN); X2 application protocol (X2AP) (Release 13)", 3GPP TS 36.423 V13.4.0 (Jun. 2016), Jun. 2016, 238 pages total.

Huawei, "NR RAN functions", 3GPP TSG-RAN3 Meeting #92, R3-161129, May 2016, 4 pages total.

ETRI, "Update the solution 6.2.1.1: Relation between PDU Flow and Service Data Flow", SA WG2 Meeting #116, S2-163520, Jul. 2016, 4 pages total.

"3rd Generation Partnership Project; Technical Specification Group Services and System Aspects; Study on Architecture for Next Generation System (Release 14)", 3GPP TR 23.799 V0.6.0, Jul. 2016, 320 pgs.

Samsung, "Assignment of CP and UP network functions during an MM procedure" SA WG2 Meeting #116, S2-163297, Jul. 11-15, 2016, 6 pgs., Vienna, Austria.

CATT, "Control plane for support of NR standalone operation", 3GPP TSG RAN WG2 Meeting #94, R2-163468, May 23-27, 2016, 5 pgs., Nanjing, China.

China Mobile et al., "Network Slicing Architecture and High-Level Function Definition," SA WG2 Meeting #115, S2-162365, May 23-27, 2016, 5 pgs., Nanjing, China.

ETRI, "High-level Functional Architecture for the Network Slicing", SA WG2 Meeting #114, S2-161833, Apr. 11-15, 2016, 4 pgs. Sophia Antipolis, France.

International Search Report for PCT/JP2017/018227 dated, Jul. 4, 2017 (PCT/ISA/210).

Communication dated Jul. 17, 2019, from the European Patent Office in counterpart European Application No. 17839006.8.

Huawei, "Requirements and functionalities of the interface between LTE and NR", 3GPP TSG-RAN3 Meeting #92, R3-161138, Nanjing, China, May 23-27, 2016 (5 pages total).

Huawei, "Inter-RAT handover", 3GPP TSG-RAN3 Meeting #92, R3-161140, Nanjing, China, May, 23-27, 2016 (4 pages total).

(56) References Cited

OTHER PUBLICATIONS

Samsung, "RAN-CN interface aspects", 3GPP TSG-RAN WG3 Meeting #92, R3-161061, Nanjing, P.R. China, May 23-27, 2016 (4 pages total).
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13.4.0, Jun. 2016 (314 pages total).
3rd Generation Partnership Project; Technical Specification Group Radio Access Network; Study on New Radio Access Technology; Radio Access Architecture and Interfaces (Release 14), 3GPP TR 38.801 V0.2.0, Jun. 2016 (20 pages total).
Nokia, Alcatel-Lucent Shanghai Bell, Interface consideration for tight LTE/NR interworking anchored to NextGen Core, 3GPP TSG-RAN WG2 Meeting #93bis, R2-162421, Dubrovnik, Croatia, Apr. 11-15, 2016 (2 pages total).
3rd Generation Partnership Project; Technical Specification Group Services and Systems Aspects; 3GPP System Architecture Evolution (SAE); Security architecture (Release 13), 3GPP TS 33.401 V13.3.0, Jun. 2016 (148 pages total).
Huawei, "Slice impact on mobility", 3GPP TSG-RAN WG3 95bis, R3-171789, Hangzhou, China, May 15-19, 2017 (3 pages total).
Ericsson, "Lossless Inter-RAT handover with 5GC", 3GPP TSG-RAN WG2 #97, Tdoc R2-1700877, Athens, Greece, Feb. 13-17, 2017, pp. 1-4 (4 pages total).
Nokia et al., "Update to Solution 2.3: Content Aware QoS Framework", 3GPP, SA WG2 Meeting #115, S2-162706, May 23-27, 2016, pp. 1-7.
Huawei et al., "Update of Solution #1 for Key issue #1", 3GPP SA WG2 Meeting #114, S2-161503, Apr. 11-15, 2016, total 5 pages.
Communication dated Sep. 24, 2019 from Japanese Patent Office in counterpart JP Application No. 2018-533427.
Communication dated Aug. 20, 2020, from the State Intellectual Property Office in application No. 201780048078.2.
"Update of Network Slicing Solution 1.3", NTT DOCOMO, SA WG2 Meeting #116, S2-163446, Jul. 11-15, 2016, (8 pages total).
Communication dated Sep. 23, 2020, from the Japanese Patent Office in application No. 2019224261.
3GPP TS 23.401 VI 4.0.0 (Jun. 2016), Technical Specification Group Services and System Aspects; General Packet Radio Service (GPRS) enhancements for Evolved Universal Terrestrial Radio Access Network (E-UTRAN) access (Release 14), pp. 1-374.
3GPP TS 48.018 V13.2.0 (Aug. 2016), Technical Specification Group GSM/EDGE Radio Access Network; General Packet Radio Service (GPRS); Base Station System (BSS)—Serving GPRS Support Node (SGSN); 3SS GPRS Protocol (BSSGP) (Release 13), pp. 1-205.
3GPP TS36.413 V 13.3.0 (Jun. 2016), Technical Specification Group Radio Access Network; Evolved Universal Terrestrial Radio Access Network (E-UTRAN); S1 Application Protocol (S1AP) (Release 13), pp. 1-331.
3GPP TR23.799 VO./.O (Mar. 2016), Technical Specification Group Services and System Aspects; Study on Architecture for Next Generation System (Release 14), pp. 1-322.
3GPP TS25.413 V13.2.0 (Jun. 2016), Technical Specification Group Radio Access Network: UTRAN lu interface Radio Access Network Application Part (RANAP) signaling (Release 13), pp. 1-451.
3GPP TS43.12S V13.0.0 (Dec. 2015), Technical Specification Group GSM/EDGE Radio Access Net-work; Packet switched handover for GERAN A/Gb mode; Stage 2 (Release 13), pp. 1-95.
CATT, "inter-RAT mobility in NR", R2-163472, RAN WG2 Meeting #94, China, May 23-27, 2015, pp. 1-4.

Intel, "Solution for interworking and migration", SA WG2 Meeting #116, S2-164247, Jul. 11-15, 2016, pp. 1-3.
Huawei et al: "Considerations on 5G KAN Qos framework", 3GPP TSG-RAN2 Meeting #94, R2-164257, May 22, 2018, China.
3GPP TS 38.300 V0.2.1, Technical Specification Group Radio Access Network; NR; NR and NG-RAN Overall Description; Stage 2 (Release 15), May 10, 2017, pp. 1-48.
3GPP TS 29.280 V 14.0.0. Technical Specification Group Core Network and Terminals; Evolved Packet System (EPS); 3GPP Sv Interface (MME to MSC, and SGSN to MSC) for SRVCC (Release 14), Mar. 22, 2017, pp. 1-23.
3GPP TR 38.801 V0.2.0 (Jun. 2016), Technical Specification Group Radio Access Network; Study on New Radio Access Technology; Radio Access Architecture and Interfaces (Release 14), pp. 1-20.
ETRI et al., "NextGen Core Architecture solution for Network Slice Instance Selection", 3GPP SA WG2 Meeting #115, S2-162551, May 23-27, 2016. China, pp. 1-5.
ZTE, "Consideration on RAN Side Network Slicing", 3GPP TSG RAN WG3 Meeting #91 bis, R3-180821,Apr. 11-15, 2016. India.
NEC, "RAN architecture impact due to Network Slicing", 3GPP TSG RAN2 #93bis, R2-162891, Apr. 11-15, 2016, Croatia.
Nokia, "Solution: Mobility Options", Apr. 11-15, 2016, SA WG2 Meeting # S2-114, S2-161625, France, pp. 1-5.
NTT DOCOMO, "Solution to support a UE with simultaneous connections to multiple Network Slices", 3GPP Draft, SA WG2 Meeting #113AH, S2-161043, Feb. 18, 2016, France, pp. 1-4.
Samsung, "Inter-RAT handover with LTE". 3GPP TSG-RAN WG3#92, R3-161486, May 27, 2016, China.
NTT DOCOMO, "Update of Network Slicing Solution 1.3", 3GPP TSG-SA WG2#116, S2-163446, Jul. 5, 2016, pp. 1-8.
Nokia, Alcatel Lucent Shanghai Bell, "Update to Solution 2.3: Content Aware QoS Framework", 3GPP TSG SA WG2#115, S2-162706, May 2016, China, pp. 1-7.
Huawei, HiSilicon, "Update of Solution #1 for Key issue #1", 3GPP TSG SA WG2#114, S2-161503. Apr. 2018, France.
ZTE, "Network Slice Selection Procedure", 3GPP Draft, TSG RAN WG3 Meeting #92, R3-161107, May 22, 2016 China.
Huawei, HiSilicon, "Network slicing considerations", 3GPP TSG-RAN WG2 Meeting #93bis R2-162664, Apr. 1, 2016, Croatia.
3GPP TR 23.79S V0.4.0, Technical Specification Group Services and System Aspects; Study on Architecture For Next Generation System (Release 14), pp. 1-96.
Extended European Search Report for EP Application No. 20205291.6 dated Feb. 18, 2021.
Chinese Office Action for CN Application No. 201780048078.2 dated Feb. 10. 2021 with English Translation.
Communication dated Apr. 4, 2023 issued by the Japanese Intellectual Property Office in counterpart Japanese Application No. 2022-092163.
JP Office Action for JP Application No. 2022-130339, dated Jun. 27, 2023 with English Translation.
JP Office Communication for JP Application No. 2022-167447, dated Jul. 4, 2023 with English Translation.
Qualcomm Incorporated, NR Mobility, 3GPP TSG-RAN WG3#92, R3-161343, May 27, 2016.
Huawei, Clean up of remaining FFS on Security, 3GPP TSG RAN WG3 #100, R3-183388, May 28, 2018.
Nokia (rapporteur), TS 38.413—latest agreed version (V0.1.0), 3GPP TSG RAN WG3 adhoc_R3_AH_NR_1706, R3-172260, Jun. 20, 2017.
US Notice of Allowance for U.S. Appl. No. 16/321,998, dated Jul. 26, 2023.

\* cited by examiner

```
-- ASN1START

MobilityFromEUTRACommand ::=        SEQUENCE {
    rrc-TransactionIdentifier       RRC-TransactionIdentifier,
    criticalExtensions              CHOICE {
        c1                              CHOICE {
            mobilityFromEUTRACommand-r8     MobilityFromEUTRACommand-r8-IEs,
            mobilityFromEUTRACommand-r9     MobilityFromEUTRACommand-r9-IEs,
            spare2 NULL, spare1 NULL
        },
        criticalExtensionsFuture        SEQUENCE {}
    }
}

MobilityFromEUTRACommand-r8-IEs ::= SEQUENCE {
    cs-FallbackIndicator            BOOLEAN,
    purpose                         CHOICE{
        handover                        Handover,
        cellChangeOrder                 CellChangeOrder
    },
    nonCriticalExtension            MobilityFromEUTRACommand-v8a0-IEs    OPTIONAL
}
```

Fig. 23A

```
Handover ::=              SEQUENCE {
    targetRAT-Type            ENUMERATED {
                                  utra, geran, cdma2000-1XRTT, cdma2000-HRPD,
                                  ngutra, spare3, spare2, spare1, ...},
    targetRAT-MessageContainer    OCTET STRING,
    nas-SecurityParamFromEUTRA    OCTET STRING (SIZE (1))  OPTIONAL,  -- Cond OTHERRAN
    systemInformation             SI-OrPSI-GERAN                      OPTIONAL  -- Cond PSHO
}

-- ASN1STOP
```

Fig. 23B

HANDOVER REQUEST message

| IE/Groupe Name | Presence | Range | Semantics description/ Note |
|---|---|---|---|
| Message Type | M | | |
| Old eNB UE X3AP ID | M | | Allocated at the source eNB |
| Cause | M | | |
| Target Cell ID | M | | |
| GUCNFI | M | 1 | Globally Unique CNF ID |
| UE Context Information | | | |
| .... | | | |

Fig. 24

UE Context Information

| IE/Groupe Name | Presence | Range | Semantics description/ Note |
|---|---|---|---|
| UE Context Information | | | |
| >CCNF UE NG2AP ID | M | 1 | Allocated at the CCNF |
| >UE Security Capabilities | M | | |
| >AS Security Information | M | | |
| >..... | | | |
| >NE-RABs To Be Setup List | | 1 | |
| >>NE-RABs To Be Setup Item | | 1..<maxnoof Bearers> | |
| >>>NE-RAB ID | M | | |
| >>>NE-RAB Level QoS Parameters | M | | Includes necessary QoS parameters |
| >>>DL Forwarding | O | | |
| >>>UL Tunnel Endpoint | M | | UPF (e.g., Edge GW) endpoint of the NG2 transport bearer. For delivery of UL PDUs. (Either GTP or GRE tunnel) |
| >>>Bearer Type | O | | |
| >>>Assistance Data for Network Slicing | O | | Includes Network Slice Assistance Information (e.g., received from UE or NG Core) |
| >RRC Context | M | | Includes the RRC handover Preparation Information message as defined in RRC. |
| >Handover Restriction List | O | | |
| >Location Reporting Information | O | | Includes the necessary parameters for location reporting |
| >..... | | | |

Fig. 25

HANDOVER REQUEST ACKNOWLEDGE message

| IE/Groupe Name | Presence | Range | Semantics description/ Note |
|---|---|---|---|
| Message Type | M | | |
| Old eNB UE X3AP ID | M | | Allocated at the source eNB |
| New NR NB UE X3AP ID | M | | Allocated at the target NR NB |
| NE-RABs Admitted List | | 1 | |
| >NE-RABs Admitted Item | | 1..<maxnoof Bearers> | |
| >>NE-RAB ID | M | | |
| >>UL GTP Tunnel Endpoint | O | | Identifies the X2 transport bearer used for forwarding of UL PDUs |
| >>DL GTP Tunnel Endpoint | O | | Identifies the X2 transport bearer used for forwarding of DL PDUs |
| NE-RABs Not Admitted List | O | | A value for *NE-RAB ID* shall only be present once in *NE-RABs Admitted List* IE and *NE-RABs Not Admitted List* IE. |
| Target to Source Transparent Container | M | | Includes the RRC NG-UTRA Handover Command message as defined in RRC. |
| ... | | | |

Fig. 26

HANDOVER REQUEST ACKNOWLEDGE message

| IE/Groupe Name | Presence | Range | Semantics description/ Note |
|---|---|---|---|
| Message Type | M | | |
| Old eNB UE X3AP ID | M | | Allocated at the source eNB |
| New NR NB UE X3AP ID | M | | Allocated at the target NR NB |
| NG Core Context | M | | Includes the NG Core Information, e.g., Slice Information, Flow Information (or PDU Session Information), transparent to eNB. |
| NE-RABs Admitted List | | 1 | |
| >NE-RABs Admitted Item | | 1..<maxnoof Bearers> | |
| >>NE-RAB ID | M | | |
| >>UL GTP Tunnel Endpoint | O | | Identifies the X2 transport bearer used for forwarding of UL PDUs |
| >>DL GTP Tunnel Endpoint | O | | Identifies the X2 transport bearer used for forwarding of DL PDUs |
| NE-RABs Not Admitted List | O | | A value for NE-RAB ID shall only be present once in NE-RABs Admitted List IE and NE-RABs Not Admitted List IE. |
| Target to Source Transparent Container | M | | Includes the RRC NG-UTRA Handover Command message as defined in RRC. |
| ... | | | |

Fig. 27

NG Core Context

| IE/Groupe Name | Presence | Range | Semantics description/ Note |
|---|---|---|---|
| NG Core Context | | | |
| >Slice information | O | | This IE identifies the informaion applicable to the Network Slicing. The target NR NB shall use this IE at the NNSF. |
| >Flow information | O | | This IE identifies the informaion applicable to the Flow based packet transmission. The target NR NB shall use this IE at the PDU session establishment. |
| >..... | | | |

Fig. 28

Slice Information

| IE/Groupe Name | Presence | Range | Semantics description/ Note |
|---|---|---|---|
| Slice Information | | | |
| >Network Slice Instance ID | M | | |
| >Network Function ID | M | | One or some of DCN ID, SCNF ID, SUNF ID, CPF ID, UPF ID, Gateway ID, DNN, etc. If some, maybe "Network Function ID List". |
| >Multi-Dimensional Descriptor | O | | |
| >>Slice Type | M | | E.g., Service Category, Use case{eMBB, URLLC, mMTC}, ... |
| >>Tenant ID | M | | E.g., Use case, Subscription group{home, roaming}, ... |
| >Mobility Class | O | {high mobility, low mobility, No mobility, ...,} | |
| >Session Class | O | {Session pre-setup, Session post-setup, No PDU session, ...,} | |

Fig. 29

Flow Information

| IE/Groupe Name | Presence | Range | Semantics description/ Note |
|---|---|---|---|
| Flow Information | | | |
| >PDU Session Information List | | 1..<maxnoof PDUsessions> | |
| >>PDU Session ID | M | | |
| >>Transport Layer Address | M | | |
| >>Session Endpoint ID | M | | |
| >>NE-RAB ID | | | |
| >>..... | | | |

Fig. 30

Session Endpoint ID

| IE/Groupe Name | Presence | Range | Semantics description/ Note |
|---|---|---|---|
| CHOICE Session Endpoint ID | M | | |
| >GTP | | | |
| >>GTP-TEID | M | | |
| >GRE | | | |
| >>GRE-TEID | M | | |
| >UP Network Function ID | | | |
| >>Network Function ID | M | | One or some of DCN ID, CUNF ID, SUNF ID, UPF ID, Gateway ID, DNN, TUPF ID, etc. If more than one, "UP Network Function ID List" used. |

Fig. 31

RADIO ACCESS NETWORK NODE, RADIO TERMINAL, CORE NETWORK NODE, AND METHOD THEREFOR

CROSS REFERENCE TO RELATED APPLICATIONS

This application is a continuation of U.S. application Ser. No. 16/321,998, filed on Jan. 30, 2019, which is a National Stage of International Application No. PCT/JP2017/018227 filed May 15, 2017, claiming priority based on Japanese Patent Application No. 2016-158282, filed Aug. 10, 2016, the disclosure of which is incorporated herein in its entirety by reference.

TECHNICAL FIELD

The present disclosure relates to a radio communication system and, in particular, to handover of a radio terminal between different Radio Access Technologies (RATs).

BACKGROUND ART

The 3rd Generation Partnership Project (3GPP) has started to work on the standardization for the fifth generation mobile communication system (5G), i.e., 3GPP Release 14, in 2016 to make 5G a commercial reality in 2020 (see Non-patent Literature 1). 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is also referred to as a Next Generation (NextGen) System (NG System). The new RAT for the NG System is referred to as a New Radio (NR), a 5G RAT, or a NG RAT. A new Radio Access Network (RAN) and a core network for the NG System are referred to as a NextGen RAN (NG RAN) and a NextGen Core (NG Core), respectively. A radio terminal (i.e., User Equipment (UE)) that is connected to the NG System is referred to as NextGen UE (NG UE). Official names for RATs, UEs, radio access networks, core networks, network entities (or nodes), protocol layers, etc. for the NG System will be determined in the future as the standardization work progresses.

The term "LTE" used in this specification includes enhancement/evolution of LTE and LTE-Advanced to provide interworking with the NG System, unless otherwise specified. The enhancement/evolution of LTE and LTE-Advanced for the interworking with the NG System is also referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the NG System, unless otherwise specified. Enhanced EPC, enhanced MME, enhanced S-GW, and enhanced P-GW are also referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN) and a core network (i.e., an Evolved Packet core (EPC)). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. A SDF is one or more packet flows that match an SDF template (i.e., packet filters) based on a Policy and Charging Control (PCC) rule. Further, each packet to be sent through an EPS bearer for packet routing contains information for identifying which bearer (i.e., a General Packet Radio Service (GPRS) Tunneling Protocol (GTP) tunnel) this packet is associated with.

In contrast, with regard to the NG System, it has been suggested that although radio bearers may be used in the NG RAN, no bearers are used in the NG Core or in the interface between the NG RAN and the NG Core (see Non-patent Literature 1). Specifically, PDU flows are defined instead of an EPS bearer, and one or more SDFs are mapped to one or more PDU flows. A PDU flow between an NG UE and a user-plane terminating entity in an NG Core (i.e., an entity corresponding to a P-GW in the EPC) corresponds to an EPS bearer in the EPS Bearer-based QoS concept. That is, the NG System adopts the Flow-based QoS (or per-flow QoS) concept instead of the Bearer-based QoS concept. In the Flow-based QoS concept, QoS is handled per PDU flow. Note that, association between a UE and a data network is referred to as a "PDU session". The term "PDU session" corresponds to the term "PDN connection" in LTE and LTE-Advanced. A plurality of PDU flows can be configured in one PDU session.

In this specification, a system that configures an end-to-end bearer (e.g., an EPS bearer) between a UE and an edge node (e.g., a P-GW) in a core network and adopts the Bearer-based QoS concept, such as the LTE and LTE-Advanced system, is referred to as a "bearer-based system" or a "bearer-based network". In contrast, a system that does not use any bearer in a core network or in an interface between the core network and a RAN and adopts the Flow-based QoS concept, such as the NG system, is referred to as a "bearer-less system" or a "bearer-less network". Similarly to the above-described NG System, radio bearers may be used in a RAN in the bearer-less network. The term "bearer-less" can also be expressed as, for example, GTP-less, (PDN) connection-less, tunnel-less, (IP) flow-based, SDF-based, stream-based, or (PDU) session-based. However, in this specification, the NG System may function as a bearer-based system and may support both a flow-based transfer of user data and a bearer-based transfer of user data.

Further, it has been suggested that the NG System supports network slicing (see Non-patent Literature 1). The network slicing uses a Network Function Virtualization (NFV) technology and a software-defined networking (SDN) technology and makes it possible to create a plurality of virtualized logical networks on a physical network. Each virtualized logical network is referred to as a network slice or a network slice instance, includes logical nodes and functions, and is used for specific traffic and signaling. The NG RAN or the NG Core or both have a Slice Selection Function (SSF). The SSF selects one or more network slices suitable for an NG UE based on information provided by at least one of this NG UE and the NG Core.

Patent Literature 1 discloses handover from a bearer-less network (e.g., 5G) to a bearer-based network (e.g., LTE) and handover from a bearer-based network (e.g., LTE) to a bearer-less network (e.g., 5G). In the handover from 5G to LTE disclosed in Patent Literature 1, a source control node (i.e., an Access Control Server (ACS)/eMME) in the 5G core (or NG Core) maps QoS parameters of service flows in the bearer-less network (i.e., 5G) to EPS-bearer-level QoS in the bearer-based network (i.e., LTE). The 5G QoS parameters of the service flows are, for example, DiffSery code point (DSCP) values. The EPS-bearer-level QoS in LTE is, for example, a QoS class identifier (QCI) and an allocation and retention priority (ARP). The mapping of DSCP values to EPS bearers may be performed in a one-to-one manner or an n-to-one manner. The source ACS/eMME sends APN information including information about the EPS-bearer-level QoS to a target MME. The target MME sets up GTP tunnels for the UE according to the received APN information.

Further, in the handover from LTE to 5G disclosed in Patent Literature 1, a source MME in the LTE core (i.e., the EPC) sends a forward relocation request containing necessary bearer context information to a target ACS/eMME in the 5G core (the NG Core). The target ACS/eMME performs mapping of QCI values received from the LTE (i.e., the source MME) to 5G QoS parameters (i.e., DSCP values) and supplies them to a transfer node (i.e., a Mobility Gateway Access Router (M-GW/AR) or a Mobility Gateway Edge Router (M-GW/ER)) in the 5G core (or NG Core). By doing so, the Target ACS/eMME sets up at least one Generic Routing Encapsulation (GRE) tunnel for transferring service flows (i.e., IP packets) of the UE.

CITATION LIST

Patent Literature

Patent Literature 1: International Patent Publication No. WO2015/160329 Non Patent Literature Non Patent Literature Non-patent Literature 1: 3GPP TR 23.799 V0.6.0 (2016-07) "3rd Generation Partnership Project; Technical Specification Group Services and System Aspects; Study on Architecture for Next Generation System (Release 14)", July 2016

SUMMARY OF INVENTION

Technical Problem

The inventors have studied handovers between the NG System (i.e., 5G) and the LTE system, and found several problems. For example, FIG. 4 of Patent Literature 1 shows that a handover procedure from the NG System (5G) to the LTE System is implemented by modifications of an LTE S1-based handover. However, Patent Literature 1 does not disclose that the handover procedure from the NG System (5G) to the LTE System includes transfer of handover signaling messages on a direct inter-base-station interface.

Accordingly, one of the objects to be attained by embodiments disclosed herein is to provide an apparatus, a method, and a program that contribute to providing an Inter-RAT handover procedure involving transfer of handover signaling messages on a direct inter-base-station interface. It should be noted that the above-described object is merely one of the objects to be attained by the embodiments disclosed herein. Other objects or problems and novel features will be made apparent from the following description and the accompanying drawings.

Solution to Problem

In an aspect, a target radio access network (RAN) node associated with a second network includes at least one memory and at least one processor coupled to the at least one memory. The at least one processor is configured to: receive, from a source RAN node in a first network, on a direct interface, a handover request message requesting a handover of a radio terminal from the first network to the second network; receive at least one of slice information and flow information from a core network in response to receiving the handover request message; and control communication of the radio terminal based on at least one of the slice information and the flow information. The slice information relates to a network slice in the second network to which the radio terminal is to be connected. The flow information relates to at least one session to be established in the second network, serving as a bearer-less network, in order to transfer at least one packet flow of the radio terminal.

In an aspect, a source radio access network (RAN) node associated with a first network includes at least one memory and at least one processor coupled to the at least one memory. The at least one processor is configured to determine a handover of a radio terminal from the first network to a second network and, in response to determination of the handover, send to a target RAN node in the second network, on a direct interface, a handover request message requesting the handover of the radio terminal to the second network. The at least one processor is further configured to receive from the target RAN node, on the direct interface, a handover request acknowledge message containing a transparent container and transmit, to the radio terminal, a mobility command message containing the transparent container and indicating the handover to the second network. The transparent container includes radio resource configuration information needed by the radio terminal to establish a radio connection associated with the second network. The radio resource configuration information includes at least one of: (a) first radio resource configuration information generated based on slice information relating to a network slice in the second network to which the radio terminal is to be connected; and (b) second radio resource information generated based on flow information relating to at least one session to be established in the second network, serving as a bearer-less network, in order to transfer at least one packet flow of the radio terminal.

In an aspect, a radio terminal includes at least one memory and at least one processor coupled to the at least one memory. The at least one processor is configured to, during handover from a first network to which the radio terminal is connected to a second network, receive a handover-related message from a radio access network (RAN) node of the first network. The handover-related message contains at least one of slice information about a network slice in the second network and radio resource configuration information based on the network slice in the second network.

In an aspect, a core network node includes at least one memory and at least one processor coupled to the at least one memory. The at least one processor is configured to, during handover of a radio terminal from a first network to a second network, send, to a target radio access network (RAN) node associated with the second network, slice information about a network slice which is included in the second network and to which the radio terminal is to be connected.

In an aspect, a method, in a target radio access network (RAN) node associated with a second network, includes:
receiving a handover request message on a direct interface from a source RAN node in a first network, the handover request message requesting a handover of a radio terminal from the first network to the second network;
receiving at least one of slice information and flow information from a core network in response to receiving the handover request message; and
controlling communication of the radio terminal based on at least one of the slice information and the flow information. The slice information relates to a network slice in the second network to which the radio terminal is to be connected. The flow information relates to at least one session to be established in the second network, serving as a bearer-less network, in order to transfer at least one packet flow of the radio terminal.

In an aspect, a method, in a source radio access network (RAN) node associated with a first network, includes:
determining a handover of a radio terminal from the first network to a second network;
sending a handover request message on a direct interface to a target RAN node in the second network in response to determination of the handover, the handover request message requesting the handover of the radio terminal to the second network;
receiving from the target RAN node, on the direct interface, a handover request acknowledge message containing a transparent container; and
transmitting, to the radio terminal, a mobility command message containing the transparent container and indicating the handover to the second network. The transparent container includes radio resource configuration information needed by the radio terminal to establish a radio connection associated with the second network. The radio resource configuration information includes at least one of: (a) first radio resource configuration information generated based on slice information relating to a network slice in the second network to which the radio terminal is to be connected; and (b) second radio resource information generated based on flow information relating to at least one session to be established in the second network, serving as a bearer-less network, in order to transfer at least one packet flow of the radio terminal.

In an aspect, a program includes a set of instructions (software codes) that, when loaded into a computer, causes the computer to perform a method according to the above-described aspects.

Advantageous Effects of Invention

According to the above-described aspects, it is possible to provide an apparatus, a method, and a program that contribute to providing an Inter-RAT handover procedure involving transfer of handover signaling messages on a direct inter-base-station interface.

BRIEF DESCRIPTION OF DRAWINGS

FIG. 23A shows an example of a format of a Mobility from EUTRA command message;

FIG. 23B shows an example of the format of the Mobility from EUTRA command message;

FIG. 24 shows an example of a format of a NR Handover Request message;

FIG. 25 shows an example of a format of a UE Context Information;

FIG. 26 shows an example of a format of a NR Handover Request Acknowledge message;

FIG. 27 shows an example of a format of a NR Handover Request Acknowledge message;

FIG. 28 shows an example of a format of an NG Core Context;

FIG. 29 shows an example of a format of slice information;

FIG. 30 shows an example of a format of flow information; and

FIG. 31 shows an example of a format of a session endpoint ID.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

First Embodiment

Figure 1:
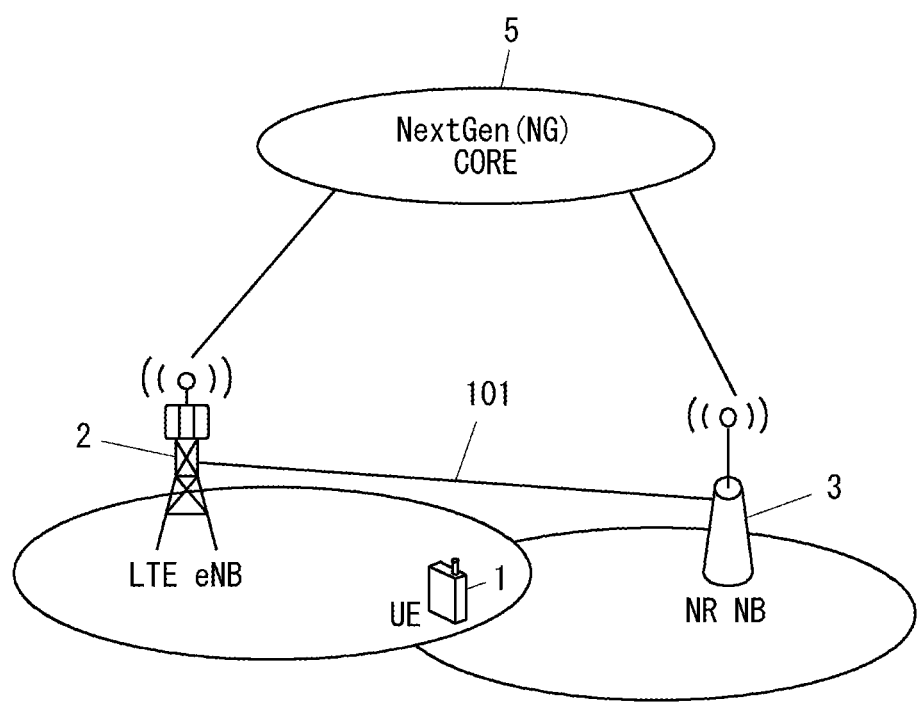
FIG. 1 shows a configuration example of a radio communication network according to some embodiments.

FIG. 1 shows a configuration example of a radio communication network according to some embodiments including this embodiment. In the example shown in FIG. 1, the radio communication network includes a radio terminal (UE) 1, an LTE base station (i.e., eNB) 2, a New Radio (NR) base station (i.e., NR NodeB (NR NB)) 3, and a NextGen (NG) Core 5. The LTE eNB 2 is connected to the NG Core 5. Specifically, the LTE eNB 2 is connected to an MME in the NG Core 5, or to a control node (i.e., Control-plane Function (CPF) node) that is disposed in the NG Core 5 and has at least a part of the functions of the MME, via a control-plane interface (e.g., NG2 interface). The LTE eNB 2 is also connected to a Serving Gateway (S-GW) in the NG Core 5, or to a data node (i.e., User-plane Function (UPF) node) that is disposed in the NG Core 5 and has at least a part of the functions of the S-GW, via a user-plane interface (e.g., NG3 interface). The LTE eNB 2, which is enhanced to be connected to the NG Core 5, may be referred to as an eLTE eNB.

Similarly, the NR NB 3 may be connected to one or more CPF nodes in the NG Core 5 via a control-plane interface (e.g., NG2 interface). Further, the NR NB 3 may be connected to one or more UPF nodes in the NG Core 5 via a user-plane interface (e.g., NG3 interface). Furthermore, the UE 1 may be connected to one or more CPF nodes in the NG Core 5 via a control-plane interface (e.g., NG1 interface). The NG1 interface may be defined as a logical interface for transferring NAS-layer information, and transmission of NAS-layer information may be performed through the NG2 interface and through the radio interface (e.g., NG Uu) between the NR NB 3 and the UE 1.

In some implementations, the NG Core 5 may set up a virtualized network slice that provides logical EPC nodes and EPC functions. In some implementations, an E-UTRAN including the LTE eNB 2 may be connected to the same network slice as an NG RAN including the NR NB 3. Alternatively, the E-UTRAN including the LTE eNB 2 and the NG RAN including the NR NB 3 may be connected to network slices different from each other. The UE 1 has a capability of connecting to an LTE system provided by the LTE eNB 2 and the NG Core 5 and also has a capability of connecting to a NextGen (NG) system provided by the NR NB 3 and the NG Core 5.

The LTE eNB 2 is connected to the NR NB 3 through a direct inter-base-station interface 101. The direct inter-base-station interface 101 is referred to, for example, as an X3 interface. The direct inter-base-station interface 101 is used at least for transfer of signaling messages between the LTE eNB 2 and the NR NB 3. The direct inter-base-station interface 101 may also be used for transfer of user packets between the LTE eNB 2 and the NR NB 3. The control-plane protocol structure and user-plane protocol structure of the direct inter-base-station interface 101 may be similar, for example, to those of the X2 interface between LTE eNBs.

The NG System may further include other interfaces in addition to the above-described NG1, NG2 and NG3 interfaces. Each interface may be referred to as a reference point. NG RANs (i.e., different NR NBs) may be connected to each other through an NX2 interface. A CPF node having either or both of a Mobility Management Function (MMF) and a Session Management Function (SMF) may be connected to an UPF node through a control-plane interface (e.g., NG4 interface). Different UPF nodes may be connected to each other through a user-plane interface (e.g., NG9 interface). CPF nodes having different functions may be connected to each other through a control-plane interface. For example, a CPF node having an MMF and an SMF may be connected through a control-plane interface (e.g., NG7 interface) to a CPF node having a Policy Control Function (PCF). A CPF node having an MMF and an SMF may be connected through a control-plane interface (e.g., NG8 interface) to a node having a Subscriber Data Management (SDM) function. A CPF node may be connected through a control-plane interface (e.g., NG5 interface) to a node having an Application Function (AF). A UPF node may be connected to an external or local Data Network (DN) through a user-plane interface (e.g., NG6 interface). The SMF may include a function of authenticating a user or a terminal and a function of authorizing a service or network slicing. The above-described network nodes are individually or collectively referred to as a Network Function(s) (NF(s)).

In some implementations, the NG System, including the NR NB 3 and the NG Core 5, supports a data transfer based on the above-described Flow-based QoS (or per-flow QoS) concept. The NG System including the NR NB 3 and the NG Core 5 may be further configured to support a bearer-based transfer using a bearer per QoS class and per PDU session. A bearer in the NG System may be configured between a pair of Network Functions (NFs), for example, between the NR NB 3 and a user-plane function in the NG Core 5, or between two user-plane functions in the NG Core 5. Alternatively, a bearer in the NG System may be configured between the UE 1 and a user-plane function in the NG Core 5 through the NR NB 3. A bearer in the NG System may be referred to as an NG-EPS-bearer and a radio access bearer in the NG System may be referred to as an NG-RAB. A bearer in the NG System can be used for transfer of a plurality of packet flows (i.e., PDU flows).

The NG-RAB may be composed of a radio bearer configured between the UE 1 (NG UE) and the NR NB 3 and a bearer configured between the NR NB 3 and a user-plane function (e.g., Edge Gateway (Edge GW)) in the NG Core 5 (e.g., NG3 bearer). The NG-EPS-bearer may be composed of the NG-RAB and a core network bearer (e.g., NG9 bearer) configured between user-plane functions in the NG Core 5 (e.g., between an Edge GW and a Data Network Gateway (DN GW)). The Edge GW is a gateway to a radio access network and is similar to the user-plane function of an LTE S-GW. However, in the NG System, unlike the LTE S-GW, the UE 1 may be connected to a plurality of Edge GWs. The DN GW is a gateway to an external network (i.e., Data Network) and is similar to the user-plane function of an LTE P-GW. In the NG System, similarly to the LTE P-GW, the UE 1 may be connected to a plurality of DN GWs.

More specifically, the NG-EPS-bearer may be configured between the UE 1 (i.e., NG UE) and a slice specific user-plane function (i.e., Slice specific User-plane NF (SUNF)) in the NG Core 5. The NG-RAB may be configured between the UE 1 (i.e., NG UE) and a common user-plane function (i.e., Common User plane NF (CUNF)) in the NG Core 5. In this case, the CUNF provides the functions of the Edge GW and the SUNF provides the functions of the DN GW. The CUNF may associate the NG-RAB with a core network bearer (e.g., NG9 bearer). That is, the NG-EPS-bearer may be composed of the NG-RAB between the UE 1 (i.e., NG UE) and the CUNF and the core network bearer (e.g., NG9 bearer) between the CUNF and the SUNF.

The NG System that supports the bearer-based transfer may be further configured to distinguish between data flows (e.g., PDU flows) in a bearer to perform QoS handling (e.g., discard of packets) on a per-data-flow basis (e.g., on a per-PDU-flow basis). For example, the NR NB 3 may associate a bearer (e.g., NG3 bearer) configured between the NR NB 3 and a user-plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

Note that when the (e)LTE eNB 2 is connected to the NG Core 5 through an NG2 interface, a radio access bearer corresponding to an LTE EPS Radio Access Bearer (E-RAB) may be defined as an NG EPS Radio Access Bearer (NE-RAB) and a bearer corresponding to an LTE EPS bearer may be defined as an NG EPS bearer (NEPS bearer). The NE-RAB may be composed of a radio bearer configured between the UE 1 and the LTE eNB 2 and a bearer (e.g., NG3 bearer) configured between the LTE eNB 2 and a user-plane function (e.g., Edge GW or CUNF) in the NG Core 5. The NEPS bearer may be composed of the NE-RAB and a core network bearer (e.g., NG9 bearer) configured between user-plane functions in the NG Core 5 (e.g., between an Edge GW and a DN GW, or between a CUNF and an SUNF).

The LTE eNB 2 connected to the NG System may be configured to distinguish between data flows (e.g., PDU flows) in a NE-RAB to perform QoS handling (e.g., discard of packets) on a per-data-flow basis (e.g., on a per-PDU-flow basis). For example, the LTE eNB 2 may associate a bearer (e.g., NG3 bearer) configured between the LTE eNB 2 and a user-plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

Figure 2A:
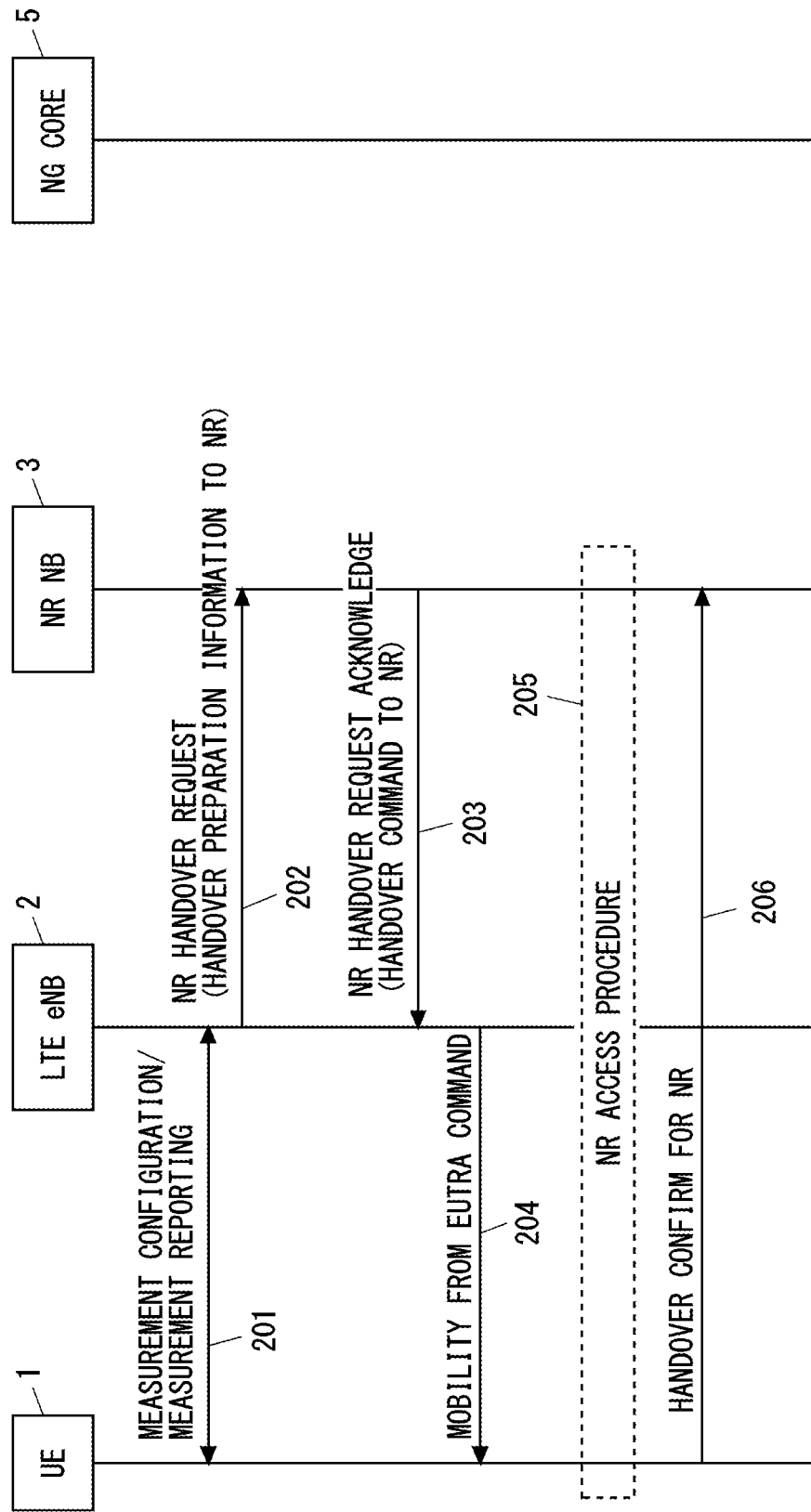
FIG. 2A is a sequence diagram showing an example of an inter-RAT handover procedure form an LTE System to an NG System according to a first embodiment.
Figure 2B:
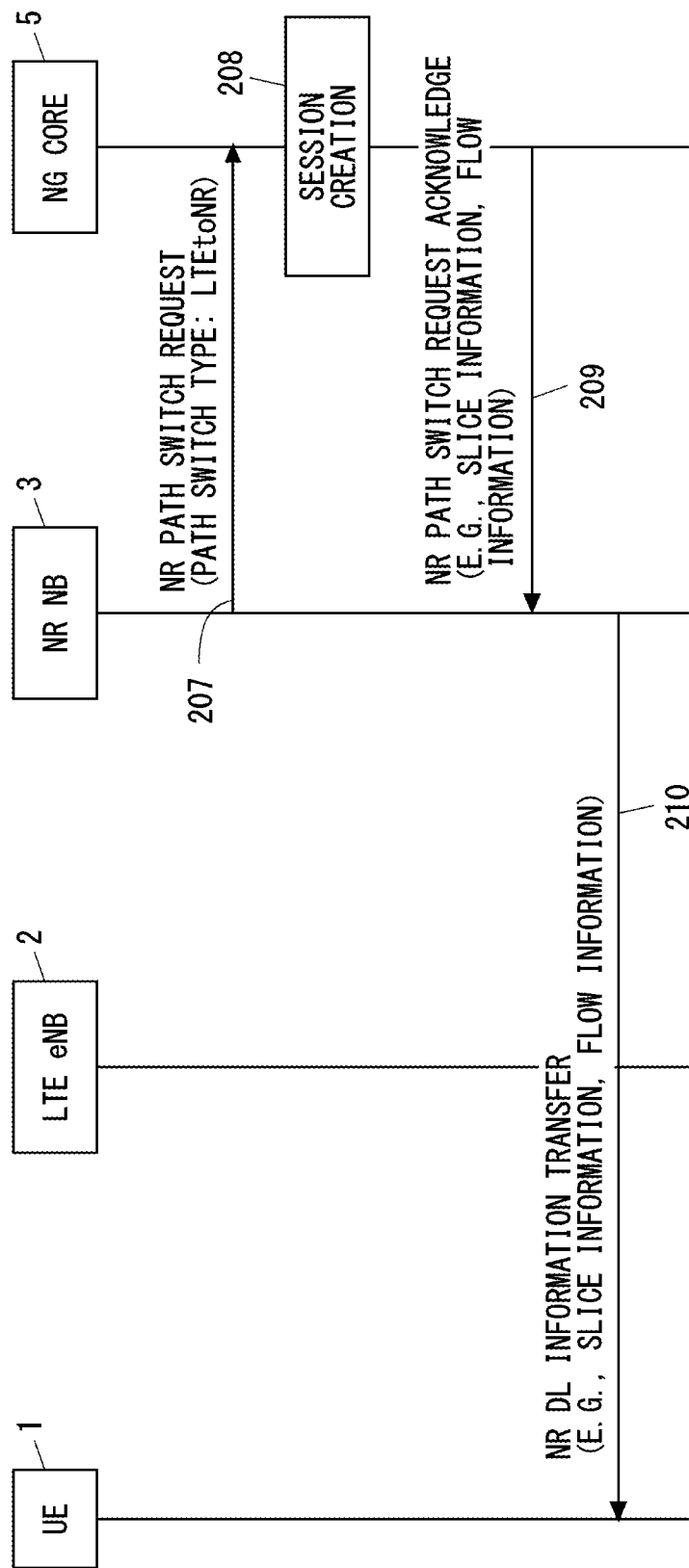
FIG. 2B is a sequence diagram showing an example of the inter-RAT handover procedure form the LTE System to the NG System according to the first embodiment.

This embodiment provides a method for handing over the UE 1 from an LTE System that does not support network slicing to an NG System that supports network slicing. FIGS. 2A and 2B show an example of a procedure for handing over the UE 1 from the LTE System to the NG System in the configuration example of the radio communication network shown in FIG. 1. FIG. 2A shows a handover preparation phase and a handover execution phase, while FIG. 2B shows a handover completion phase.

The procedure shown in FIGS. 2A and 2B resembles the "X2-based handover" in LTE in that it involves transfer of handover signaling messages on the direct inter-base-station interface 101 (i.e., Steps 202 and 203) during the handover preparation phase. However, if only transfer of handover signaling messages on the direct inter-base-station interface 101 is performed, there is not enough information in the NG RAN for a relocation of the UE 1 from the LTE system to the NG system. In the procedure shown in FIGS. 2A and 2B, the handover completion phase is improved to include signaling (i.e., Steps 207, 209 and 210) between the NR NB 3 and the NG Core 5 to acquire information needed for the relocation of the UE 1 from the LTE system to the NG system.

In Step 201, the UE 1 is connected to the LTE eNB 2 and is in a connected state (i.e., RRC_Connected). The UE 1 receives a Measurement Configuration from the LTE eNB 2, performs neighbor cell measurements and inter-Radio-Access-Technology (inter-RAT) measurements including measurements of E-UTRAN (LTE) cells and NG-RAN cells according to the received measurement configuration, and sends a measurement report to the LTE eNB 2. The measurement configuration is contained, for example, in an RRC Connection Reconfiguration message transmitted from the E-UTRAN to the UE.

In Step 202, the LTE eNB 2 determines an inter-RAT handover to a cell of the NR NB 3. Upon determining the Inter-RAT handover, the LTE eNB 2 sends an NR Handover Request message to the target NR NB 3 on the direct inter-base-station interface 101 (e.g., the X3 interface).

The NR Handover Request message in Step 202 may contain a Handover Type Information Element (IE) indicating a handover from LTE to NR. For example, the Handover Type IE is set to "LTEtoNR".

The NR Handover Request message in Step 202 may further contain an "NG EPS Radio Access Bearers (NE-RABs) To Be Setup List" information element (IE). The "NE-RABs To Be Setup List" IE indicates an identifier (i.e., an NE-RAB ID) and QoS parameters (e.g., QoS class identifier (QCI), Allocation and retention priority (ARP), and Guaranteed Bit Rate (GBR) QoS information) of each NE-RAB for the UE 1. The NextGen E-RAB (NE-RAB) is an E-RAB set up between the UE 1 and a User-plane Function in the NG Core 5 (e.g., a Common User plane NF (CUNF)) through an eLTE eNB which is enhanced to support interfaces with the NG Core.

The NR Handover Request message in Step 202 may further contain a "Handover Preparation Information to NR" Information Element (IE). For example, the "Handover Preparation Information to NR" IE may include assistance information for facilitating mapping between EPS bearers and packet flows (e.g., PDU flows or SDFs) for the UE 1. This assistance information may indicate identifiers or packet filters (e.g., SDF templates or TFTs) of one or more SDFs mapped to each EPS bearer. This assistance information may be sent from the UE 1 to the LTE eNB 2 via an RRC message. Further, this assistance information may be transmitted as an information element (IE) containing parameters for the RRC layer, or may be transmitted as an IE in the RRC layer containing information about the NAS layer (e.g., NAS Info IE).

Additionally or alternatively, the "Handover Preparation Information to NR" IE may include security-related information. The security-related information includes security parameters to be used by the target NR NB 3 to derive an Access Stratum (AS) security key. These security parameters include a base key (i.e., a key corresponding to $K_{eNB}$ of LTE) for deriving a security key (or a temporary key) used by the AS layer, or include parameters (e.g., {NH, NCC} pair) for deriving this base key. These security parameters may further include UE security capabilities regarding the NG RAT or the NG System. The UE security capabilities indicate ciphering and integrity protection algorithms implemented in the UE 1.

For example, similarly to the existing X2 handover procedure, the source LTE eNB 2 may derive $K_{eNB}*$ from an unused {NH, NCC} pair and send a {$K_{eNB}*$, NCC} pair to the target NR NB 3. The Next Hop parameter (NH) and the Next Hop Chaining Counter parameter (NCC) are used for derivation of $K_{eNB}$ according to a vertical key derivation algorithm for the next hop. Alternatively, the source LTE eNB 2 may derive $K_{eNB}*$ from the current $K_{eNB}$ according to a horizontal key derivation algorithm and send a {$K_{eNB}*$, NCC} pair to the target NR NB 3.

Alternatively, the source LTE eNB 2 may send an unused {NH, NCC} pair to the target NR NB 3. In this case, the target NR NB 3 may derive a base key (i.e., a key corresponding to $K_{eNB}$ of LTE) and AS keys from the received unused {NH, NCC} pair according to the vertical key derivation algorithm.

The NR Handover Request message in Step 202 may further contain assistance information for network slicing (e.g., Assistance Data for Network Slicing). The "Assistance Data for Network Slicing" IE contains network slice assistance information for facilitating network slicing. The network slice assistance information may indicate, for example, a type of the UE 1, a service that the UE 1 desires, acceptable latency of the UE 1, or any combination thereof. Alternatively, a part of or the whole network slice assistance information may be contained in handover preparation information (or another information element) of an RRC container (e.g., RRC Context IE). The network slice assistance information may be generated by the UE 1, the LTE eNB 2, or an EPC network slice instance in the NG Core 5. For example, the UE 1 may send network slice assistance information to the LTE eNB 2 in Step 201. This network slice assistance information may be an information element (IE) indicating a parameter of the RRC layer, or may be NAS information (e.g., NAS information IE), and may be included in a measurement report sent from the UE 1 to the LTE eNB 2.

In Step 203, the target NR NB 3 generates a UE context and allocates resources based on the NR Handover Request message. The target NR NB 3 may determine admitted E-RABs based on the received "E-RABs To Be Setup List" IE. The target NR NB 3 may determine a flow identifier (e.g., PDU flow ID) corresponding to each admitted E-RAB, end point information of the target NR NB 3 for the delivery of uplink (UL) PDUs, and end point information of the target NR NB 3 for the delivery of downlink (DL) PDUs. The end point information of the target NR NB 3 for the delivery of UL PDUs may be a UL GTP Tunnel Endpoint Identifier (TEID), or may be one or both of a UL endpoint ID and an Internet Protocol (IP) address. Similarly, the end point information of the target NR NB 3 for the delivery of DL PDUs may be a DL GTP TEID, or may be one or both of a DL endpoint ID and an IP address. The end point information for the delivery of UL PDUs is used for forwarding of UL data, while the end point information for the delivery of DL PDUs is used for forwarding of DL data.

Further, when the NR Handover Request message in Step 203 includes the security-related information, the target NR NB 3 may operate as follows. As described above, the security-related information includes security parameters for AS security. The target NR NB 3 may select an AS security algorithm based on the UE security capabilities included in the security parameters. The AS security algorithm includes a ciphering algorithm for Radio Resource Control (RRC) and User Plane (UP), and also includes an integrity protection algorithm for RRC. Further, the target NR NB 3 may derive temporary keys for RRC ciphering (or encryption), UP ciphering (or encryption), and RRC integrity protection from a base key (i.e., a key corresponding to $K_{eNB}$ of LTE) obtained from the security parameters by using the selected security algorithm.

The target NR NB 3 generates a Target To Source Transparent Container to be sent to the UE 1. This Target To Source Transparent Container includes, for example, an RRC: HandoverCommand message (e.g., Handover Command To NR) containing an RRCConnectionRecofiguration message and other RRC messages. The target NR NB 3 then generates, as a response to the handover request, an acknowledgement response (e.g., Handover Request Acknowledge) message containing this Target To Source Transparent Container. The target NR NB 3 sends the NR Handover Request Acknowledge message to the source LTE eNB 2 on the direct inter-base-station interface 101 (e.g., X3 interface). The Target To Source Transparent Container contains, for example, radio resource configuration information (e.g., radio parameters) set up by the target NR NB 3, an identifier of an AS security algorithm selected by the target NR NB 3, and an NCC value. The NR Handover Request Acknowledge message may further contain the above-described "NE-RABs Admitted list" information element (IE). The source LTE eNB 2 starts data forwarding for the bearer(s) or flow(s) (e.g., PDU flow(s)) specified by the "NE-RABs Admitted list" IE.

In Step 204, the source LTE eNB 2 sends to the UE 1 a Radio Resource Control (RRC) message containing a Handover Command message including the transparent container generated by the target NR NB 3. This RRC message may be, for example, a Mobility from EUTRA command message or an RRC Connection Reconfiguration message.

In Step 205, in response to receiving the RRC message containing the Handover Command message, the UE 1 moves to a target RAN (i.e., NG RAN) and performs a handover according to the transparent container (e.g., the radio resource configuration information, the AS security algorithm, and the NCC value) provided by the Handover Command message. That is, the UE 1 establishes a radio connection with the target NR NB 3 associated with the bearer-less network (i.e., NG System). In Step 206, after successfully synchronizing to the target cell, the UE 1 sends a Handover Confirm for NR message to the target NR NB 3. The message in Step 206 may be an NR RRC Connection Reconfiguration Complete message.

In Step 207, when the UE 1 has successfully accessed the target NR NB 3, the target NR NB 3 sends an NR Path Switch Request message to the NG Core 5 in order to notify the NG Core 5 that the UE 1 has changed its cell and to request a path switch. This NR Path Switch Request message may include a path switch type information element (IE) indicating a path switch from LTE to NR. For example, the Path Switch Type IE is set to "LTEtoNR". The NR Path Switch Request message may further contain a list of EPS bearers of the UE 1, which have been switched to the cell of the target NR NB 3.

In Step 208, a control node (e.g., CPF) in the NG Core 5 performs a procedure for creating a bearer-less session. Specifically, the control node determines that the packet transfer node (or gateway) for the UE 1 needs to be relocated and then selects a target transfer node (or gateway) for the NG System in the NG Core 5. The target transfer node (or gateway) for the NG System is a node corresponding to the S-GW in LTE. The control node sends a Create Session Request message to the target transfer node (or gateway). This Create Session Request message may include information (e.g., SDF templates, or Traffic Flow Templates (TFTs)) for identifying one or more service data flows associated with each EPS bearer context. For example, the information for identifying the one or more service data flows may be derived from a message (e.g., Forward Relocation Request message) that is sent from an MME within a network slice instance corresponding to an EPC to which the LTE eNB 2 is connected to a control node within a network slice instance corresponding to a pure NG Core to which the NR NB 3 is connected. The target transfer node (or gateway) allocates its local resources and sends a Create Session Response message to the control node.

Note that, when the NG System supports a bearer-based transfer using a bearer per QoS class and per PDU session, and when the relocation of the transfer node is not needed, the control node in the NG Core 5 may perform a bearer modification procedure in Step 208 instead of the session creation procedure.

Further, in Step 208, the control node (e.g., CPF) in the NG Core 5 may select (or re-select) a network slice to which the UE 1 is to be connected after the handover. The control node in the NG Core 5 may perform creation of the selected network slice instance. In an example, the control node in the NG Core 5 may select a network slice for the UE 1 based on QoS required for the EPS bearer(s) or SDF(s) of the UE 1. Additionally or alternatively, the NG Core 5 may take network slice assistance information into consideration. The network slice assistance information assists the control node (e.g., CPF) in the NG Core 5 to select, configure, or authorize a network slice. The network slice assistance information may be generated by the UE 1, the LTE eNB 2, or an EPC network slice instance within the NG Core 5. For example, the NR Handover Confirm for NR message sent from the UE 1 to the target NR NB 3 (step 206) may include network slice assistance information, and the target NR NB 3 may incorporate the received network slice assistance information into the NR Path Switch Request message (step 207).

The network slice assistance information may indicate, for example, any one or any combination of: a type of the UE 1 (e.g., Device Type or UE Category); a purpose of access by the UE 1 (e.g., UE Usage Type); a type of a service that the UE 1 desires (e.g., Requested/Preferred Service Type or Multi-Dimensional Descriptor (MDD)); slice information selected by the UE 1 (e.g., Selected Slice Type, Selected Slice Identity (ID), or Selected Network Function (NF) ID); slice information for which the UE 1 has been previously authorized (e.g., Authorized Slice Type, Authorized Slice ID, or Authorized NF ID); and acceptable latency of the UE 1 (e.g., Allowed Latency or Tolerable Latency). The Service Type may indicate, for example, a type of a Use Case, such as broadband communication (e.g., enhanced Mobile Broad Band: eMBB), high-reliable/low-latency communication (e.g., Ultra Reliable and Low Latency Communication: URLLC), M2M communication with a large number of connections (e.g., massive Machine Type Communication: mMTC), or a type similar thereto. The Slice ID may indicate, for example, any one or any combination of: slice instance information (e.g., Network Slice Instance (NSI) ID); dedicated network information (e.g., Dedicated Core Network (DCN) ID); and network domain name information (e.g., Domain Network Name (DNN) ID). The NF ID may indicate, for example, an identifier(s) of any one or any combination of: a common network function (e.g., Common NF (CNF)); a common control-plane function (e.g., Common Control-plane NF (CCNF)); a common user plane function (e.g., Common User plane NF (CUNF)); and a data gateway (e.g., Data Network Gateway (DN GW)).

In Step 209, the control node in the NG Core 5 sends an NR Path Switch Request Acknowledge message to the target NR NB 3. This NR Path Switch Request Acknowledge message may include core network information (e.g., NG Core Information). The core network information (e.g., NG Core Information) may include flow information or slice information, or both. The flow information relates to at least one session (i.e., PDU session(s)) established in the bearer-less network (i.e., NG system) to transfer at least one packet flow (i.e., PDU flow(s)) of the UE 1. The flow information includes: a flow identifier (e.g., PDU flow ID); an address (e.g., Transport Layer Address) and an uplink (UL) Session Endpoint Identifier (SEID) of a transfer node in the NG Core 5; and a flow QoS parameter. The session endpoint identifier (SEID) may be, for example, a Tunnel Endpoint Identifier (TEID) or a network function (or node) identifier (NF ID). The TEID may be, for example, a GTP-TEID or a GRE-TEID.

The flow information may further indicate mapping between EPS bearers and PDU Flows for the UE 1. For example, the flow information may indicate one or more SDFs mapped to each EPS bearer of the UE 1 and a flow identifier (e.g., PDU flow ID) assigned to each of these one or more SDFs. The flow information may further include priority information (e.g., priority indicator), flow type information (e.g., flow type indicator), or a Flow Class. The priority information may indicate, for example, a relative priority order among a plurality of flows or an absolute priority order of each flow. The flow type information may indicate, for example, which use case or which service the flow corresponds to. Further, the flow class may indicate, for example, one of predefined flow types (e.g., loss-less, delay tolerant, delay sensitive, and mission critical).

This slice information includes information about at least one of: a network slice that is included in the NG Core 5 and to which the UE 1 is going to connect (or the UE 1 is to be connected) after the handover; a network slice that is included in the NG Core 5 and to which the UE 1 is allowed to connect; and a network slice that is included in the NG Core 5 and to which the UE 1 can connect.

The slice information may include identification information of the slice (i.e., network slice: NS) determined (or selected) for the UE 1, identification information of a network node (NF), or type information of the slice, or any combination thereof. The slice identification information may be, for example, a Slice ID, an NSI ID, an MDD, a DCN ID, or a DNN, or any combination thereof. The identification information of the network node may include, for example, an NF ID, a CNF ID, a CCNF ID, a Slice specific Control plane NF (SCNF) ID, a CUNF ID, a Slice specific User plane NF (SUNF) ID, an UPF ID, or a DN GW ID, or any combination thereof. The slice type information may include, for example, a Slice Type indicating any one or any combination of a Service Type, a Service Category, and a Use Case. Additionally or alternatively, the slice type information may include a Tenant ID indicating a Use Case or a subscription contract (a Subscription Group, e.g., a home UE or a roaming UE). The slice type information may include an MDD that includes a Slice Type and a Tenant ID as its elements. Note that the contents of the above-described slice information may be designated per network slice. Accordingly, when the UE 1 is to be connected simultaneously to a plurality of network slices, the slice information may include plural sets of information items corresponding to the number of network slices to which the UE 1 is to be connected.

The slice information may further include a Mobility Class or a Session Class, or both. The Mobility Class may indicate one of predefined mobility levels (e.g., high mobility, low mobility, and no mobility). For example, the high mobility means that a geographical area in which a network slice supports mobility for the UE 1 (or permits mobility to the UE 1) is larger than that of the low mobility, and a level required for continuity of services (or PDU sessions) during handover is higher. The No mobility means a network slice supports mobility for the UE 1 (or permits mobility to the UE 1) only in a very limited geographic area. The Mobility Class may be designated per UE or may be designated per network slice. The Session Class may indicate one of predefined session types (e.g., Session pre-setup, Session post-setup, and No PDU session). For example, in order to maintain services (or PDU Sessions) during mobility as in the case of the existing handovers, the Session pre-setup may indicate that a PDU session needs to be established before the UE completes the movement to the target (i.e., a cell, a beam, etc.). In contrast, the Session post-setup may indicate that a PDU session may be established after the UE has moved to the target. The Session Class may be designated per PDU session. The Mobility Class and the Session Class may be contained in the Slice Type. In other words, the Slice Type may contain a plurality of attributes including the Mobility Class and the Session Class. The above-described flow information may include a Mobility Class or a Session Class, or both.

In Step 210, the target NR NB 3 sends to the UE 1 an NR DL Information Transfer message carrying the NAS information (e.g., slice information and flow information) received from the NG Core 5.

After the handover is completed according to the procedure shown in FIGS. 2A and 2B, the paths shown below may be used for the data transfer for the UE 1. When the NG System including the NR NB 3 and the NG Core 5 supports a bearer-based transfer in the NG Core 5 and a bearer (e.g., NG-EPS-bearer) is used for the UE 1 after the handover, both the uplink path and the downlink path may include, for example, a path (e.g., GTP tunnel or GRE tunnel) between the source (or old) S/P-GW and the target (or New) User-plane function (e.g., CUNF) in the NG Core 5. Specifically, the S/P-GW may transfer downlink data to the User-plane Function (e.g., the CUNF) in the NG Core 5, while the User-plane Function (e.g., the CUNF) in the NG Core 5 may transfer uplink data to the S/P-GW.

In contrast, when a bearer (e.g., NG-EPS-bearer) is not used for the UE 1 after the handover, for example, the CUNF may relay between the source (or old) S/P-GW and the target (or New) User-plane Function (e.g., SUNF having the NW Slicing function). Specifically, the S/P-GW may transfer downlink data to the CUNF in the NG Core 5 and then the CUNF may transfer downlink data to another UNF having a flow-by-flow control function. Alternatively, data transfer may be performed directly between the S/P-GW and the SUNF without traversing the CUNF. The above-described data transfer paths after the handover may also be used in other handover procedures described below.

Figure 3A:
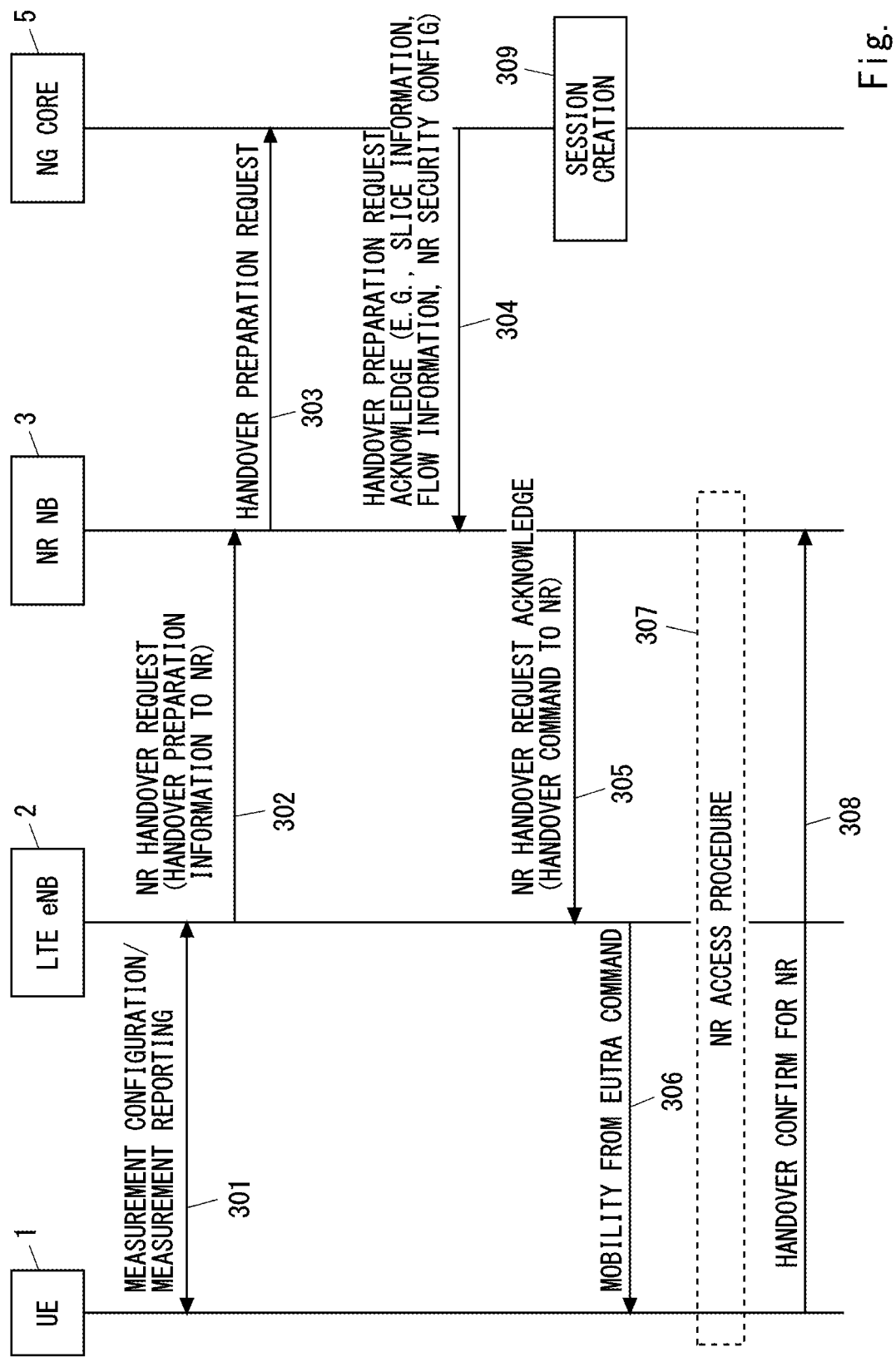
FIG. 3A is a sequence diagram showing an example of an inter-RAT handover procedure form an LTE System to an NG System according to the first embodiment.
Figure 3B:
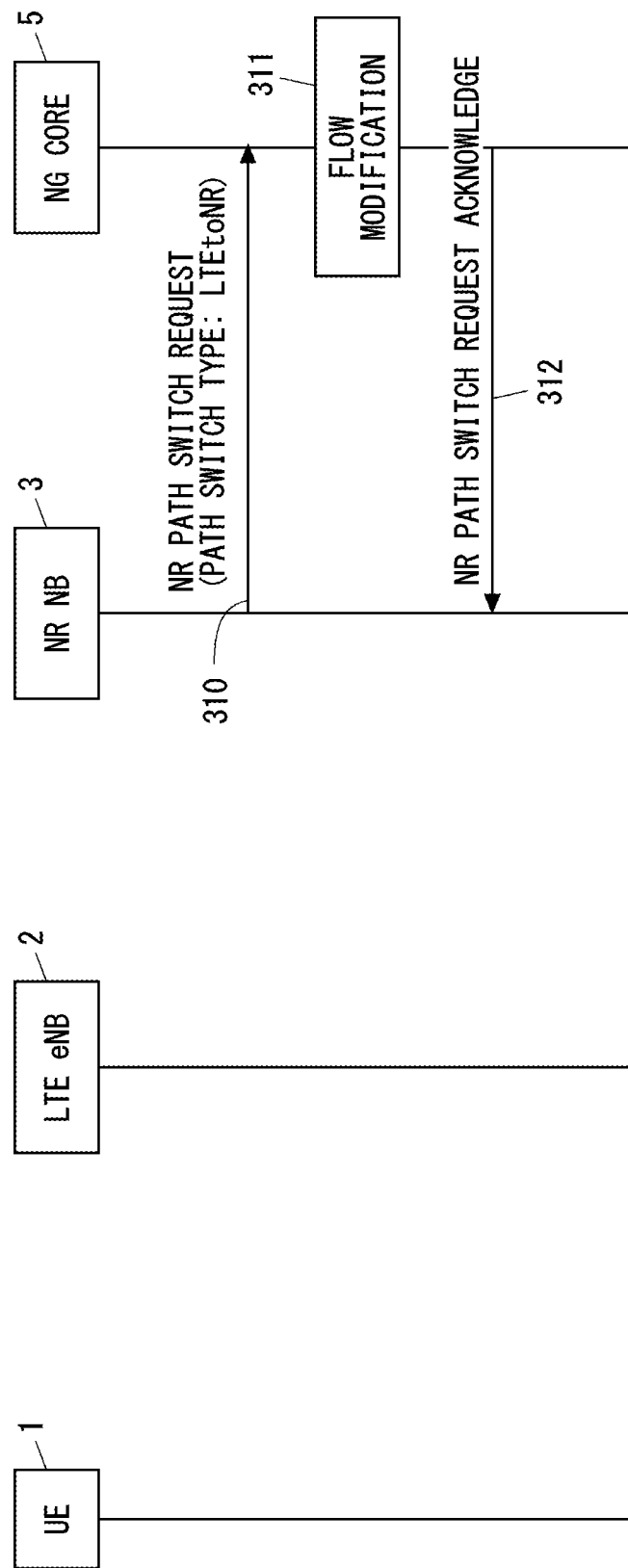
FIG. 3B is a sequence diagram showing an example of the inter-RAT handover procedure form the LTE System to the NG System according to the first embodiment.

FIGS. 3A and 3B show another example of a procedure for handing over the UE 1 from an LTE System to an NG System in the configuration example of the radio communication network shown in FIG. 1. FIG. 3A shows a handover preparation phase and a handover execution phase, while FIG. 3B shows a handover completion phase. In the previously-described procedure shown in FIGS. 2A and 2B, the target NR NB 3 receives the core network information (e.g., the flow information or the slice information or both) from the NG Core 5 in the handover completion phase (step 209), which is performed after the UE 1 has been connected to the target NR NB 3. In contrast, in the procedure shown in FIGS. 3A and 3B, the target NR NB 3 receives core network information (e.g., flow information or slice information or both) from the NG Core 5 in the handover preparation phase (step 304), which is performed before the LTE eNB 2 issues an instruction for a handover to the UE 1. This difference is mainly described below.

Processes in Steps 301 and 302 are similar to those in Steps 201 and 202 of FIG. 2A. In Step 303, the target NR NB 3 sends a Handover Preparation Request message to the NG Core 5 in response to receiving the NR Handover Request message (step 302).

The Handover Preparation Request message in Step 303 may contain a handover type information element (IE) indicating a handover from LTE to NR. For example, the Handover Type IE is set to "LTEtoNR". The Handover Preparation Request message may further contain a list of NG EPS bearers of the UE 1 to be switched to a cell of the target NR NB 3.

In Step 304, the NG Core 5 determines, based on the received Handover Preparation Request message, that the type of the handover is an Inter-RAT handover to the NR (or NG System). The NG Core 5 then sends, to the target NR NB 3, a Handover Preparation Request Acknowledge message containing one or both of core network information and security-related information. The core network information and the security-related information are used by the target NR NB 3 and the UE 1 to perform a radio resource setting and a security-related setting to communicate with the UE 1 in the NG system. Several specific examples of the core network information are described below.

In an example, the core network information may include slice information. This slice information includes information about at least one of: a network slice that is included in the NG Core 5 and to which the UE 1 is going to connect (or the UE 1 is to be connected) after the handover; a network slice that is included in the NG Core 5 and to which the UE 1 is allowed to connect; and a network slice that is included in the NG Core 5 and to which the UE 1 can connect. A control node (e.g., CPF) in the NG Core 5 determines (or selects) a network slice to which the UE 1 to be connected after the handover. In an example, the control node (CPF) in the NG Core 5 may select a network slice for the UE 1 based on QoS needed for the EPS bearer(s) or SDF(s) of the UE 1. Additionally or alternatively, the NG Core 5 may take network slice assistance information into consideration. The network slice assistance information assists the control node (e.g., CPF) in the NG Core 5 to select, configure, or authorize a network slice. The network slice assistance information may be generated by the UE 1, the LTE eNB 2, or an EPC network slice instance within the NG Core 5. For example, the UE 1 may send network slice assistance information to the LTE eNB 2 in Step 301. This network slice assistance information may be NAS information, and may be included in a measurement report sent from the UE 1 to the LTE eNB 2. In Step 302, the source LTE eNB 2 may send the network slice assistance information received from the UE 1 to the target NR NB 3.

In another example, the core network information may include flow information. This flow information relates to at least one session (i.e., PDU session(s)) established in the bearer-less network (i.e., NG system) to transfer at least one packet flow (i.e., PDU flow(s)) of the UE 1. In respect of each packet flow (i.e., each PDU flow) of the UE 1, the flow information includes: a flow identifier (e.g., PDU flow ID); an address and an uplink (UL) Session Endpoint Identifier (SEID) of a transfer node in the NG Core 5; and a flow QoS parameter. The session endpoint identifier (SEID) may be, for example, a Tunnel Endpoint Identifier (TEID) or a network function (or node) identifier (NF ID). The TEID may be, for example, a GTP-TEID or a GRE-TEID.

The flow information may further indicate mapping between EPS bearers and PDU Flows for the UE 1. For example, the flow information may indicate one or more SDFs mapped to each EPS bearer of the UE 1 and a flow identifier (e.g., PDU flow ID) assigned to each of these one or more SDFs. The flow information may further include priority information (e.g., priority indicator), flow type information (e.g., flow type indicator), or a Flow Class.

Meanwhile, the security-related information may include Non-Access Stratum (NAS) security configuration information (security configuration) used between the NG Core 5 and the UE 1 in the NG System. The NAS security configuration information includes, for example, a NAS security algorithm including ciphering and integrity protection. The NAS security configuration information may be an NAS Security Transparent Container IE. That is, the NAS security configuration information (or NAS Security Transparent Container IE) is sent from the target NR NB 3 to the UE 1 transparently through the source LTE eNB 2.

The security-related information further includes security parameters to be used by the target NR NB 3 to derive an Access Stratum (AS) security key. These security parameters include a base key (i.e., a key corresponding to $K_{eNB}$ of LTE) for deriving a security key (or a temporary key) used by the AS layer, or include parameters (e.g., {NH, NCC} pair) for deriving this base key. The Next Hop parameter (NH) and the Next Hop Chaining Counter parameter (NCC) are used to derive $K_{eNB}$ according to a vertical key derivation algorithm. These security parameters may further include UE security capabilities regarding the NG RAT or the NG System. The UE security capabilities indicate ciphering and integrity protection algorithms implemented in the UE 1.

The core network information contained in the acknowledgement response (Handover Preparation Request Acknowledge) to the handover preparation request in Step 304 may include either or both of the above-described two examples (i.e., the slice information and the flow information).

In Step 305, the target NR NB 3 generates a UE context and allocates resources in response to receiving the Handover Preparation Request Acknowledge message containing one or both of the core network information and the security-related information.

When the core network information contained in the Handover Preparation Request Acknowledge message includes the slice information, the target NR NB 3 may operate as follows. The target NR NB 3 may perform admission control based on the core network information containing the slice information. For example, the target NR NB 3 may determine whether to accept a bearer or flow on a per-bearer or per-flow basis. Additionally or alternatively, the target NR NB 3 may perform admission control for each network slice, to which the UE 1 is to be connected, based on the slice information. Note that the NR NB 3 may determine whether it can accept each network slice. When there is a network slice that the NR NB 3 cannot accept (or does not accept), the NR NB 3 may map this network slice to a specific network slice (e.g., a default network slice), or may connect this network slice to a specific NF (e.g., CUPF). Alternatively, the NR NB 3 may determine that it has failed in accepting this network slice.

Additionally or alternatively, the target NR NB 3 may generate, based on the slice information (or derive, from the slice information), radio resource configuration information (e.g., radio parameters) needed by the UE 1 to establish a radio connection (e.g., an RRC connection or a radio bearer) associated with the NG System that supports network slicing. The radio resource configuration information may include at least one parameter included in the slice information.

The radio resource configuration information derived from the slice information may include a radio (or RAN) parameter(s) per network slice (or per use case). The use cases include, for example, an enhanced mobile broadband (eMBB), massive machine-type communications (mMTC), and Ultra-reliable and low-latency communications (URLLC). The radio parameter(s) per network slice (or per use case) may be fundamental physical channel parameters or fundamental layer 2/layer 3 (L2/L3) configurations. The fundamental physical channel parameter may include, for example, a frame/subframe structure, a Transmission Time Interval (TTI) length, subcarrier spacing, and a Physical Random Access Channel (PRACH) resource. The PRACH resource may be either or both of a preamble index and time/frequency resources. The fundamental L2/L3 configurations may include, for example, a frame/subframe pattern and configurations of L2 protocol sublayers (L2 configuration, e.g., PDCP config, RLC config, or MAC config).

Additionally or alternatively, in RRC signaling that specifies (or indicates) the radio resource configuration information derived from the slice information, at least one of: message structures; formats of an information element (IE); parameter values; and targets of encoding and decoding of ASN.1 (Abstract Syntax Notation One) indicating a structure definition of information, may be different between slices.

When the core network information contained in the Handover Preparation Request Acknowledge message includes the flow information, the target NR NB 3 may operate as follows. The target NR NB 3 may take the flow information into consideration for creation of a UE context and radio resource configuration information. Specifically, the target NR NB 3 may generate, based on the flow information, a UE context including information about a packet flow (i.e., PDU flow(s)) and a security context.

Further, the target NR NB 3 may generate, based on the flow information (or derive, from the flow information), radio resource configuration information needed by the UE 1 to establish a radio connection (e.g., an RRC connection or a radio bearer) associated with the bearer-less network (i.e., NG System). The radio resource configuration information may include at least one parameter included in the flow information. The radio resource configuration information may include system information (e.g., System Information Block: SIB) in a cell (or a mobility area or a beam covering area) of the target NR NB 3, a common radio resource configuration for UEs (e.g., Common Resource Configuration), or a UE dedicated radio resource configuration (e.g., Dedicated Resource Configuration). The radio resource configuration information may further include information indicating mapping between a bearer (e.g., EPS bearer or Data Radio Bearer (DRB)) in a cell of the source LTE eNB 2 and a flow (e.g., PDU flow) to be established in a cell of the target NR NB 3.

As already described, the NG System including the NR NB 3 and the NG Core 5 may be configured to support a bearer-based transfer using a bearer per QoS class and per PDU session, or may be configured to distinguish between data flows (e.g., PDU flows) in the bearer to perform QoS handling (e.g., discard of packets) on a per-data-flow basis (e.g., on a per-PDU-flow basis). For example, the NR NB 3 may associate a bearer (e.g., NG3 bearer) configured between the NR NB 3 and a user-plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

In this case, the above-described flow information may indicate an association between a bearer for the UE 1 (e.g., NG-RAB or NG3 bearer) and one or more packet flows (i.e., PDU flow(s)) for the UE 1 transferred through this bearer. In other words, the control node (e.g., CPF) in the NG Core 5 may send the flow information to the NR NB 3 to notify the NR NB 3 of an association between a bearer for the UE 1 (e.g., NG-RAB or NG3 bearer) and one or more packet flows (i.e., PDU flow(s)) for the UE 1 transferred through this bearer. The NR NB 3 may receive the flow information from the control node in the NG Core 5 and then, according to the received flow information, perform QoS handling (e.g., discard of packets) per data flow (e.g., PDU flow) in the bearer (e.g., NG3 bearer) configured between the NR NB 3 and the user-plane function in the NG Core 5.

When the Handover Preparation Request Acknowledge message includes the security-related information, the target NR NB 3 may operate as follows. As described above, the security-related information includes the NAS security configuration information (e.g., NAS Security Transparent Container IE) and the security parameters for AS security. The Target NR NB 3 may incorporate the NAS security configuration information (e.g., NAS Security Transparent Container IE) into a transparent container to be sent to the UE 1. Additionally or alternatively, the target NR NB 3 may select an AS security algorithm based on UE security capabilities included in the security parameters. The AS security algorithm includes a ciphering algorithm for Radio Resource Control (RRC) and a user plane (UP), and also includes an integrity protection algorithm for the RRC. Further, the target NR NB 3 may derive temporary keys for RRC ciphering (or encryption), UP ciphering (or encryption), and RRC integrity protection from a base key (i.e., a key corresponding to $K_{eNB}$ of LTE) obtained from the security parameters by using the selected security algorithm.

The target NR NB 3 generates a Target To Source Transparent Container (e.g., RRCConnectionReconfiguration) to be sent to the UE 1. This Target To Source Transparent Container includes, for example, a HandoverCommand message containing an RRC ConnectionRecofiguration message and other RRC messages. Then, the target NR NB 3 generates, as a response to the handover request, an acknowledgement response (e.g., NR Handover Request Acknowledge) message containing the Target To Source Transparent Container and containing core network context information (e.g., NG Core Context IE) including core network information. The target NR NB 3 sends the NR Handover Request Acknowledge message to the source LTE eNB 2 on the direct inter-base-station interface 101 (e.g., X3 interface). The Target To Source Transparent Container contains, for example, radio resource configuration information set up by the target NR NB 3 (e.g., radio parameters), an identifier of the AS security algorithm selected by the target NR NB 3, and NAS security configuration information. The core network context information (e.g., NG Core Context) may be transmitted to the UE 1 transparently through the source LTE eNB 2. Additionally or alternatively, a part of or the whole core network context information may be contained in the Target To Source Transparent Container. The NR Handover Request Acknowledge message may further include the above-described "NE-RABs Admitted list" information element (IE). The source LTE eNB 2 starts data forwarding for the bearer(s) or flow(s) (e.g., PDU flow(s)) specified by the "NE-RABs Admitted list" IE.

The process in Step 306 is similar to that in Step 204 in FIG. 2A. In Step 307, in response to receiving the RRC message containing the Handover Command message, the UE 1 moves to a target RAN (i.e., NG RAN) and performs a handover according to the transparent container (e.g., the radio resource configuration information, the AS security algorithm, and the NAS security configuration information) provided by the Handover Command message. The process in Step 308 is similar to that in Step 206 in FIG. 2A.

In Step 309, the NG Core 5 performs a bearer-less session creation procedure or a bearer modification procedure. In other words, a control node in the NG Core 5 starts a bearer-less session creation procedure or a bearer modification procedure for the UE 1 in response to receiving the Handover Preparation Request message in Step 303. Specifically, the control node in the NG Core 5 starts the bearer-less session creation procedure or the bearer modification procedure for the UE 1 prior to a path switch request from the target NR NB 3 (step 310). The bearer-less session creation or the bearer modification in Step 309 may be performed in a manner similar to that in Step 208 in FIG. 2B.

In Step 310, the target NR NB 3 sends an NR Path Switch Request message to the NG Core send to 5. In Step 311, the control node in the NG Core 5 performs a flow modification procedure and thereby completes the Inter-RAT handover procedure. For example, the control node in the NG Core 5 may send a Modify Flow Request message per session (i.e., per PDU session) to a transfer node in the NG Core 5. This Modify Flow Request message may contain a flow identifier (e.g., PDU flow ID), and also contain an address and a downlink (DL) session endpoint identifier (SEID) of the target NR NB 3. The session endpoint identifier (SEID) may be, for example, a Tunnel Endpoint Identifier (TEID). The transfer node in the NG Core 5 may send a Modify Flow Response message to the control node in the NG Core 5. In Step 312, the control node in the NG Core 5 sends an NR Path Switch Request Acknowledge message to the target NR NB 3.

Figure 4:
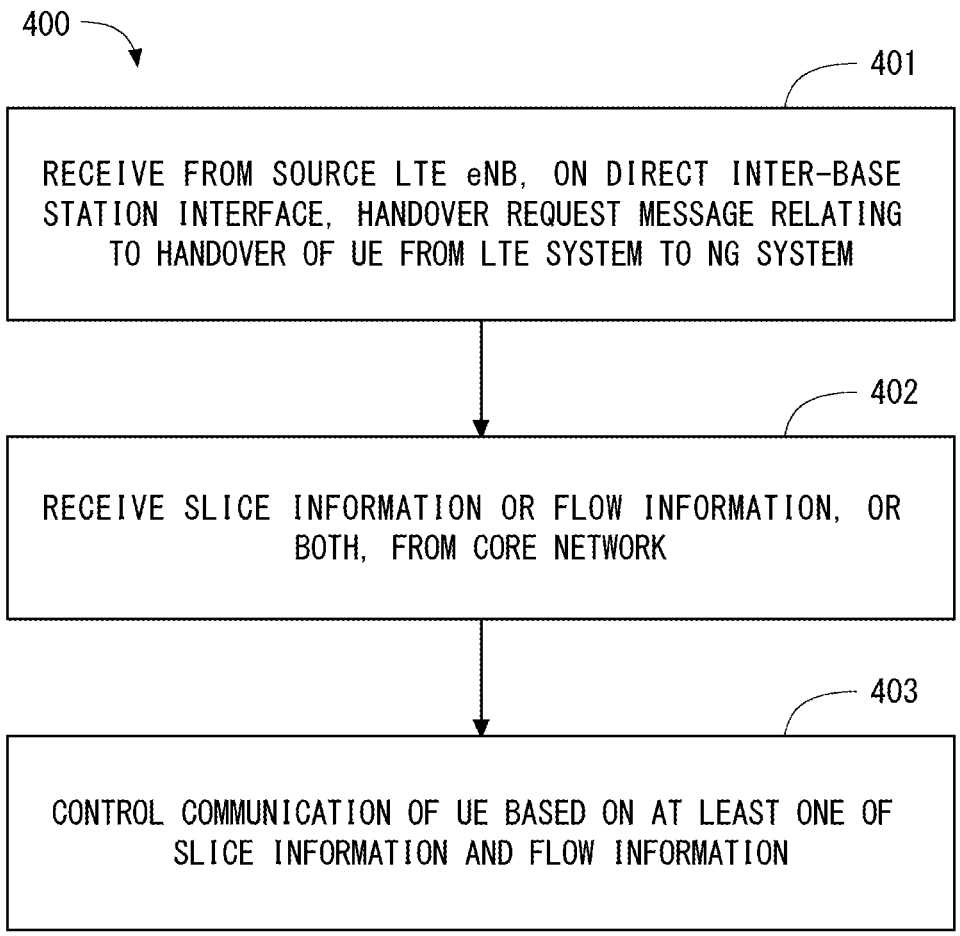
FIG. 4 is a flowchart showing an example of a method performed by a target NR NodeB (NR NB) according to the first embodiment.

FIG. 4 is a flowchart showing a process 400 that is an example of a method performed by the target NR NB 3. In Step 401, the target NR NB 3 receives a Handover Request message from the source LTE eNB 2 on the direct inter-base-station interface 101. This Handover Request message relates to a handover of the UE 1 from an LTE system to an NG system. Step 401 corresponds, for example, to Step 202 in FIG. 2A or Step 302 in FIG. 3A.

In Step 402, the target NR NB 3 receives slice information or flow information, or both, from the core network (i.e., NG Core 5). Step 402 corresponds, for example, to Step 209 in FIG. 2B or Step 304 in FIG. 3A.

In Step 403, the target NR NB 3 controls communication of the UE 1 based on at least one of the slice information and the flow information. For example, the target NR NB 3 may generate radio resource configuration information based on at least one of the slice information and the flow information, and send this radio resource configuration information to the UE 1. For example, based on the slice information, the target NR NB 3 may select a network slice to which the NR NB 3 will send a control-plane message regarding the UE 1. For example, the target NR NB 3 may perform forwarding of UL user data (e.g., PDU flows) of UE 1 to the NG Core 5 based on end point information included in the flow information. For example, the target NR NB 3 may perform resource scheduling for the UE 1 based on a flow QoS parameter included in the flow information.

Figure 5:
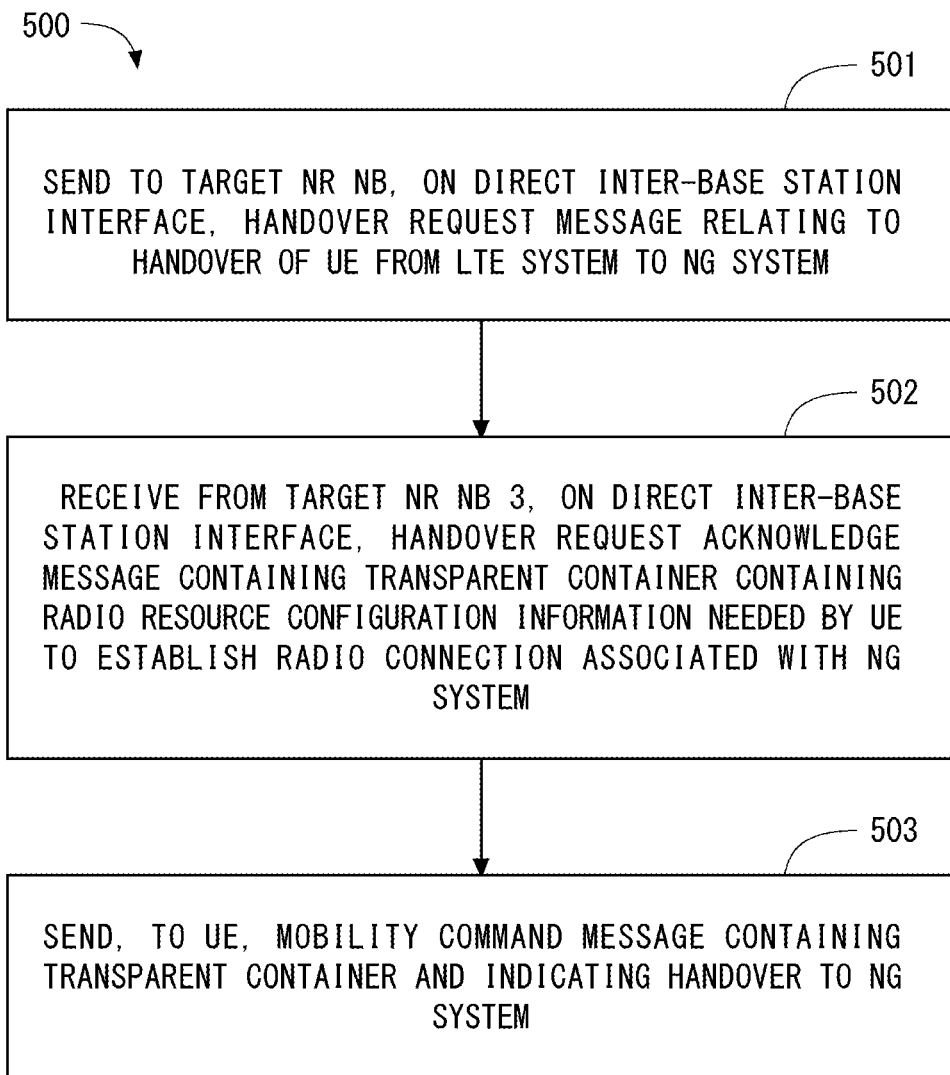
FIG. 5 is a flowchart showing an example of a method performed by a source LTE eNB according to the first embodiment.

FIG. 5 is a flowchart showing a process 500 that is an example of a method performed by the source LTE eNB 2. In Step 501, the source LTE eNB 2 sends a Handover Request message to the target NR NB 3 on the direct inter-base-station interface 101. This Handover Request message relates to a handover of the UE 1 from an LTE system to an NG system. Step 501 corresponds, for example, to Step 202 in FIG. 2A or Step 302 in FIG. 3A.

In Step 502, the source LTE eNB 2 receives a Handover Request Acknowledge message containing a transparent container (e.g., RRCConnectionReconfiguration) from the target NR NB 3 on the direct inter-base-station interface 101. Step 502 corresponds, for example, to Step 203 in FIG. 2A or Step 305 in FIG. 3A. The transparent container contains, for example, radio resource configuration information set up by the target NR NB 3, an identifier of an AS security algorithm selected by the target NR NB 3, and an NCC value or NAS security configuration information.

In Step 503, the source LTE eNB 2 sends to the UE 1 a mobility command message (e.g., Handover Command message) that contains the transparent container received from the target NR NB 3 and indicates a handover to a bearer-less network. Step 503 corresponds to Step 204 in FIG. 2A or Step 306 in FIG. 3A.

Figure 6:
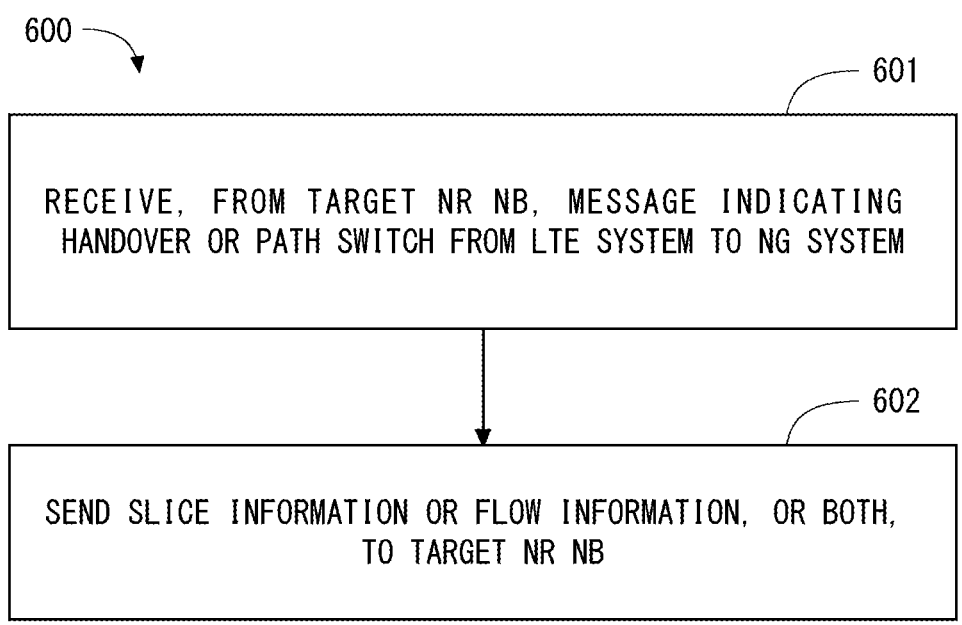
FIG. 6 is a flowchart showing an example of a method performed by a core network according to the first embodiment.

FIG. 6 is a flowchart showing a process 600 that is an example of a method performed by the core network (i.e., NG Core 5). The process shown in FIG. 6 may be performed by a single control node in the NG Core 5 or may be performed by two control nodes (i.e., a source MME and a target control node) in the NG Core. In Step 601, the NG Core 5 receives, from the NR NB 3, a message indicating a handover or a path switch from an LTE system to an NG system (e.g., Handover Preparation Request message or NR Path Switch Request message). Step 601 corresponds to Step 207 in FIG. 2B or Step 303 in FIG. 3A.

In Step 602, the NG Core 5 sends slice information or flow information, or both, to the target NR NB 3. Step 602 corresponds, for example, to Step 209 in FIG. 2B or Step 304 in FIG. 3A.

Figure 7:
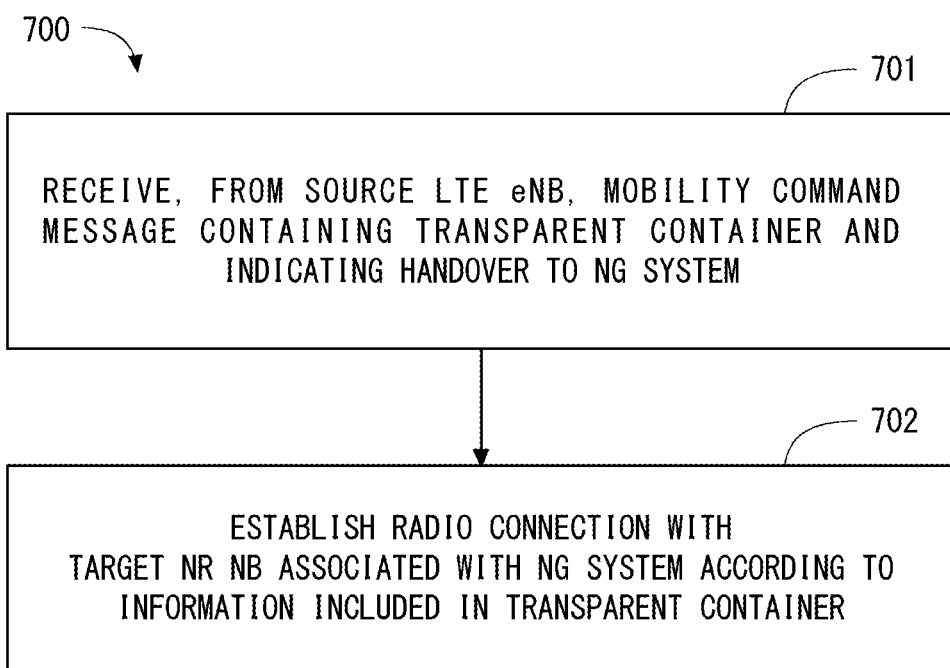
FIG. 7 is a flowchart showing an example of a method performed by a radio terminal according to the first embodiment.

FIG. 7 is a flowchart showing a process 700 that is an example of a method performed by the UE 1. In Step 701, the UE 1 receives a mobility command message (e.g., Handover Command message) from the source LTE eNB 2. This mobility command message contains a transparent container (e.g., RRCConnectionReconfiguration) sent from the target NR NB 3. This transparent container contains, for example, radio resource configuration information, an AS security algorithm, and an NCC value or NAS security configuration information. Step 701 corresponds, for example, to Step 204 in FIG. 2A or Step 306 in FIG. 3A.

In Step 702, the UE 1 establishes a radio connection with the target NR NB 3 associated with the NG System according to the information included in the received transparent container. Step 702 corresponds, for example, to Steps 205 and 206 in FIG. 2A or Steps 307 and 308 in FIG. 3A.

In this embodiment, the network may be configured to enable the UE 1 to know in advance whether the handover target cell (i.e., NR cell) supports network slicing. For example, the NR NB 3 may broadcast system information (e.g., System Information Block Type-x: SIBx, E.g., x=1) including network slicing support information that explicitly or implicitly indicates that network slicing is supported in the NR cell (or that it is possible to connect to the NG core capable of providing network slicing). To indicate a supported network slice, the explicitly-transmitted network slicing support information may further include a type of a supported service (e.g., Supported Service Type) or a type of a supported slice (e.g., Supported Slice Type). In contrast, the implicitly-transmitted network slicing support information may include information regarding a different radio resource configuration per network slice. The UE 1 may know that network slicing is supported in the cell upon detecting that at least a part of the received radio resource configuration is designated per network slice. This information regarding a radio resource configuration may include configuration information about physical resources, or system configuration information, or both. The configuration information about physical resources may indicate at least one of a code, a time, a frequency, and an RACH preamble sequence (group). The system configuration information may indicate at least one of subcarrier spacing, a sampling rate, a TTI, and a subframe/frame format type. The network slicing support information may be transmitted as NAS-layer information or may be transmitted as AS-layer information. In the former case, the AS layer (i.e., RRC) of the UE 1 receives this information and transfers it to the NAS layer.

The detailed procedure of handover from the LTE System to the NG System according to this embodiment is not limited to the above-described specific examples. For instance, the names of messages in the handover procedure are not limited to those shown in the above-described several examples. In the above-described several examples of the handover procedure, the order of messages may be changed and some of them may be omitted. Further, they may include one or more additional messages.

As understood from the above descriptions, each of the handover procedures from the LTE System to the NG System described in this embodiment is an Inter-RAT handover procedure involving transfer of handover signaling messages on the direct inter-base-station interface. In these handover procedures, the target NR NB 3 is configured to receive one or both of slice information and flow information from the core network (i.e., NG Core 5) and use the received information to control communication of the UE 1. In this way, the target NR NB 3 can contribute to continuing the communication of the UE 1 in a connected state, which has been handed over from the LTE System to the NG System.

Second Embodiment

Figure 8:
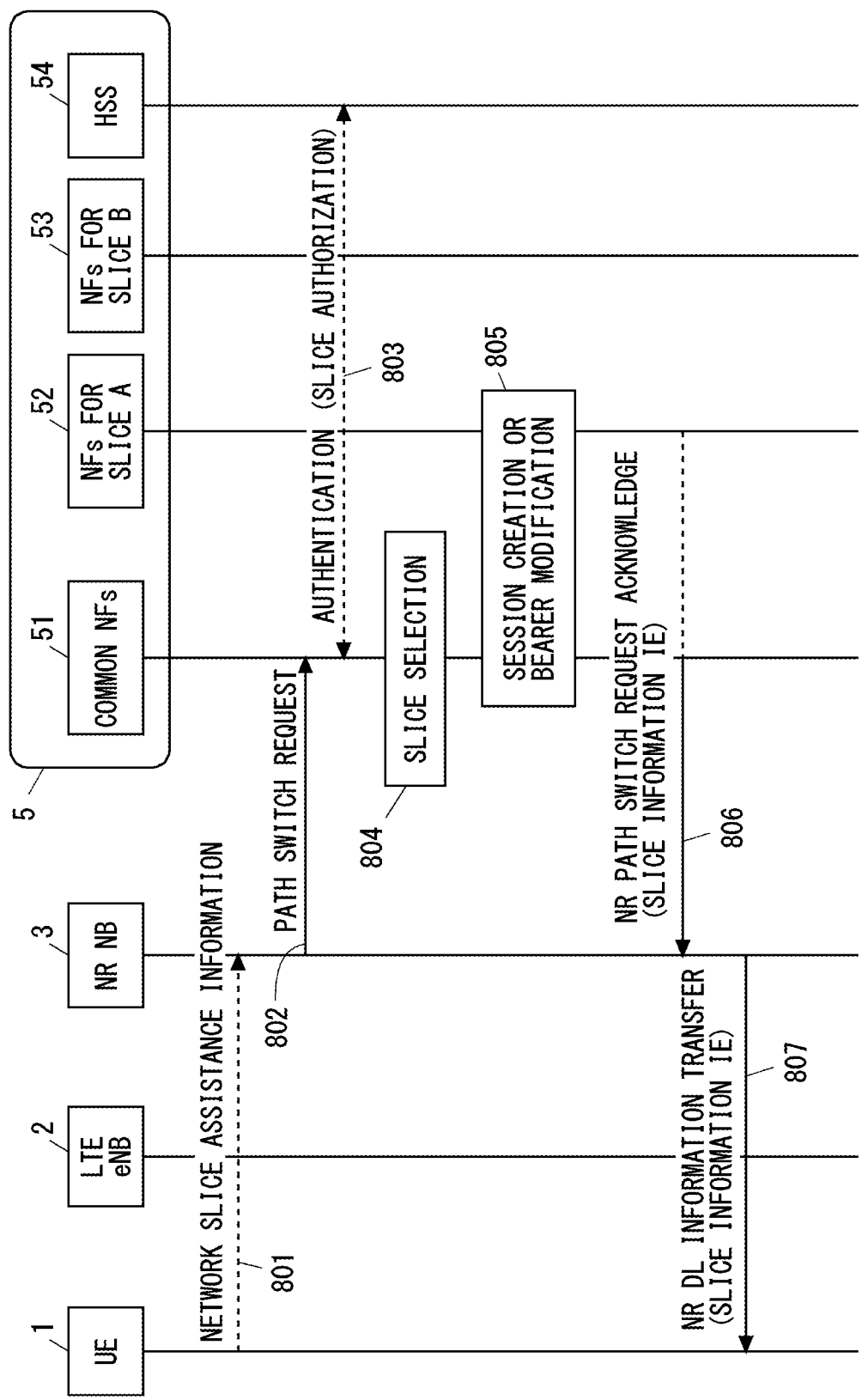
FIG. 8 is a sequence diagram showing an example of an inter-RAT handover procedure from an LTE System to an NG System according to a second embodiment.

This embodiment provides a modified example of the method for handing over the UE 1 from the LTE System to the NG System according to the first embodiment. FIG. 8 shows an example of a procedure for handing over the UE 1 from the LTE System to the NG System in the configuration example of the radio communication network shown in FIG. 1. The handover procedure shown in FIG. 8 provides details and modifications to the handover procedure shown in FIGS. 2A and 2B. Specifically, FIG. 8 shows a configuration within the NG Core 5 and a selection of a network slice performed by the NG Core 5 in a concrete manner.

The NG Core 5 shown in FIG. 8 includes Common Network Functions (NFs) 51, network functions for a network slice A (NFs for slice A) 52, network functions for a network slice B (NFs for slice B) 53, and a Home Subscriber Server (HSS) 54.

Note that each network element (i.e., NF) is a component of a network slice. Each network slice is composed of network functions (NFs) necessary for providing required telecommunication services and network capabilities. Each network element (NF) is a processing function in a network and defines functional behaviour and interfaces.

Each network element may be implemented as a network element on dedicated hardware, as a software instance running on dedicated hardware, or as a virtualized function instantiated on an appropriate platform.

Each network slice may be identified by a Network Slice specific Instance ID (NSI-ID). Each network function (NF) may be identified by a Network Function ID (NF ID). When common control-plane network functions (Common CP NFs) exist (or are used), NSI-IDs may be a combination of Common CP NF IDs and Slice specific IDs (i.e., NF IDs for selected slice).

The Common NFs 51 shown in FIG. 8 include control-plane network functions (CP NFs). The Common NFs 51 may further include user-plane network functions (UP NFs). The NFs for slice-A 52 include UP NFs and may further include CP NFs. Similarly, the NFs for slice-B 53 include UP NFs and my further include CP NFs.

FIG. 8 shows an example in which a Slice Selection Function (SSF) is co-located with the Common NFs 51. However, the SSF may be located separately from the Common NFs 51. In this case, the Common NFs 51 exchange messages with the SSF. The SSF selects a network slice to be associated with the UE 1. For example, the SSF may associate the UE 1 with a default network slice. Additionally or alternatively, the SSF may associate the UE 1 with a network slice (or a slice type) that has been designated by the UE 1. Further, the SSF may provide a NAS Node Selection Function (NNSF) to select CP NFs (or CP NFIDs) corresponding to the selected slice. Note that the default network slice may be configured per Public Land Mobile Network (PLMN), per RAT, per UE usage type, per Service type, or per Slice type.

An assignment of one or more packet flows of the UE 1 to a network slice may be performed according to one of the three examples described below. In the first example, the NG System including the NR NB 3 and the NG Core 5 supports a bearer-based transfer using a bearer per QoS class and per PDU session. A bearer in the NG System may be referred to as an NG-EPS-bearer and a radio access bearer in the NG System may be referred to as an NG-RAB. In the first example, each bearer is assigned to a network slice. In some implementations, the Common NFs 51 communicates with a Slice specific User-plane NF(s) (SUNF(s)) of the network slice selected for the UE 1 and sets up a bearer for the UE 1 in this SUNF(s).

In the second example, similarly to the first example, the NG System including the NR NB 3 and the NG Core 5 supports a bearer-based transfer using a bearer per QoS class and per PDU session. A bearer in the NG System can be used for transfer of a plurality of packet flows (e.g., PDU flows). In the second example, the NG System is configured to distinguish between data flows (e.g., PDU flows) in the bearer to perform QoS handling (e.g., discard of packets) on a per-data-flow basis (e.g., on a per-PDU-flow basis). In the second example, each packet flow (e.g., PDU flow) of the UE 1 is assigned to a network slice on a per-flow basis (e.g., on a per-PDU-flow basis).

In the third example, the NG System including the NR NB 3 and the NG Core 5 supports a flow-based transfer of user data. In the third example, network slicing is configured per PDU session of the UE 1. In other words, a set of the packet flows (e.g., PDU flows) included in one PDU session is collectively assigned to a network slices.

In Step 801, the UE 1 has been handed over from the source LTE eNB 2 to the target NR NB 3 and is in a connected state (i.e., RRC_Connected) in a cell of the target NR NB 3. The UE 1 sends network slice assistance information to the target NR NB 3. As already described, the network slice assistance information may indicate, for example, a type of the UE 1, a service that the UE 1 desires, acceptable latency of the UE 1, or any combination thereof. This network slice assistance information may be NAS information, and may be included in a measurement report sent from the UE 1 to the LTE eNB 2. The UE 1 may use an RRC Connection Reconfiguration Complete message (e.g., Step 206 in FIG. 2A), a UL Information Transfer message, or another RRC message to transmit the network slice assistance information. Alternatively, the transmission of the network slice assistance information by the UE 1 may be omitted.

Step 802 corresponds to Step 207 in FIG. 2B. That is, the target NR NB 3 sends an NR Path Switch Request message to the NG Core 5. This NR Path Switch Request message includes an EPS Radio Access Bearer (E-RAB) QoS information element (IE). The E-RAB QoS IE indicates QoS (e.g., QoS class identifier (QCI), Allocation and retention priority (ARP)) of the E-RAB of the UE 1. This NR Path Switch Request message may further contain network slice assistance information (step 801) sent from the NAS layer of the UE 1.

In Step 803, if necessary, the Common NFs 51 perform authentication of the UE 1. This authentication includes confirming of a slice allowed (or authorized) to the UE 1 (slice authorization). In the slice authorization, the Common NFs 51 may decide/determine for each slice whether the UE 1 is allowed.

In Step 804, the Common NFs 51 select a slice. In other words, the Common NFs 51 select a network slice to be associated with the UE 1. In the example shown in FIG. 8, the Common NFs 51 select the slice A for the UE 1. The slice selection in Step 804 may be performed per ongoing service performed by the UE 1 or per service requested by the UE 1 (e.g., EPS bearer/E-RAB, IP flow). As already described, the slice selection in Step 804 may be performed by an SSF located separately from the Common NFs 51.

Step 805 corresponds to Step 208 in FIG. 2B. The Common NFs 51 communicate with UP NFs (i.e., NFs for slice-A 52) of the slice selected for the UE 1 (in this example, the slice A) to create a bearer-less session in the selected slice. Note that, when the NG System supports a bearer-based transfer of user data and when the relocation of the transfer node is not needed, the Common NFs 51 may perform a bearer modification procedure instead of the session creation procedure.

Step 806 corresponds to Step 209 in FIG. 2B. The Common NFs 51 send an NR Path Switch Request Acknowledge message to the target NR NB 3. CP NFs (e.g., NFs for slice-A 52) of the selected slice may send the NR Path Switch Request Acknowledge message to the target NR NB 3 on behalf of the Common NFs 51.

This NR Path Switch Request Acknowledge message in Step 806 includes information about a network slice selected by the Common NFs 51 (or the SSF) (i.e., a Slice Information information element (IE)). The Slice Information IE may contain, for example, an NSI ID indicating the selected network slice, NF IDs indicating the selected network functions (NFs), or a multi-dimensional descriptor (MDD), or any combination thereof. The MDD can be provided by the UE in an RRC signaling layer and an NAS signaling layer. The MDD represents a Tenant ID and a Service Descriptor/slice type. The service descriptor/slice type indicates a service or a use case (e.g., eMBB, mMTC, URLLC, or critical communications (CriC)) associated with the UE 1 or with the selected network slice.

Step 807 corresponds to Step 210 in FIG. 2B. The target NR NB 3 sends an NR DL Information Transfer message carrying the slice information IE received from the NG Core 5 to the UE 1.

Figure 9A:
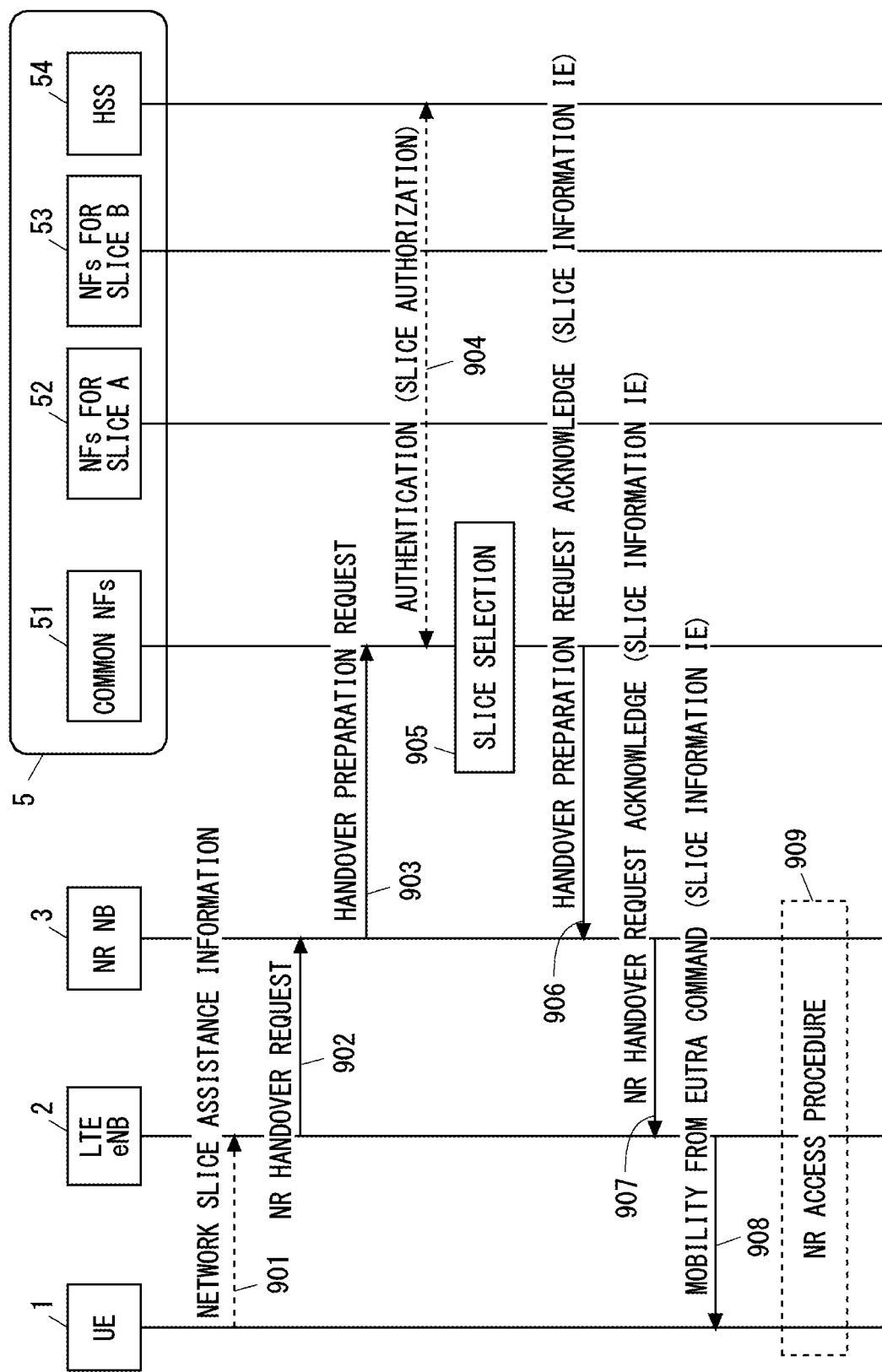
FIG. 9A is a sequence diagram showing an example of an inter-RAT handover procedure form an LTE System to an NG System according to the second embodiment.
Figure 9B:
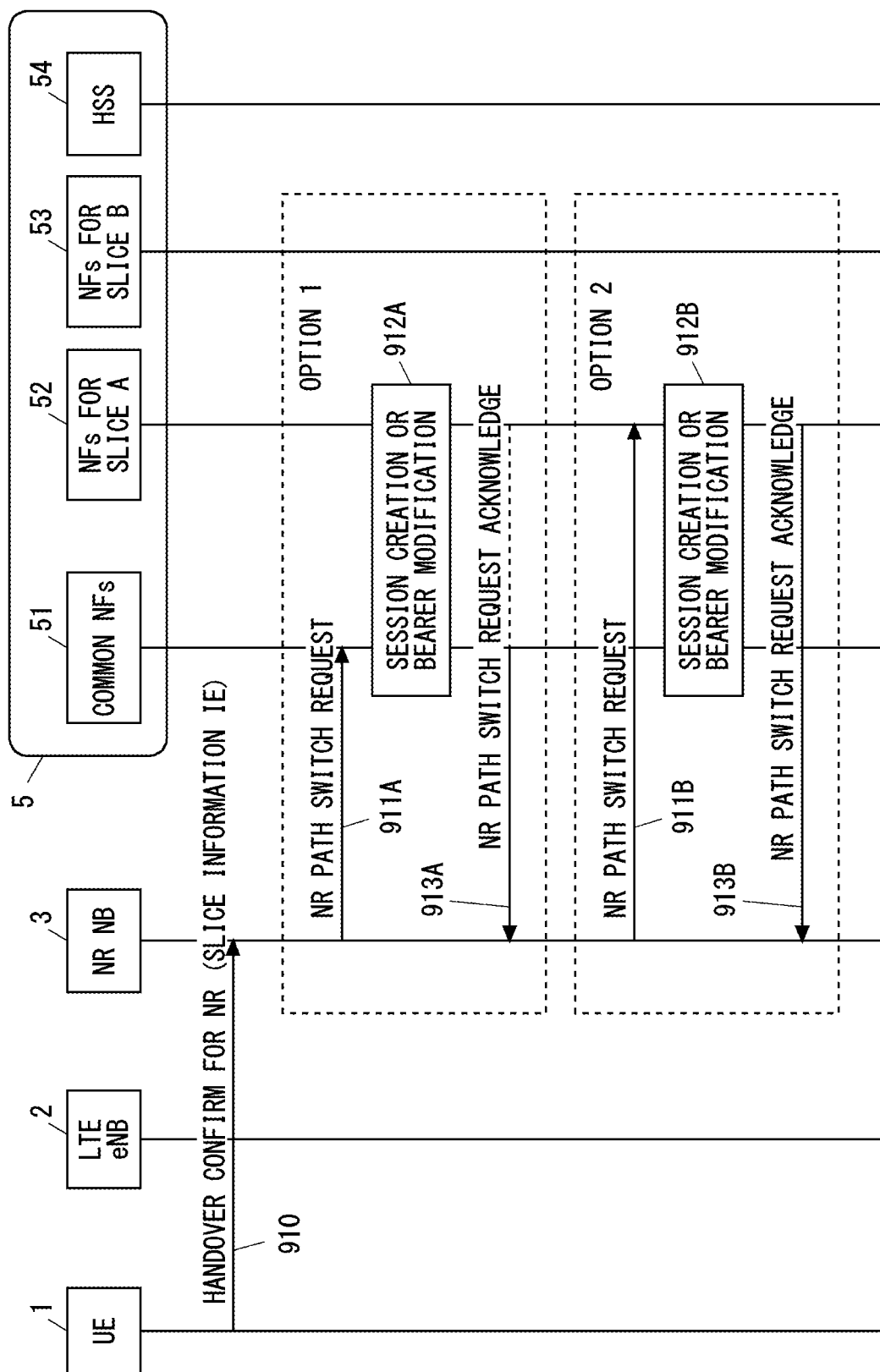
FIG. 9B is a sequence diagram showing an example of the inter-RAT handover procedure form the LTE System to the NG System according to the second embodiment.

FIGS. 9A and 9B is an example of a procedure for handing over the UE 1 from the LTE System to the NG System in the configuration example of the radio communication network shown in FIG. 1. The handover procedure shown in FIGS. 9A and 9B provides details and modifications to the handover procedure shown in FIGS. 3A and 3B. Specifically, FIGS. 9A and 9B show a configuration in the NG Core 5 and a selection of a network slice performed by the NG Core 5 in a concrete manner. Differences between the procedure shown in FIG. 8 and that shown in FIG. 9A and FIG. 9B are mainly described below.

In Step 901, the UE 1 is connected to the LTE eNB 2 and is in a connected state (i.e., RRC_Connected). The UE 1 sends network slice assistance information to the LTE eNB 2. The UE 1 may use an RRC Connection Reconfiguration Complete message, a UL Information Transfer message, or another RRC message to transmit the network slice assistance information.

Step 902 corresponds to Step 302 in FIG. 3A. That is, the source LTE eNB 3 sends an NR Handover Request message to the target NR NB 3. This NR Handover Request message includes an E-RAB QoS IE. The E-RAB QoS IE indicates QoS (e.g., QoS class identifier (QCI), Allocation and retention priority (ARP)) of the E-RAB of the UE 1. The NR Handover Request message may further include network slice assistance information (step 901) sent from the NAS layer of UE 1.

Step 903 corresponds to Step 303 in FIG. 3A. That is, the target NR NB 3 sends a Handover Preparation Request message to the NG Core 5. This Handover Preparation Request message includes the E-RAB QoS IE received from the source LTE eNB 2. This Handover Preparation Request message may further include the network slice assistance information (step 801) received from the source LTE eNB 2.

Processes in Steps 904 and 905 are similar to those in Steps 803 and 804 in FIG. 8. Step 906 corresponds to Step 304 in FIG. 3A. That is, the Common NFs 51 send a Handover Preparation Request Acknowledge message to the target NR NB 3. This Handover Preparation Request Acknowledge message includes information (i.e., the slice information IE) about a network slice selected by the Common NFs 51 (or SSF).

Step 907 corresponds to Step 305 in FIG. 3A. That is, the target NR NB 3 sends an NR Handover Request Acknowledge message to the source LTE eNB 2. A transparent container contained in this NR Handover Request Acknowledge message may include the slice information IE sent from the Common NFs 51.

Step 908 corresponds to Step 306 in FIG. 3A. That is, the source LTE eNB 3 sends, to the UE 1, a Radio Resource Control (RRC) message containing a Handover Command message including the transparent container generated by the target NR NB 3. This RRC message may be, for example, a Mobility from EUTRA command message or an RRC Connection Reconfiguration message. As described above, the transparent container sent to the UE 1 may include a slice information IE.

Steps 909 and 910 correspond to Steps 307 and 308 in FIG. 3A. That is, the UE 1 performs a handover to the target NR NB 3 (step 309) and sends an NR Handover Confirm for NR message to the target NR NB 3 (step 910). The message in Step 910 may be an NR RRC Connection Reconfiguration Complete message. The message in Step 910 may include a slice information IE. This slice information IE includes an identifier (e.g., NSI-ID, NF IDs, or MDD) for identifying the network slice selected for the UE 1. The slice information IE may be NAS information or RRC information.

In the handover completion phase, either of an Option 1 (i.e., steps 911A, 912A and 913A) or an Option 2 (i.e., steps 911B, 912B and 913B) shown in FIG. 9B is performed.

In the Option 1, the target NR NB 3 sends an NR Path Switch Request message to the Common NFs 51 (step 911A). This NR Path Switch Request message may include the slice information IE. Step 911A corresponds to Step 310 in FIG. 3B.

Step 912A corresponds to Step 311 in FIG. 3B. The Common NFs 51 communicate with UP NFs (i.e., NFs for slice-A 52) of the slice selected for the UE 1 (in this example, the slice A) to create a bearer-less session in the selected slice. When the NG System supports a bearer-based transfer of user data and when the relocation of the transfer node is not needed, the Common NFs 51 may perform a bearer modification procedure instead of the session creation procedure.

Step 913A corresponds to Step 312 in FIG. 3B. The Common NFs 51 send an NR Path Switch Request Acknowledge message to the target NR NB 3. On behalf of the Common NFs 51, CP NFs within the selected slice (i.e., NFs for slice-A 52) may send the NR Path Switch Request Acknowledge message to the target NR NB 3.

In contrast, in the Option 2, the target NR NB 3 determines a network slice selected for the UE 1 (i.e., the slice A) and sends an NR Path Switch Request Acknowledge message to the CP NFs within the NFs for slice-A 52 corresponding to the slice A (step 911B). In some implementations, the target NR NB 3 may use the slice information IE received from the UE 1 in Step 910 in order to determine the network slice selected for the UE 1. Alternatively, the target NR NB 3 may store, in association with a context of the UE 1, the slice information IE received from the NG Core 5 in Step 907, and may use this stored slice information IE for the determination in Step 911B.

Step 912B corresponds to Step 311 in FIG. 3B. The CP NFs within the NFs for slice-A 52 communicate with UP NFs of the NFs for slice-A 52 in order to create a bearer-less session. When the NG System supports a bearer-based transfer of user data and when the relocation of the transfer node is not needed, the NFs for slice-A 52 may perform a bearer modification procedure instead of the session creation procedure. If necessary, the NFs for slice-A 52 may communicate with the Common NFs 51.

Step 913B corresponds to Step 312 in FIG. 3B. The CP NFs within the NFs for slice-A 52 send an NR Path Switch Request Acknowledge message to the target NR NB 3.

According to the handover procedure from the LTE System to the NG System in accordance with this embodiment, the NG Core 5 can provide the Target NR NB 3 with information (e.g., NSI-ID, MDD, NFIDs) regarding a network slice that has been selected for the UE 1 by the Common NFs 51. Accordingly, for example, the target NR NB 3 can recognize the network slice selected for the UE 1. Additionally or alternatively, for example, the target NR NB 3 can use this information regarding the network slice selected for the UE 1 by the Common NFs 51, to generate or derive information or parameters to be included in a Handover Command (i.e., transparent container (RRCConnectionReconfiguration)) and to be sent to the UE 1.

Third Embodiment

Figure 10A:
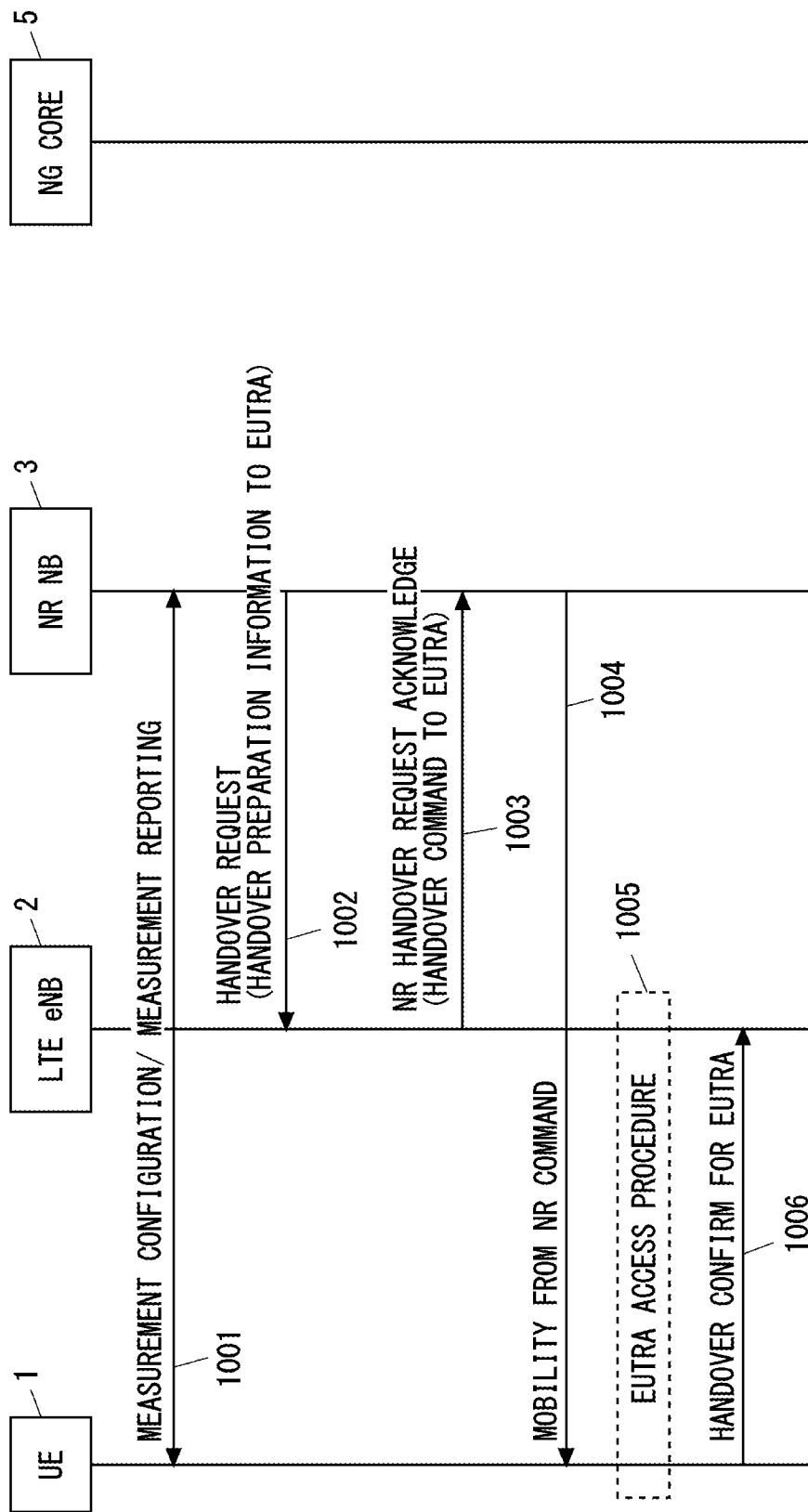
FIG. 10A is a sequence diagram showing an example of an inter-RAT handover procedure form an NG System to an LTE System according to a third embodiment.
Figure 10B:
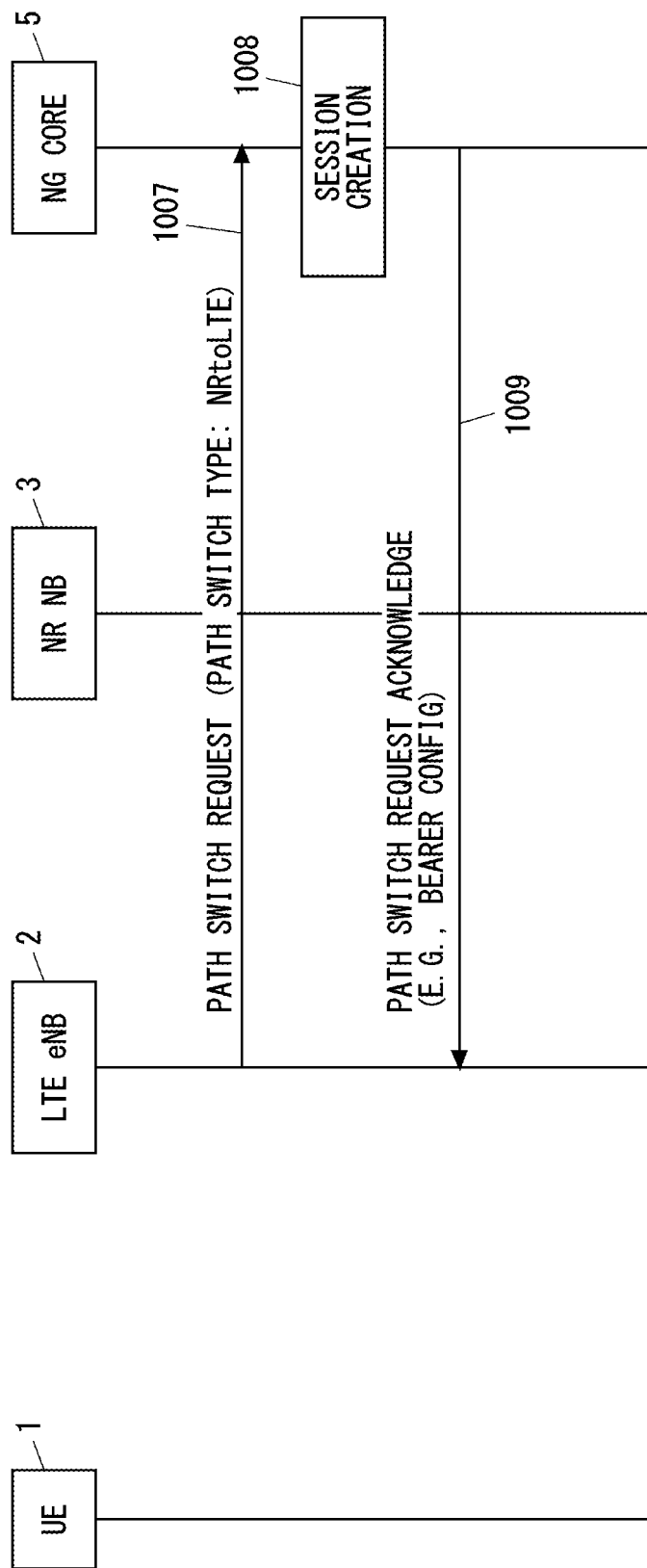
FIG. 10B is a sequence diagram showing an example of the inter-RAT handover procedure form the NG System to the LTE System according to the third embodiment.

This embodiment provides a method for handing over the UE 1 from an NG System to an LTE System. FIGS. 10A and 10B show an example of a procedure for handing over the UE 1 from the NG System to the LTE System in the configuration example of the radio communication network shown in FIG. 1. FIG. 10A shows a handover preparation phase and a handover execution phase, while FIG. 10B shows a handover completion phase.

The procedure shown in FIGS. 10A and 10B resembles the "X2-based handover" in LTE in that it involves transfer of handover signaling messages on the direct inter-base-station interface 101 (e.g., X3 interface) (i.e., steps 1002 and 1003) during the handover preparation phase. However, if only transfer of handover signaling messages on the direct inter-base-station interface 101 is performed, there is not enough information needed for a relocation of the UE 1 from the NG system to the LTE system. In the procedure shown in FIGS. 12A and 12B, the handover completion phase is improved to include signaling (i.e., steps 1007 and 1008) between the LTE eNB 2 and the NG Core 5 to acquire information needed for the relocation of the UE 1 from the NG system to the LTE system.

In Step 1001, the UE 1 is connected to the NR NB 3 and is in connected state (e.g., RRC_Connected). The UE 1 receives a Measurement Configuration from the NR NB 3, performs neighbor cell measurements and inter-RAT measurements including measurements of NG-RAN cells and E-UTRAN (LTE) cells according to the received measurement configuration, and sends a measurement report to the NR NB 3.

In Step 1002, the NR NB 3 determines inter-RAT handover to a cell of the LTE eNB 2. Upon determining the Inter-RAT handover, the NR NB 3 sends a Handover Request message to the target LTE eNB 2 on the direct inter-base-station interface 101.

The Handover Request message in Step 1002 may contain a Handover Type Information Element (IE) indicating a handover from NR to LTE. For example, the Handover Type IE is set to "NRtoLTE".

The Handover Request message in Step 1002 may further indicate an identifier(s) and QoS parameters (e.g., QCI, ARP) of a flow(s) (e.g., PDU flow(s)) or bearer(s) of the UE 1 to be handed over.

The Handover Request message in Step 1002 may further contain a "Handover Preparation Information To EUTRA" information element (IE). The "Handover preparation information to EUTRA" IE may include security-related information. The security-related information includes security parameters to be used by the target LTE eNB 2 to derive an Access Stratum (AS) security key. These security parameters include a base key (i.e., $K_{eNB}$ of LTE) for deriving a security key (or a temporary key) used by the AS layer, or include parameters (e.g., {NH, NCC} pair) for deriving this base key. These security parameters may further include UE security capabilities regarding the LTE RAT or the LTE System. The UE security capabilities indicate ciphering and integrity protection algorithms implemented in the UE 1.

For example, similarly to the existing X2 handover procedure, the source NR NB 3 may derive $K_{eNB}^*$ from an unused {NH, NCC} pair according to a vertical key derivation algorithm and send a {$K_{eNB}^*$, NCC} pair to the target LTE eNB 2. Alternatively, the source NR NB 3 may derive $K_{eNB}^*$ from the current $K_{eNB}$ according to a horizontal key derivation algorithm and send a {$K_{eNB}^*$, NCC} pair to the target LTE eNB 2.

In Step 1003, the target LTE eNB 2 generates a UE context and allocates resources based on the Handover Request message. When the NR Handover Request message in Step 1003 includes security-related information, the target NR NB 3 may operate as follows. As described above, the security-related information includes security parameters for AS security. The target NR NB 3 may select an AS security algorithm based on the UE security capabilities included in the security parameters. The AS security algorithm includes a ciphering algorithm for Radio Resource Control (RRC) and User Plane (UP), and also includes an integrity protection algorithm for RRC. Further, the target NR NB 3 may derive temporary keys for RRC ciphering (or encryption), UP ciphering (or encryption), and RRC integrity protection from a base key (i.e., $K_{eNB}$ of LTE) obtained from the security parameters by using the selected security algorithm.

The target LTE eNB 2 generates a Target To Source Transparent Container (e.g., RRCConnectionReconfiguration) to be sent to the UE 1. This Target To Source Transparent Container includes, for example, a HandoverCommand message (e.g., Handover Command To EUTRA) containing an RRCConnectionRecofiguration message and other RRC messages. The target LTE eNB 2 then generates, as a response to the handover request, an acknowledgement response (e.g., NR Handover Request Acknowledge) message containing this Target To Source Transparent Container. The target LTE eNB 2 sends the NR Handover Request Acknowledge message to the source NR NB 3 on the direct inter-base-station interface 101. The Target To Source Transparent Container contains, for example, radio resource configuration information (e.g., radio parameters) set up by the target LTE eNB 2, an identifier of an AS security algorithm selected by the target NR NB 3, and an NCC value.

The Handover Request Acknowledge message may further contain a list of bearers that are subject to downlink data forwarding (e.g., bearers subject to data forwarding list).

The "Bearers Subject to Data forwarding list" IE includes, for example, an address(es) and a TEID(s) for user traffic data forwarding, and an identifier(s) of a flow(s) (e.g., PDU flow(s)) that is subject to data forwarding. The address(es) and a TEID(s) for user traffic data forwarding may be an address(es) and a TEID(s) for the target NR NB 3 on the direct inter-base-station interface 101. The source NR NB 3 starts data forwarding for the bearer(s) or flow(s) (e.g., PDU flow(s)) designated by the "Bearers Subject to Data forwarding list" IE.

In Step 1004, the source NR NB 3 sends, to the UE 1, a Radio Resource Control (RRC) message containing a Handover Command message including the transparent container generated by the target LTE eNB 2. This RRC message may be, for example, a Mobility from NR command message or an RRC Connection Reconfiguration message.

In Step 1005, in response to receiving the RRC message containing the Handover Command message, the UE 1 moves to a target RAN (i.e., E-UTRAN) and performs a handover according to the transparent container (e.g., the radio resource configuration information, the AS security algorithm, and the NCC value) provided by the Handover Command message. That is, the UE 1 establishes a radio connection with the target LTE eNB 2 associated with the LTE System. In Step 1006, after successfully synchronizing to the target cell, the UE 1 sends a Handover Confirm for EUTRA message to the target LTE eNB 2. The message in Step 1006 may be an RRC Connection Reconfiguration Complete message.

In Step 1007, when the UE 1 has successfully accessed the target LTE eNB 2, the target LTE eNB 2 sends a Path Switch Request message to the NG Core 5 in order to notify the NG Core 5 that the UE 1 has changed its cell and to request a path switch. This Path Switch Request message may include a list of EPS bearers (or PDU flows) of the UE 1, which have been switched to the cell of the target LTE eNB 2.

In Step 1008, a control node (e.g., MME) in the NG Core 5 performs a procedure for creating a bearer-based session. Specifically, the control node determines that the packet transfer node (or gateway) for the UE 1 needs to be relocated and selects a target transfer node (i.e., S-GW) in the NG Core 5. The control node sends a Create Session Request message to the target S-GW. This Create Session Request message may include information (e.g., SDF templates, or Traffic Flow Templates (TFTs)) for identifying one or more service data flows associated with each PDU flow context. The target S-GW allocates its local resources and sends a Create Session Response message to the control node.

In Step 1009, the NG Core 5 sends a Path Switch Request Acknowledge message to the target LTE eNB2. This Path Switch Request Acknowledge message includes bearer configuration information. The bearer configuration information includes an address and an uplink (UL) tunnel end point identifier (TEID) of the transfer node (after the relocation) in the NG Core 5.

Note that, when the NG System supports a bearer-based transfer of user data and when the relocation of the transfer node is not needed, the control node in the NG Core 5 may perform a bearer modification procedure in Step 1008 instead of the session creation procedure.

Figure 11A:
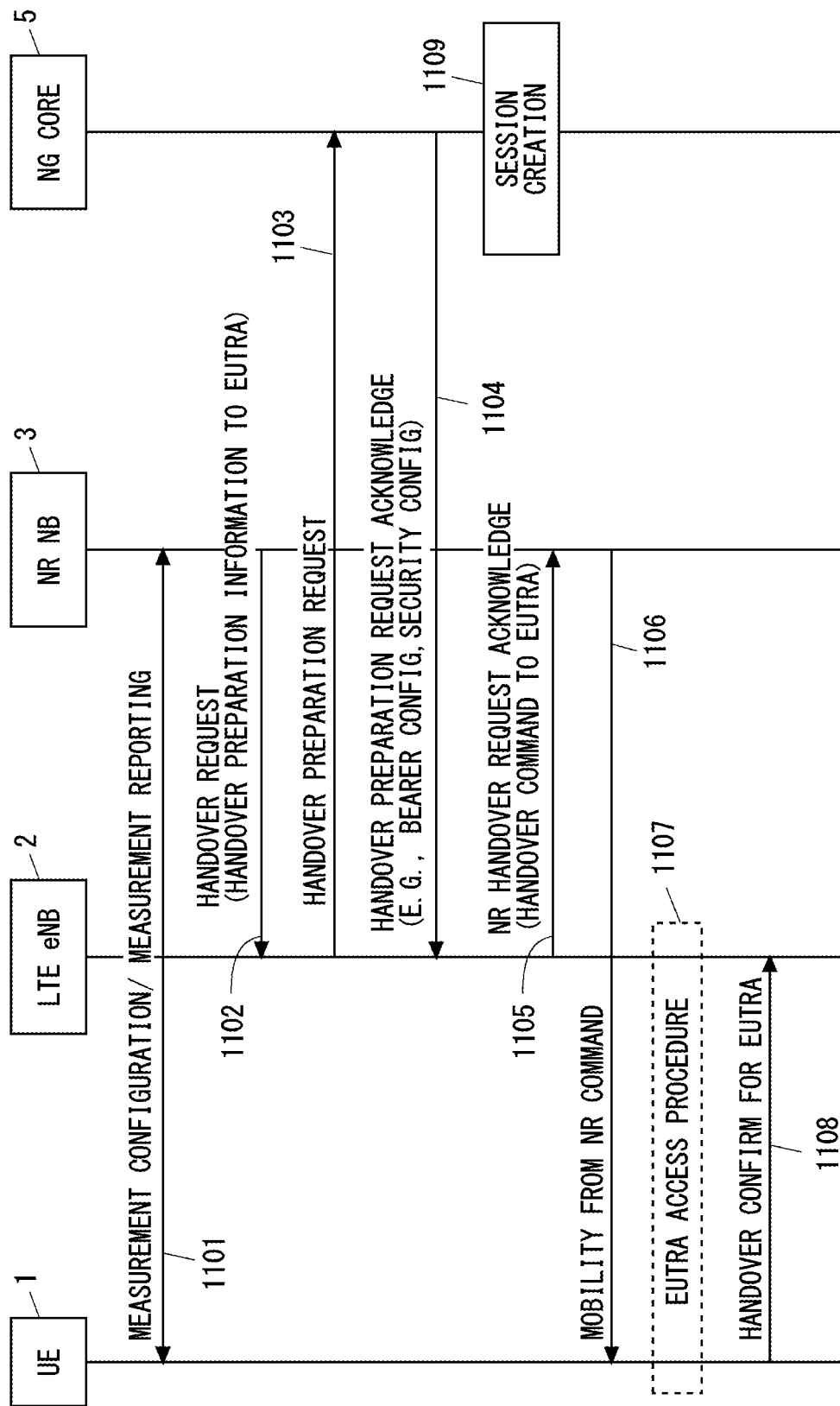
FIG. 11A is a sequence diagram showing an example of an inter-RAT handover procedure form an NG System to an LTE System according to the third embodiment.
Figure 11B:
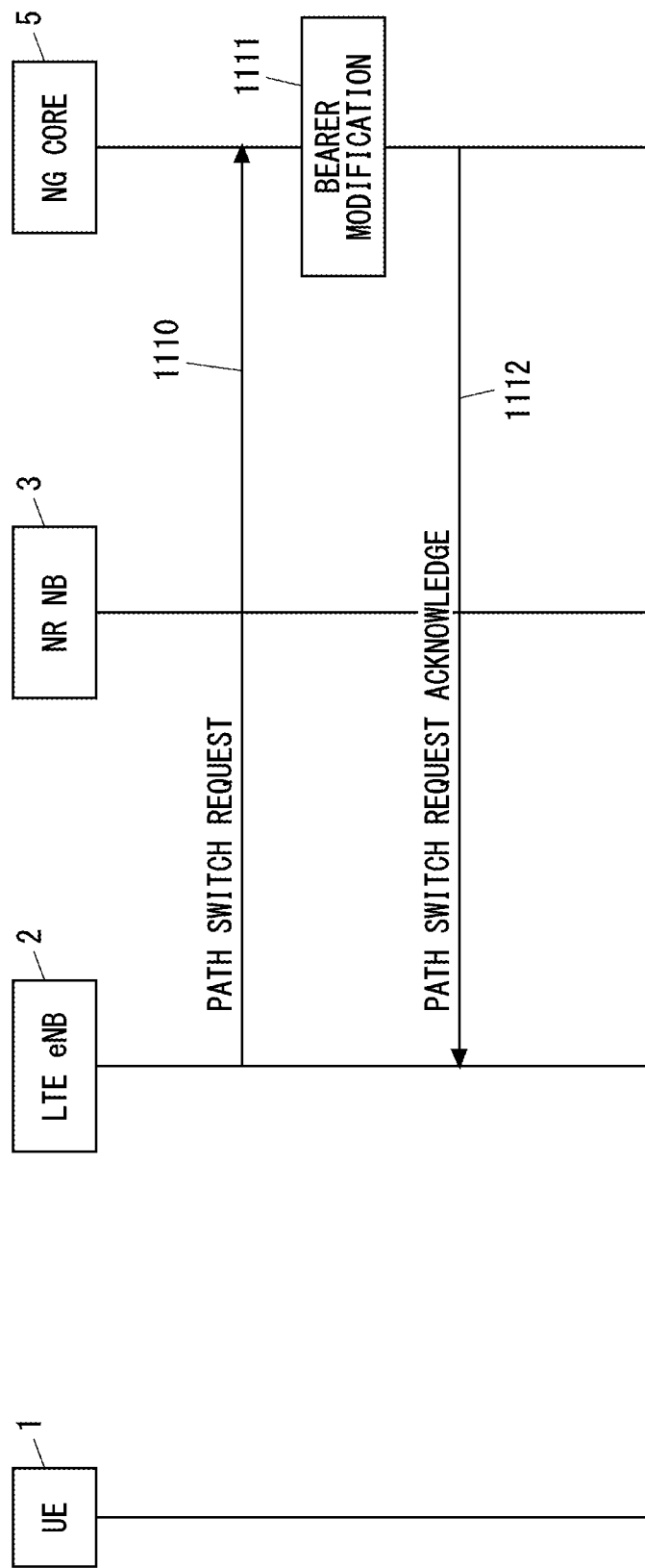
FIG. 11B is a sequence diagram showing an example of the inter-RAT handover procedure form the NG System to the LTE System according to the third embodiment.

FIGS. 11A and 11B show an example of a procedure for handing over the UE 1 from an NG System to an LTE System in the configuration example of the radio communication network shown in FIG. 1. FIG. 11A shows a handover preparation phase and a handover execution phase, while FIG. 11B shows a handover completion phase. In the previously-described procedure shown in FIGS. 10A and 10B, the target LTE eNB 2 receives the bearer configuration information from the NG Core 5 in the handover completion phase (step 1009), which is performed after the UE 1 has been connected to the target LTE eNB 2. In contrast, in the procedure shown in FIGS. 11A and 11B, the target LTE eNB 2 receives bearer configuration information from the NG Core 5 in the handover preparation phase (step 1104), which is performed before the NR NB 3 issues an instruction for a handover to the UE 1. This difference is mainly described below.

Processes in Steps 1101 and 1102 are similar to those in Steps 1001 and 1002 in FIG. 10A. In Step 1103, the target LTE eNB 2 sends a Handover Preparation Request message to the NG Core 5 in response to receiving the Handover Request message (step 1102).

The Handover Preparation Request message in Step 1103 may contain a handover type information element (IE) indicating a handover from NR to LTE. For example, the Handover Type IE is set to "NRtoLTE". The Handover Preparation Request message may further contain a list of PDU flows of the UE 1 to be switched to a cell of the target LTE eNB 2.

In Step 1104, the NG Core 5 determines, based on the received Handover Preparation Request message, that the type of the handover is an Inter-RAT handover to the LTE System. The NG Core 5 then sends, to the target LTE eNB 2, a Handover Preparation Request Acknowledge message containing one or both of core network information and security-related information. The core network information and the security-related information are used by the target LTE eNB 2 to perform a radio resource setting and a security-related setting to communicate with the UE 1 in the LTE system.

In an example, the core network information may include bearer configuration information (e.g., Bearer Config). The bearer configuration information relates to at least one EPS bearer to be configured for the UE 1. The bearer configuration information includes: a bearer identifier (e.g., EPS Bearer Identity and an E-RAB ID); an address and an UL TEID of a transfer node in the NG Core 5; and bearer QoS parameters (e.g., QCI, ARP). This bearer configuration information may indicate mapping between EPS bearers and PDU flows for the UE 1.

Meanwhile, the security-related information includes NAS security configuration information of the LTE System. The NAS security configuration information includes, for example, a NAS security algorithm including ciphering and integrity protection. The NAS security configuration information may be an NAS Security Transparent Container IE. That is, the NAS security configuration information (NAS Security Transparent Container IE) is sent from the target LTE eNB 2 to the UE 1 transparently through the source NR NB 3.

The security-related information further includes security parameters to be used by the target LTE eNB 2 to derive an AS security key. These security parameters include a base key (i.e., $K_{eNB}$ of LTE) for deriving a security key (or a temporary key) used by the AS layer, or include parameters (e.g., {NH, NCC} pair) for deriving this base key. These security parameters may further include UE security capabilities regarding the LTE RAT or the LTE System. The UE security capabilities indicate ciphering and integrity protection algorithms implemented in the UE 1.

In Step 1105, the target LTE eNB 2 generates a UE context and allocates resources based on the Handover Preparation Request Acknowledge message containing one or both of the core network information or the security-related information. When the Handover Preparation Request Acknowledge message includes the security-related information, the target LTE eNB 2 may operate as follows. As described above, the security-related information includes the NAS security configuration information (e.g., NAS Security Transparent Container IE) and the security parameters for AS security. The Target LTE eNB 2 may incorporate the NAS security configuration information (e.g., NAS Security Transparent Container IE) into a transparent container to be sent to the UE 1. Additionally or alternatively, the target LTE eNB 2 may select an AS security algorithm (i.e., a ciphering algorithm for RRC and UP, and an integrity protection algorithm for RRC) based on UE security capabilities included in the security parameters. Further, the target LTE eNB 2 may derive temporary keys for RRC ciphering (or encryption), UP ciphering (or encryption), and RRC integrity protection from a base key (i.e., $K_{eNB}$) obtained from the security parameters by using the selected security algorithm Then, the target LTE eNB 2 generates a transparent container (e.g., RRCConnectionReconfiguration) to be sent to the UE 1 and generates a Handover Command message (e.g., Handover Command to EUTRA message) containing this transparent container. The transparent container contains, for example, radio resource configuration information set up by the target LTE eNB 2, an identifier of the AS security algorithm selected by the LTE eNB 2, and NAS security configuration information. The target LTE eNB 2 sends the Handover Command message to the source NR NB 3 on the direct inter-base-station interface 101.

Processes in Steps 1106 to S 1108 are similar to those in steps 1004 to 1006 in FIG. 10. In Step 1109, the NG Core 5 performs a bearer session creation procedure. In other words, a control node in the NG Core 5 starts a bearer session creation procedure for the UE 1 in response to receiving the Handover Preparation Request message in Step 1103. Specifically, the control node in the NG Core 5 starts an EPS bearer creation procedure for the UE 1 prior to a path switch request from the target LTE eNB 2 (step 1110). The bearer creation in Step 1109 may be performed in a manner similar to that in Step 1008 in FIG. 10.

In Step 1110, the target LTE eNB 2 sends a Path Switch Request message to the NG Core 5. In Step 1111, the control node in the NG Core 5 completes the Inter-RAT handover procedure by performing a bearer modification procedure. For example, the control node in the NG Core 5 may send a Modify Bearer Request message per session (i.e., per PDN connection) to the S-GW. The Modify Bearer Request message may contain a bearer identifier (e.g., EPS Bearer ID), and may contain an address and a downlink (DL) TEID of the target LTE eNB 2. The S-GW may send a Modify Bearer Response message to the control node in the NG Core 5. In Step 1112, the control node in the NG Core 5 sends a Path Switch Request Acknowledge message to the target LTE eNB 2.

The detailed procedure of handover from the NG System to the LTE System according to this embodiment is not limited to the above-described specific examples. For instance, the names of messages in the handover procedure are not limited to those shown in the above-described several examples. In the above-described several examples of the handover procedure, the order of messages may be changed and some of them may be omitted. Further, they may include one or more additional messages.

Fourth Embodiment

This embodiment provides a method for handing over a UE 1 from a source NR NB to a target NR NB within an NG System. In the following description, the handover within the NG system is referred to as an intra-NR handover.

Figure 12:
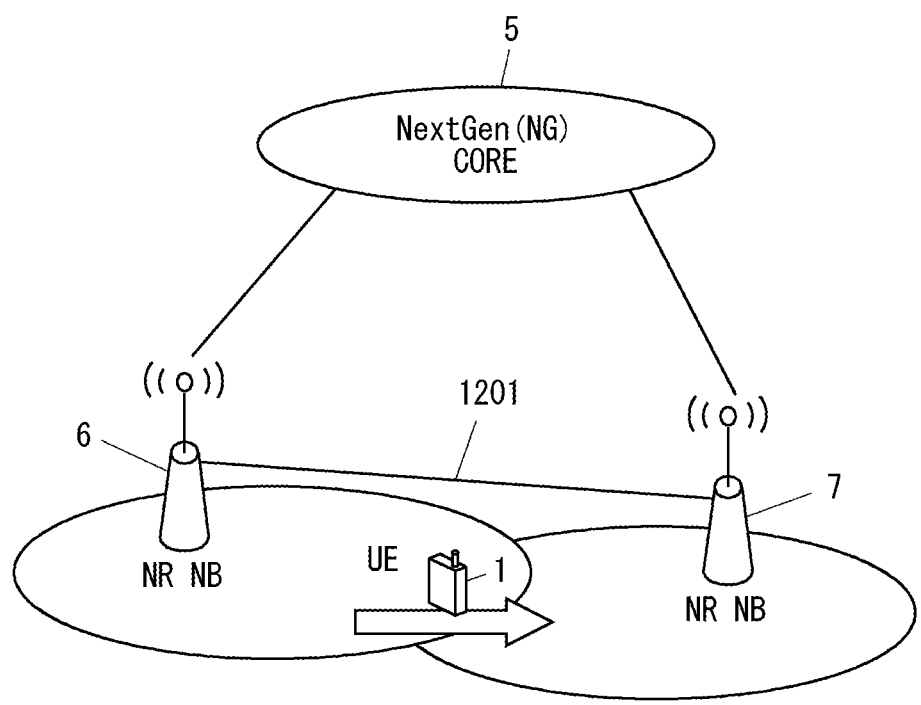
FIG. 12 shows a configuration example of a radio communication network according a fourth embodiment.

FIG. 12 shows a configuration example of a radio communication network according to this embodiment. In the example shown in FIG. 12, the radio communication network includes a UE 1, NR NBs 6 and 7, and an NG Core 5. The NR NB 6 may be, for example, a macro-base station or a pico-base station. Similarly, the NR NB 7 may be a macro-base station or a pico-base station. In the example shown in FIG. 12, the NR NBs 6 and 7 have coverages having similar sizes and the cells of these two NR NBs 6 and 7 partially overlap each other. Alternatively, the radio communication network according to this embodiment may have a Heterogeneous Network (HetNet) structure. For example, the NR NB 6 may be a macro-base station and the NR NB 7 may be a pico-base station, and the macro-cell of the NR NB 6 may completely cover the pico-cell of the NR NB 7. Alternatively, the NR NB 6 may be a pico-base station and the NR NB 7 may be a macro-base station.

The NR NBs 6 and 7 are connected to each other by a direct inter-base-station interface 1201. The direct inter-base-station interface 1201 is used at least for transfer of signaling messages between the NR NB 6 and 7. The direct inter-base-station interface 1201 may also be used for transfer of user packets between the NR NBs 6 and 7. The control-plane protocol structure and user-plane protocol structure of the direct inter-base-station interface 1201 may be similar, for example, to those of the X2 interface between LTE eNBs. The direct inter-base-station interface 1201 is referred to, for example, as an NG X2 interface.

The following provides several examples of the intra-NR handover procedure. The examples described below relate to UE mobility in which the UE 1 in a connected state is handed over from the source NR NB 6 to the target NR NB 7.

Figure 13:
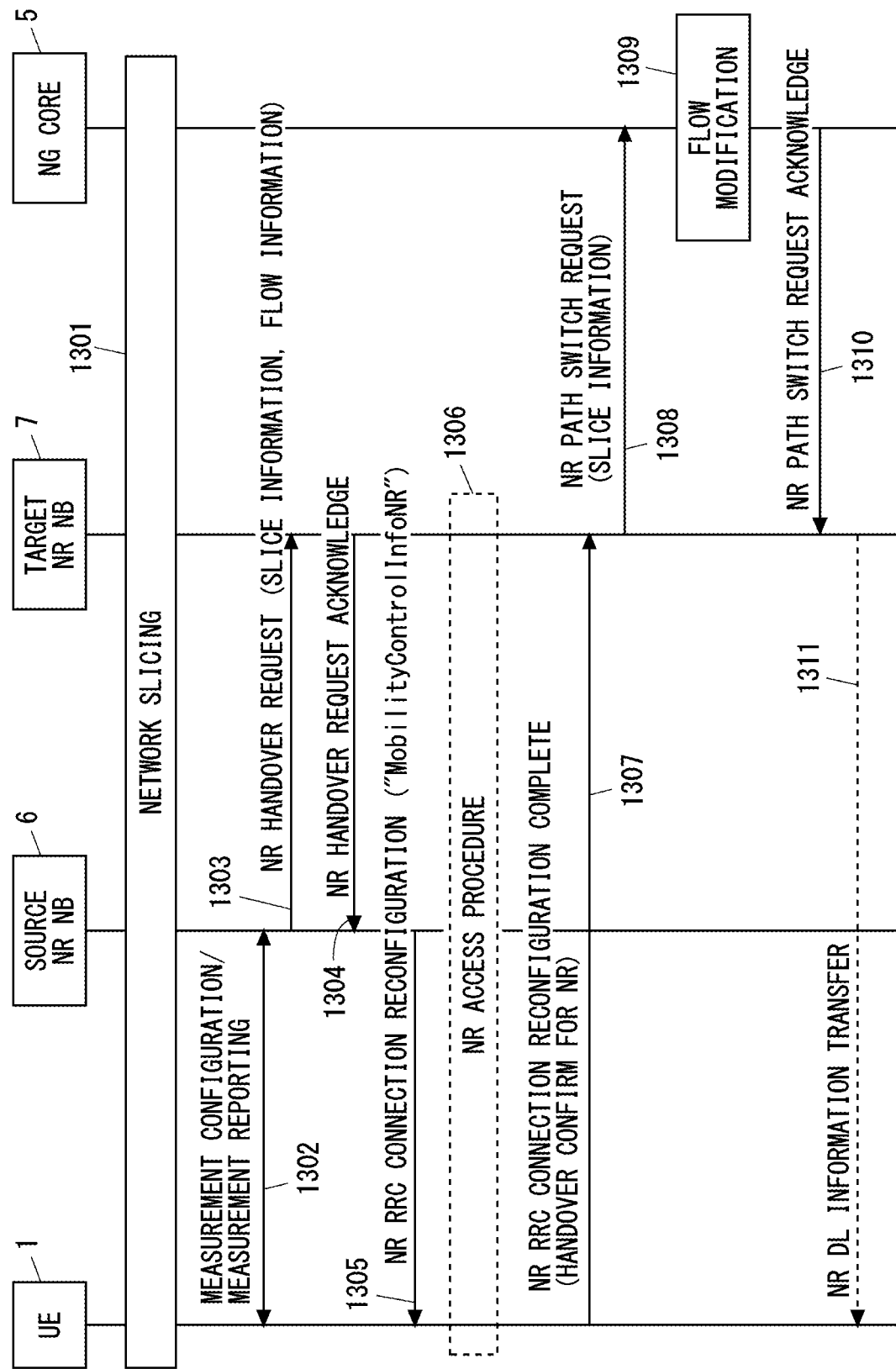
FIG. 13 is a sequence diagram showing an example of the intra-NR handover procedure according to the fourth embodiment.

FIG. 13 shows an example of the intra-NR handover procedure. FIG. 13 shows a case where network slicing is applied to the UE 1 in both of the source cell/source NR NB 6 and the target cell/target NR NB 7. The procedure shown in FIG. 13 resembles the "X2-based handover" in LTE in that it involves transfer of handover signaling messages on the direct inter-base-station interface 101 (i.e., steps 1303 and 1304) during the handover preparation phase.

In Step 1301, the UE 1 is connected to the source NR NB 6 and is in a connected state (i.e., RRC_Connected). Network slicing is applied to the UE 1 in the source cell/source NR NB 6. In Step 1302, the UE 1 receives a Measurement Configuration form the NR NB 6, performs neighbor cell measurements according to the measurement configuration, and sends a measurement report to the NR NB 6.

In Step 1303, the NR NB 6 determines an intra-NR handover to a cell of the NR NB 7. Upon determining the intra-NR handover, the source NR NB 6 sends an NR Handover Request message to the target NR NB 7 on the direct inter-base-station interface 1201.

The NR Handover Request message in Step 1303 may contain a list of packet flows (i.e., PDU flows) or bearers (i.e., radio access bearers) of the UE 1 to be set up in the target NR NB 7 (e.g., PDU-Flows To Be Setup List). This list indicates flow information about each packet flow. This flow information includes: a flow identifier (e.g., PDU flow ID); address and uplink (UL) Session Endpoint Identifier (SEID) of a transfer node in the NG Core 5; and a flow QoS parameter.

The NR Handover Request message in Step 1303 may contain slice information. This slice information relates to one or more network slices which the UE 1 has connected to (or is using) in the source cell/source NR NB 6. The slice information enables the target NR NB 7 to recognize one or more network slices to which the UE 1 is connected. For example, the slice information may indicate an identifier (e.g., NSI-ID, NF IDs, MDD) of each network slice to which the UE 1 is connected. Additionally or alternatively, the slice information may indicate a UE identifier assigned to the UE 1 by CP NFs (or a control node corresponding to an MME) associated with each network slice. This UE identifier may be an identifier corresponding to an MME UE S1AP ID in LTE. When the UE 1 is connected to a plurality of network slices, a plurality of UE identifiers corresponding to the respective network slices may be assigned to the UE 1.

In Step 1304, the target NR NB 7 generates a UE context and allocates resources based on the NR Handover Request message. The target NR NB 7 may determine admitted PDU Flows based on the received flow information (e.g., PDU-Flows To Be Setup List). Based on the received slice information, the target NR NB 7 may recognize one or more network slices to which the UE 1 is connected and recognize the CP NFs (or the control node corresponding to the MME) of each network slice.

Then, the target NR NB 7 generates a transparent container (e.g., RRCConnectionReconfiguration) to be sent to the UE 1 and generates an NR Handover Request Acknowledge message (Handover Command to NR message) containing this transparent container. The target NR NB 7 sends the NR Handover Request Acknowledge message to the source NR NB 6 on the direct inter-base-station interface 1201. The Transparent container includes, for example, radio resource configuration information set up by the target NR NB 7. The NR Handover Request Acknowledge message may further contain the above-described "PDU-flows Admitted list" information element (IE). The source LTE eNB 2 starts data forwarding for the flow(s) (e.g., PDU flow(s)) specified by the "PDU-flows Admitted list" IE.

In Step 1305, the source NR NB 6 sends an NR RRC Connection Reconfiguration message to the UE 1. This RRC Connection Reconfiguration message includes a "Mobility-ControlInfoNR" IE. The "MobilityControlInfoNR" IE is generated by the target NR NB 7 and provides the UE 1 with configurations and information needed to access the target cell/target NR NB 7.

In Step 1306, the UE 1 moves from the source cell/source NR NB 6 to the target cell/target NR NB 7 in response to receiving the NR RRC Connection Reconfiguration message. In Step 1307, after successfully synchronizing to the target cell, the UE 1 sends to the target NR NB 7 an NR RRC Connection Reconfiguration Complete message containing a Handover Confirm for NR message. The Handover Confirm for NR message or the NR RRC Connection Reconfiguration Complete message may contain network slice assistance information or slice configuration information.

In Step 1308, when the UE 1 has successfully accessed the target NR NB 7, the target NR NB 7 sends an NR Path Switch Request message to the NG Core 5 in order to notify the NG Core 5 that the UE 1 has changed its cell and to request a path switch. This NR Path Switch Request message may contain a list of bearers (i.e., E-RABs) or packet flows (i.e., PDU flows) of the UE 1, which have been switched to the cell of the target NR NB 7. More specifically, the NR Path Switch Request message may contain an "E-RAB/Flow to be switched in Downlink (DL) List" IE. The NR Path Switch Request message in Step 1308 may contain slice information. The slice information indicates one or more network slices which the UE 1 desires to connect to (or use) in the target cell/target NR NB 7.

In Step 1309, the NG Core 5 performs a flow modification procedure. For example, a control node in the NG Core 5 may send a Modify Flow Request message per session (i.e., per PDU session) to a transfer node in the NG Core 5. This Modify Flow Request message may contain a flow identifier (e.g., PDU flow ID), and also contain an address and a downlink (DL) session endpoint identifier (SEID) of the target NR NB 3. The session endpoint identifier (SEID) may be, for example, a Tunnel Endpoint Identifier (TEID). The transfer node in the NG Core 5 may send a Modify Flow Response message to the control node in the NG Core 5.

In Step 1310, the control node in the NG Core 5 sends an NR Path Switch Request Acknowledge message to the target NR NB 3. When the NG Core 5 changes an uplink termination point of a tunnel, this NR Path Switch Request Acknowledge message may contain an "E-RAB/Flow to be switched in Uplink (UL) List" IE. The "E-RAB/Flow to be switched in UL List" IE indicates a new uplink transport layer address and a new end point identifier for each bearer (i.e., E-RAB) or each flow (i.e., PDU flow). When the NG System supports a bearer-based transfer of user data, the control node in the NG Core 5 may perform a bearer modification procedure instead of the session creation procedure in Step 1310.

In response to receiving the NR Path Switch Request in Step 1308, the control node in the NG Core 5 may determine to change the network slice(s) for the UE 1 or determine that no network slice is allowed for the UE 1. Accordingly, the NR Path Switch Request Acknowledge message in Step 1310 may contain a slice information IE indicating the changed network slice for the UE 1. Alternatively, the NR Path Switch Request Acknowledge message in Step 1310 may indicate that no network slice is allowed for the UE 1.

In Step 1311, the target NR NB 3 may send to the UE 1 an NR DL Information Transfer message carrying NAS information (e.g., Slice Information IE) received from the NG Core 5.

Figure 14:
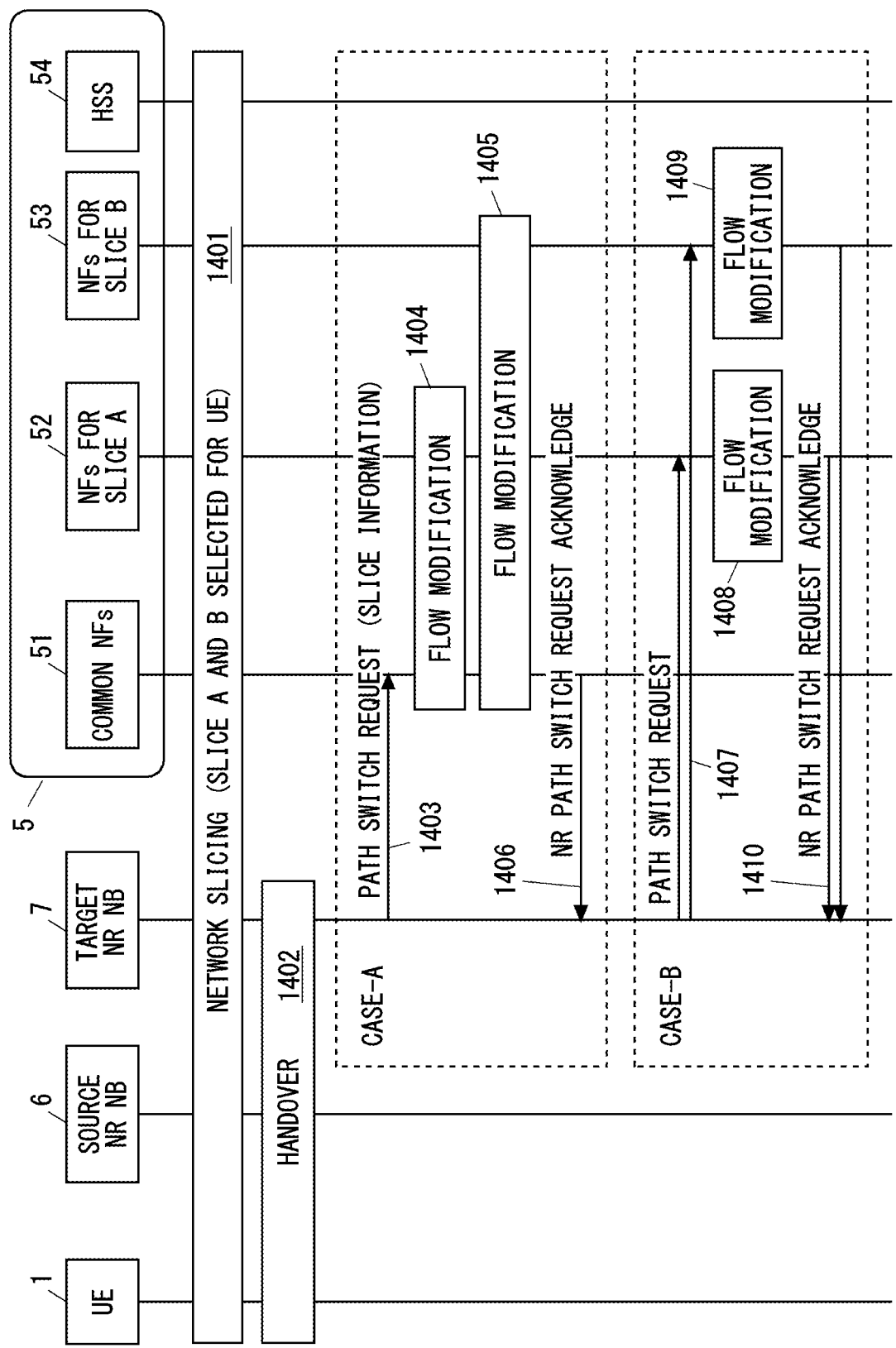
FIG. 14 is a sequence diagram showing an example of the intra-NR handover procedure according to the fourth embodiment.

FIG. 14 shows an example of the intra-NR handover procedure. The handover procedure shown in FIG. 14 provides details and modifications to the handover procedure shown in FIG. 13, and describes the configuration and the signaling in the NG Core 5 in a detailed manner. The specific configuration of the NG Core 5 shown in FIG. 14 is similar to that shown in FIG. 8. Specifically, the NG Core 5 includes Common NFs 51, NFs for slice-A 52, NFs for slice-B 53, and an HSS 54.

Step 1401 corresponds to Step 1301 in FIG. 13. Slices A and B have been selected for the UE 1 here as an example. Step 1402 corresponds to Steps 1302 to 1307 in FIG. 13 and includes a handover preparation phase and a handover execution phase.

FIG. 14 shows Case A (i.e., steps 1403 to 1406) and Case B (i.e., steps 1407 to 1410). Either of the Cases A and B is performed. In the Case A, CP NFs (e.g., Session Management Function (SMF) or Mobility Management Function (MMF)) in the Common NFs 51 trigger a flow modification (or a bearer modification) for all the slices for the UE 1. In contrast, in the Case B, CP NFs (e.g., SMF or MMF) of each slice trigger a flow modification (or a bearer modification) for that slice.

Firstly, the Case A is described. Step 1403 corresponds to Step 1308 in FIG. 13. In Step 1403, the target NR NB 7 sends an NR Path Switch Request message to the Common NFs 51. As already described, this NR Path Switch Request message may contain an "E-RAB/Flow to be switched in Downlink (DL) List" IE. This NR Path Switch Request message may further contain slice information. The slice information indicates one or more network slices that the UE 1 desires to connect to (or use) in the target cell/target NR NB 7.

Step 1404 and 1405 corresponds to Step 1309 in FIG. 13. In Steps 1404 and 1405, the CP NFs within the Common NFs 51 trigger the NFs for slice-A 52 and the NFs for slice-B 53 to perform flow modifications (or bearer modifications).

Step 1406 corresponds to Step 1310 in FIG. 13. In Step 1406, the Common NFs 51 send an NR Path Switch Request Acknowledge message to the target NR NB 7. As already described, this NR Path Switch Request Acknowledge message may contain an "E-RAB/Flow to be switched in UL List" IE.

Next, the Case B is described. Step 1407 corresponds to Step 1308 of FIG. 13. In Step 1407, the NR NB 7 sends NR Path Switch Request messages to respective CP NFs (i.e., CP NFs within NFs for slice-A 52 and CP NFs within NFs for slice-B 53) of one or more network slices which the UE 1 desires to connect to (or use) in the target cell/target NR NB 7. The target NR NB 7 may determine (or select) the one or more network slices, which the NR Path Switch Request messages will be sent to, based on slice information contained in the NR Handover Request message received from the source NR NB 6 (step 1402, or 1303). Alternatively, the target NR NB 7 may determine (or select) the one or more network slices, which the NR Path Switch Request messages will be sent to, based on network slice assistance information or slice information contained in the NR RRC Connection Reconfiguration Complete message (or Handover Confirm for NR message) received from the UE 1.

Steps 1408 and 1409 correspond to Step 1309 in FIG. 13. In Step 1408, the NFs for slice-A 52 perform a flow modification (or a bearer modification) in the slice A. In Step 1409, the NFs for slice-B 53 perform a flow modification (or a bearer modification) in the slice B.

Step 1410 corresponds to Step 1310 in FIG. 13. In Step 1410, the CP NFs within the NFs for slice-A 52 send an NR Path Switch Request Acknowledge message to the target NR NB 7, while the CP NFs within the NFs for slice-B 53 also send it to the target NR NB 7.

Figure 15:
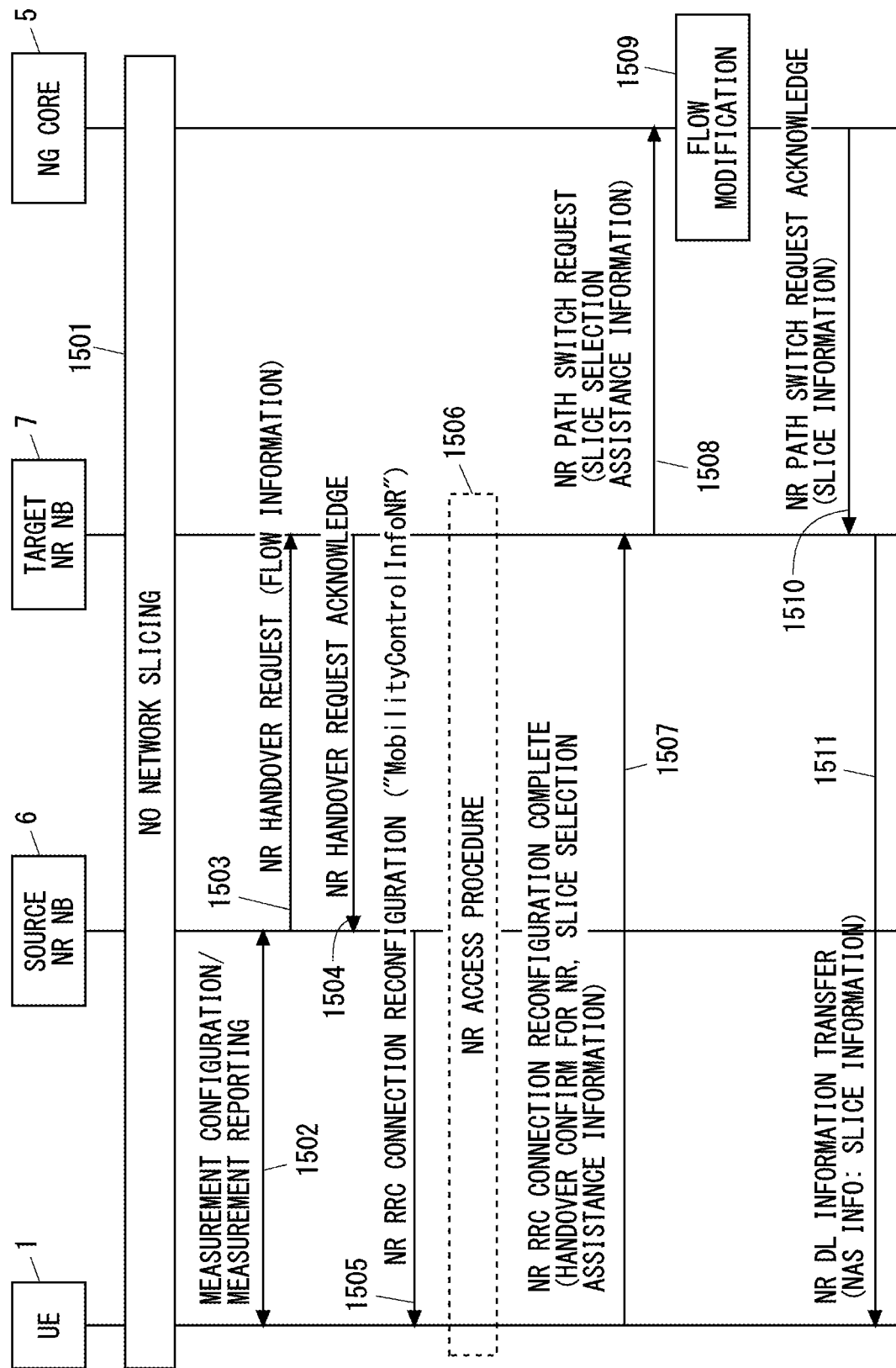
FIG. 15 is a sequence diagram showing an example of the intra-NR handover procedure according to the fourth embodiment.

FIG. 15 shows an example of the intra-NR handover procedure. FIG. 15 shows a case where network slicing is not applied to the UE 1 in the source cell/source NR NB 6, while it is applied to the UE 1 in the target cell/target NR NB 7.

In Step 1501, the UE 1 is connected to the source NR NB 6 and is in a connected state (i.e., RRC_Connected). Network slicing is not applied to the UE 1 in the source cell/source NR NB 6.

Steps 1502 to 1507 are basically similar to Steps 1302 to 1507 in FIG. 13. However, the NR Handover Request message in Step 1503 does not need to contain slice information. In contrast, the NR RRC Connection Reconfiguration Complete message (or Handover Confirm for NR message) in Step 1507 may contain network slice assistance information. The network slice assistance information may be NAS information or RRC information.

Steps 1508 to 1510 are a handover completion phase and basically similar to steps 1308 to 1510 in FIG. 13. However, in Step 1509, the NG Core 5 further performs a slice selection for the UE 1. In order to assist the slice selection in the NG Core 5, the NR Path Switch Request message in Step 1508 may contain the network slice assistance information sent from the UE 1. The NR Path Switch Request Acknowledge message in step 1510 may contain slice information. This slice information relates to one or more network slices selected for the UE 1 by the NG Core 5.

Step 1511 corresponds to Step 1311 in FIG. 13. The NR DL Information Transfer message in Step 1511 may carry the slice information sent from the NG Core 5.

Figure 16:
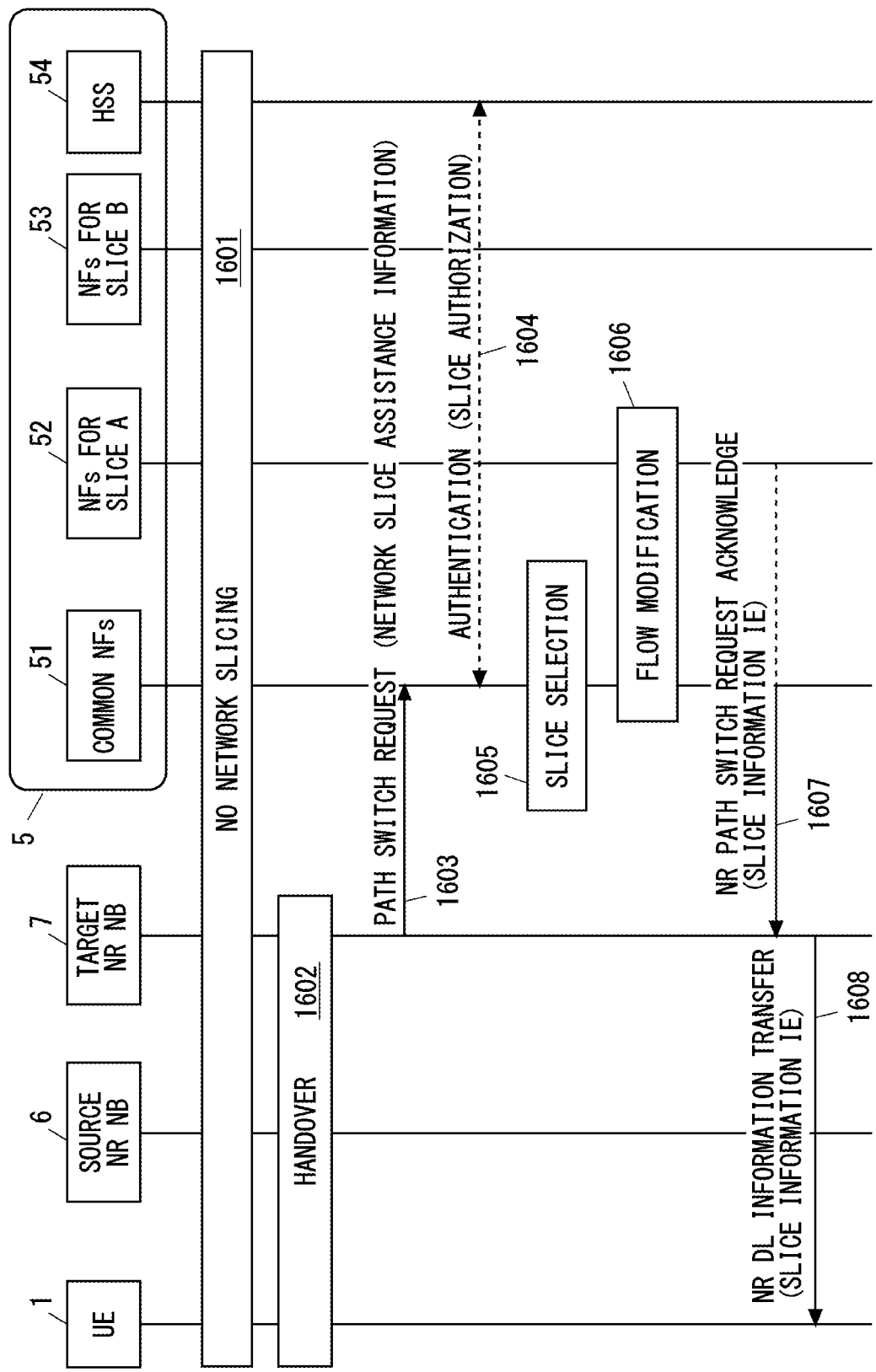
FIG. 16 is a sequence diagram showing an example of the intra-NR handover procedure according to the fourth embodiment.

FIG. 16 shows an example of the intra-NR handover procedure. The handover procedure shown in FIG. 16 provides details and modifications to the handover procedure shown in FIG. 15, and describes the configuration and the signaling in the NG Core 5 in a detailed manner. The specific configuration of the NG Core 5 shown in FIG. 16 is similar to that shown in FIG. 8.

Step 1601 corresponds to Step 1501 in FIG. 15. Step 1602 corresponds to Steps 1502 to 1507 in FIG. 15 and includes a handover preparation phase and a handover execution phase. Note that, the UE 1 may send network slice assistance information to the target NR NB 7 during or before Step 1602. For example, the UE 1 may send the network slice assistance information via an NR RRC Connection Reconfiguration Complete message (or Handover Confirm for NR message).

Step 1603 corresponds to Step 1308 in FIG. 13. In Step 1603, the target NR NB 7 sends an NR Path Switch Request message to the Common NFs 51. As already described, this NR Path Switch Request message may contain an "E-RAB/Flow to be switched in Downlink (DL) List" IE. Further, the NR Path Switch Request message may contain the network slice assistance information.

In Step 1604, if necessary, the Common NFs 51 perform authentication of the UE 1. This authentication includes confirming of a slice allowed (or authorized) to the UE 1 (slice authorization). In the slice authorization, the Common NFs 51 may decide/determine for each slice whether the UE 1 is allowed.

FIG. 16 shows a case where at least one network slice has been allowed for the UE 1, or where at least one network slice is applicable to an ongoing service(s) performed by the UE 1 or to a service(s) requested by the UE 1. Accordingly, in Step 1605, the Common NFs 51 performs a slice selection. In the example shown in FIG. 16, the Common NFs 51 selects the slice A for the UE 1. The slice selection in Step 1605 may be performed per ongoing service performed by the UE 1 or per service requested by the UE 1 (e.g., per EPS bearer/E-RAB or per IP flow). The slice selection in Step 1605 may be performed by an SSF located separately from the Common NFs 51.

Step 1606 corresponds to Step 1509 in FIG. 15. The Common NFs 51 communicate with the NFs for Slice-A 52 of the slice selected for the UE 1 (the slice A in this example) to perform a flow modification (or a bearer modification). By doing so, the Common NFs 51 and the NFs for Slice-A 52 switch the uplink and downlink transfer points of the packet flow(s) (i.e., PDU flow(s)) or bearer(s) of the UE 1 from the common network slice (i.e., Common NFs 51) to the slice A (i.e., NFs for slice-A 52).

Step 1607 corresponds to Step 1510 in FIG. 15. The Common NFs 51 send an NR Path Switch Request Acknowledge message to the target NR NB 7. The CP NFs (i.e., NFs for slice-A 52) of the selected slice may send the NR Path Switch Request Acknowledge message to the target NR NB 7 on behalf of the Common NFs 51. As already described, the NR Path Switch Request Acknowledge message in Step 1607 may contain an "E-RAB/Flow to be switched in UL List" IE.

The NR Path Switch Request Acknowledge message in Step 1607 may further contain slice information. This slice information enables the target NR NB 7 to recognize one or more network slices selected by the NG Core 5 for the UE 1. For example, the slice information may indicate an identifier (e.g., NSI-ID, NF IDs, MDD) of each network slice. Additionally or alternatively, the slice information may indicate a UE identifier assigned to the UE 1 by CP NFs (or a control node corresponding to an MME) associated with each network slice. This UE identifier may be an identifier corresponding to an MME UE S1AP ID in LTE. When the UE 1 is connected to a plurality of network slices, a plurality of UE identifiers corresponding to the respective network slices may be assigned to the UE 1.

Step 1608 corresponds to Step 1511 in FIG. 15. The NR DL Information Transfer message may carry all or part of the slice information sent from the NG Core 5.

Figure 17:
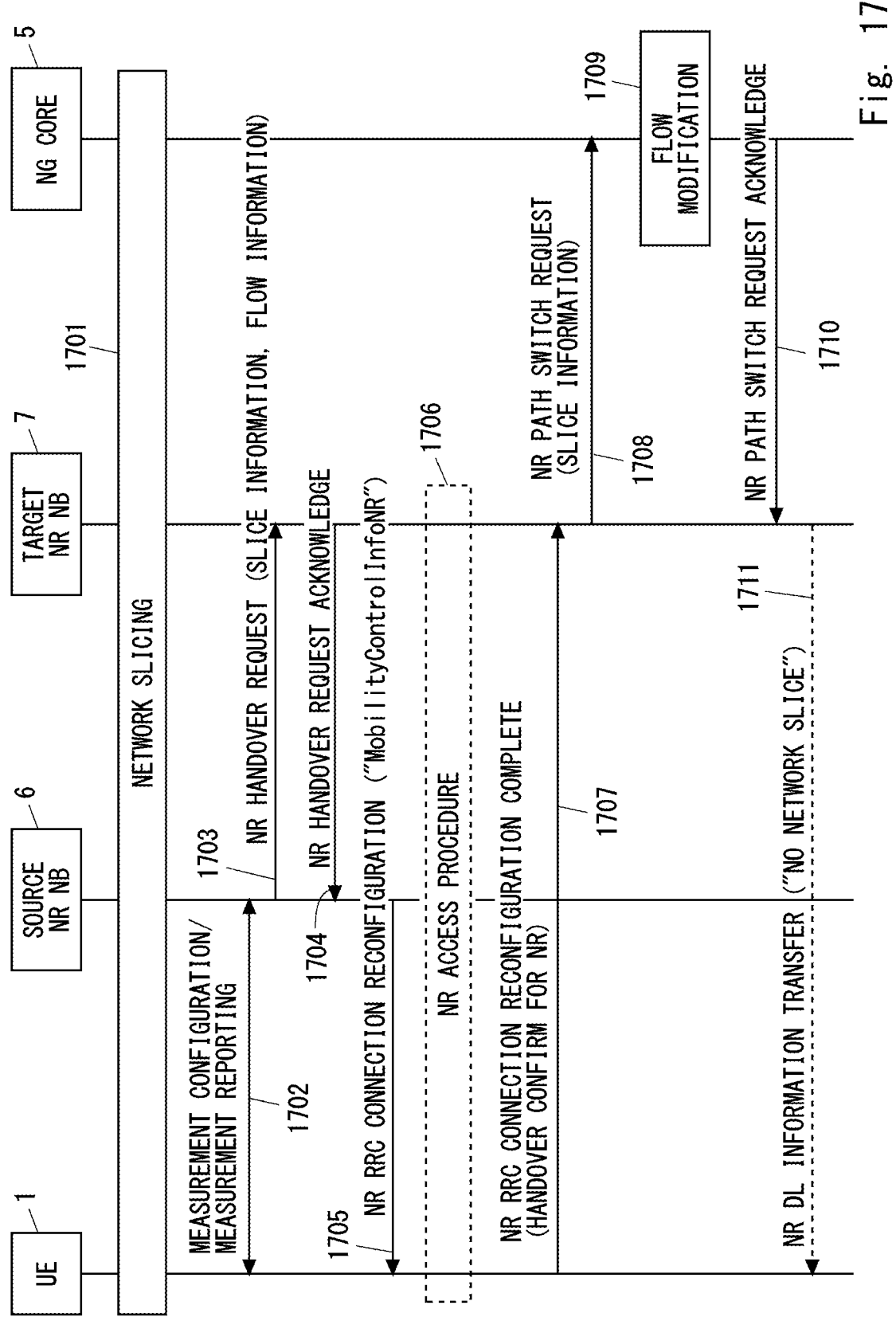
FIG. 17 is a sequence diagram showing an example of the intra-NR handover procedure according to the fourth embodiment.

FIG. 17 shows an example of the intra-NR handover procedure. FIG. 17 shows a case where network slicing is applied to the UE 1 in the source cell/source NR NB 6, while it is not applied to the UE 1 in the target cell/target NR NB 7.

In Step 1701, similarly to Step 1301 in FIG. 13, network slicing is applied to the UE 1 in the source cell/source NR NB 6. Processes in Steps 1702 to 1711 are similar to those in Steps 1302 to 1311 in FIG. 13. However, in Step 1709, the NG Core 5 determines that network slicing should not be applied to the UE 1 in the target cell/target NR NB 7 and switch the uplink and downlink transfer points of the packet flows or bearers of the UE 1 from the slices A and B (i.e., NFs for slice-A 52 and NFs for slice-B 53) to the common network slice (i.e., Common NFs 51). Accordingly, the NR Path Switch Request Acknowledge message in Step 1710 may contain information that explicitly or implicitly indicates that network slicing is not applied to the UE 1. The NR DL Information Transfer message in Step 1711 may also include information explicitly or implicitly indicating that network slicing is not applied to the UE 1.

Figure 18:
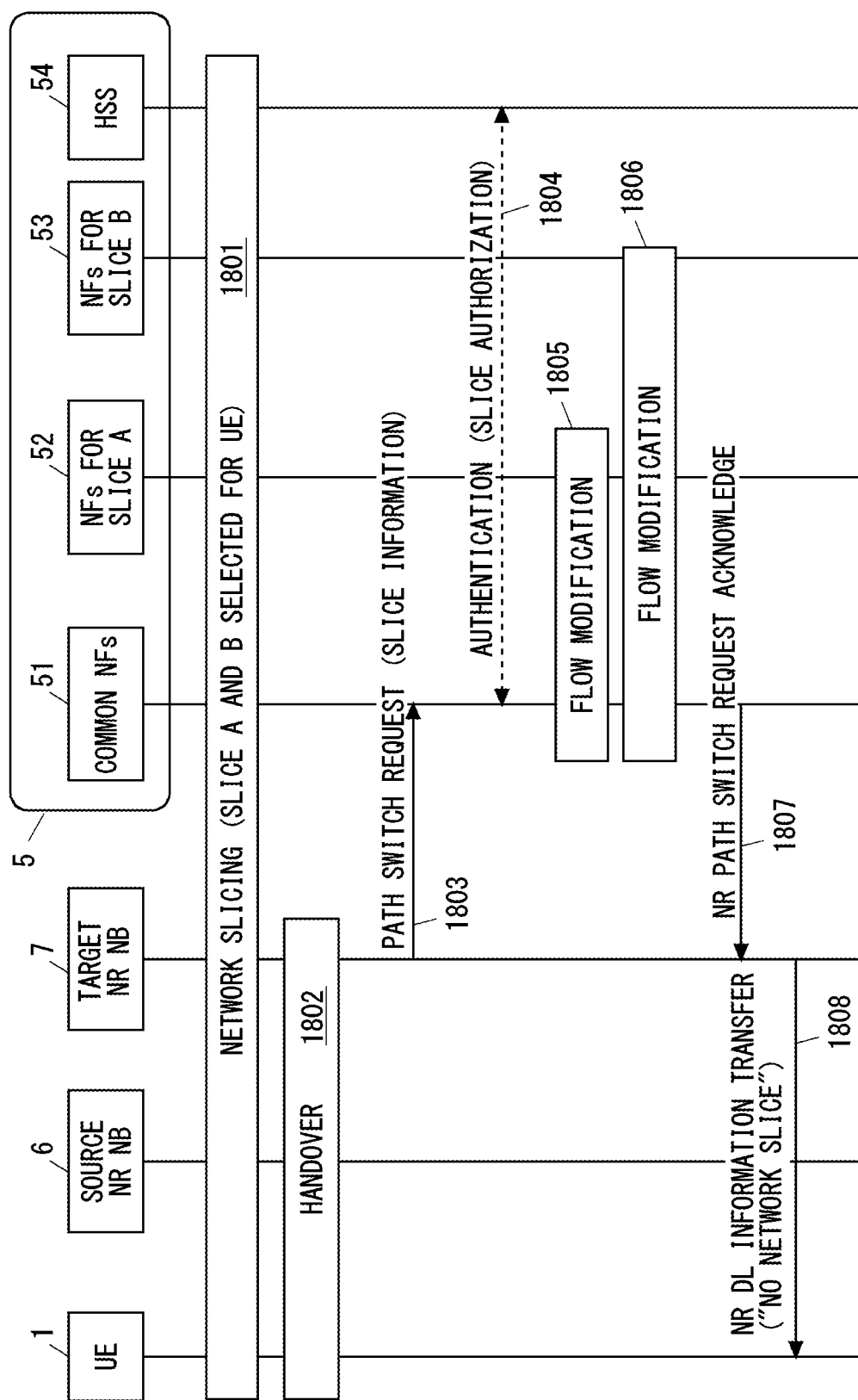
FIG. 18 is a sequence diagram showing an example of the intra-NR handover procedure according to the fourth embodiment.

FIG. 18 shows an example of the intra-NR handover procedure. The handover procedure shown in FIG. 18 provides details and modifications to the handover procedure shown in FIG. 17, and describes the configuration and the signaling in the NG Core 5 in a detailed manner. The specific configuration of the NG Core 5 shown in FIG. 18 is similar to that shown in FIG. 8.

Processes in Steps 1801 to 1803 are similar to those in Steps 1401 to 1403 in FIG. 14. In Step 1404, if necessary, the Common NFs 51 perform authentication of the UE 1. This authentication includes confirming of a slice allowed (or authorized) to the UE 1 (slice authorization). In the slice authorization, the Common NFs 51 may decide/determine for each slice whether the UE 1 is allowed. The Common NFs 51 determine that no network slice is allowed for the UE 1, or no network slice is applicable to an ongoing service(s) performed by the UE 1 or to a service(s) requested by the UE 1.

Step 1805 and 1806 corresponds to Step 1709 in FIG. 17. In Steps 1805 and 1806, the CP NFs within the Common NFs of 51 trigger the NFs for slice-A 52 and the NFs for slice-B 53 to perform flow modifications (or bearer modifications) in order to switch the uplink and downlink transfer points of the packet flows or bearers of the UE 1 from the slices A and B (i.e., NFs for slice-A 52 and NFs for slice-B 53) to the common network slice (i.e., Common NFs 51).

Step 1807 and 1808 correspond to steps 1710 and 1711 of FIG. 17. In Step 1807, the Common NFs 51 send an NR Path Switch Request Acknowledge message to the target NR NB 7. In Step 1808, the target NR NB 7 sends an NR DL Information Transfer message to the UE 1. The NR Path Switch Request Acknowledge message and the NR DL Information Transfer message may contain information explicitly or implicitly indicating that network slicing is not applied to the UE 1.

As understood from the above descriptions, the Intra-NR handover procedures described in this embodiment enable a handover of a UE 1 in a radio communication network that supports network slicing. In particular, the Intra-NR handover procedures described with reference to FIGS. 15 to 18 enable a handover of a UE 1 in a case where network slicing is not applied to one of the source cell/source NR NB 6 and the target cell/target NR NB 7.

Figure 19:
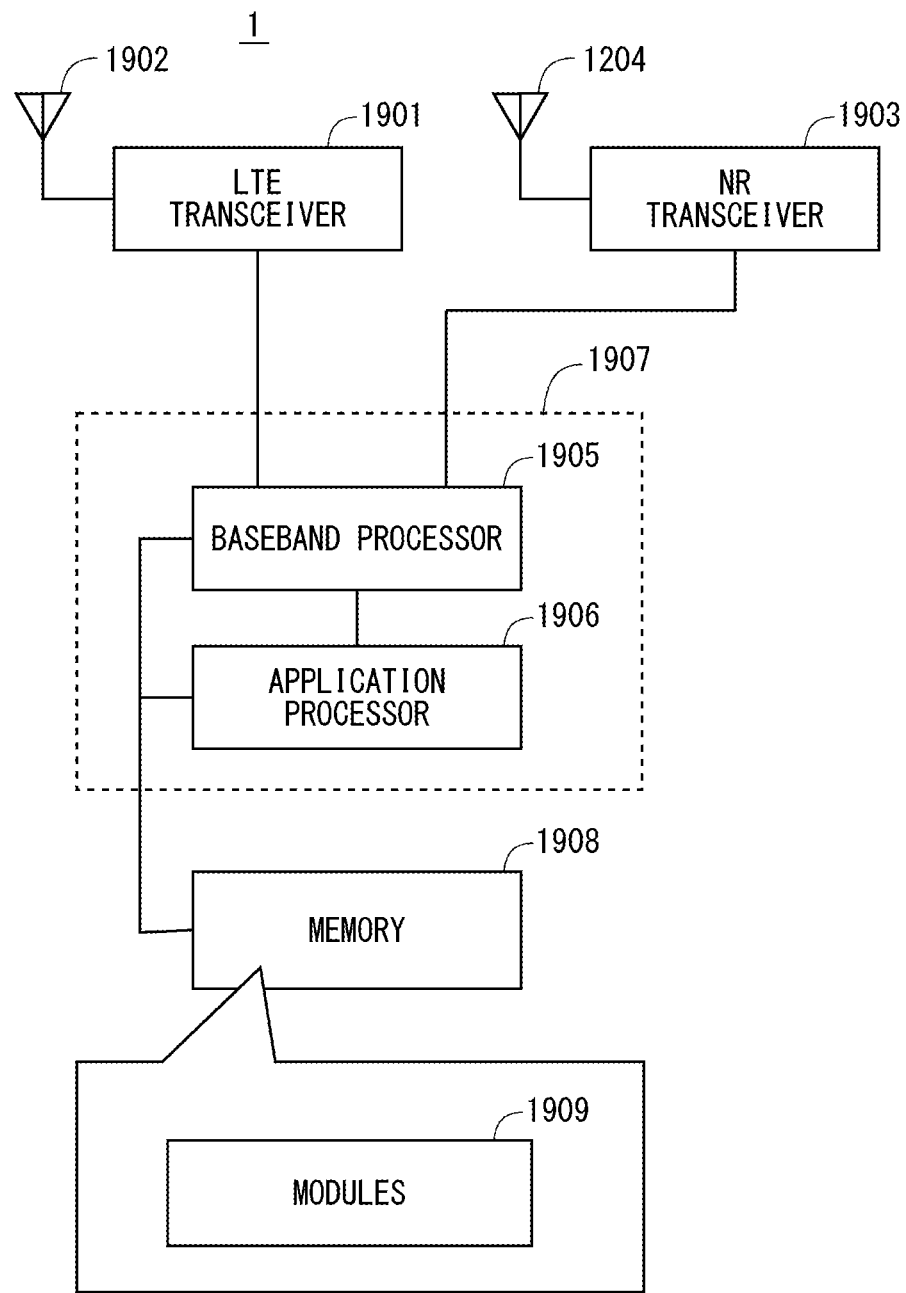
FIG. 19 is a block diagram showing a configuration example of a radio terminal according to some embodiments.

The following provides configuration examples of the UE 1, the LTE eNB 2, the NR NB 3, the NR NB 6, the NR NB 7, and the core network nodes according to the above-described embodiments. FIG. 19 is a block diagram showing a configuration example of the UE 1. An LTE transceiver 1901 performs an analog RF signal processing related to the PHY layer of the LTE RAT to communicate with the LTE eNB 2. The analog RF signal processing performed by the LTE transceiver 1901 includes frequency up-conversion, frequency down-conversion, and amplification. The LTE transceiver 1901 is coupled to an antenna 1902 and a baseband processor 1905. That is, the LTE transceiver 1901 receives modulated symbol data (or OFDM symbol data) from the baseband processor 1905, generates a transmission RF signal, and supplies the generated transmission RF signal to the antenna 1902. Further, the LTE transceiver 1901 generates a baseband reception signal based on a reception RF signal received by the antenna 1902 and supplies the generated baseband reception signal to the baseband processor 1905.

A New Radio (NR) transceiver 1903 performs an analog RF signal processing related to the PHY layer of the NG RAT to communicate with the NR NB 3. The New 5G transceiver 1903 is coupled to an antenna 1904 and the baseband processor 1905.

The baseband processor 1905 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and packet communication).

In the case of LTE or LTE-Advanced, for example, the digital baseband signal processing performed by the baseband processor 1905 may include signal processing of the Packet Data Convergence Protocol (PDCP) layer, Radio Link Control (RLC) layer, Medium Access Control (MAC) layer, and Physical (PHY) layer. Further, the control-plane processing performed by the baseband processor 1905 may include processing of Non-Access Stratum (NAS) protocol, RRC protocol, and MAC CEs.

The baseband processor 1905 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 1906 described in the following.

The application processor 1906 may also be referred to as a CPU, an MPU, a microprocessor, or a processor core. The application processor 1906 may include a plurality of processors (processor cores). The application processor 1906 loads a system software program (Operating System (OS)) and various application programs (e.g., communication application for acquiring metering data or sensing data) from a memory 1908 or from another memory (not shown) and executes these programs, thereby providing various functions of the UE 1.

In some implementations, as represented by a dashed line (1907) in FIG. 19, the baseband processor 1905 and the application processor 1906 may be integrated on a single chip. In other words, the baseband processor 1905 and the application processor 1906 may be implemented in a single System on Chip (SoC) device 1907. A SoC device may be referred to as a system Large Scale Integration (LSI) or a chipset.

The memory 1908 is a volatile memory, a nonvolatile memory, or a combination thereof. The memory 1908 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1908 may include, for example, an external memory device that can be accessed by the baseband processor 1905, the application processor 1906, and the SoC 1907. The memory 1908 may include an internal memory device that is integrated in the baseband processor 1905, the application processor 1906, or the SoC 1907. Further, the memory 1908 may include a memory in a Universal Integrated Circuit Card (UICC).

The memory 1908 may store one or more software modules (computer programs) 1909 including instructions and data to perform processing by the UE 1 described in the above embodiments. In some implementations, the baseband processor 1905 or the application processor 1906 may load the software modules 1909 from the memory 1908 and execute the loaded software modules, thereby performing the processing of the UE 1 described in the above embodiments.

Figure 20:
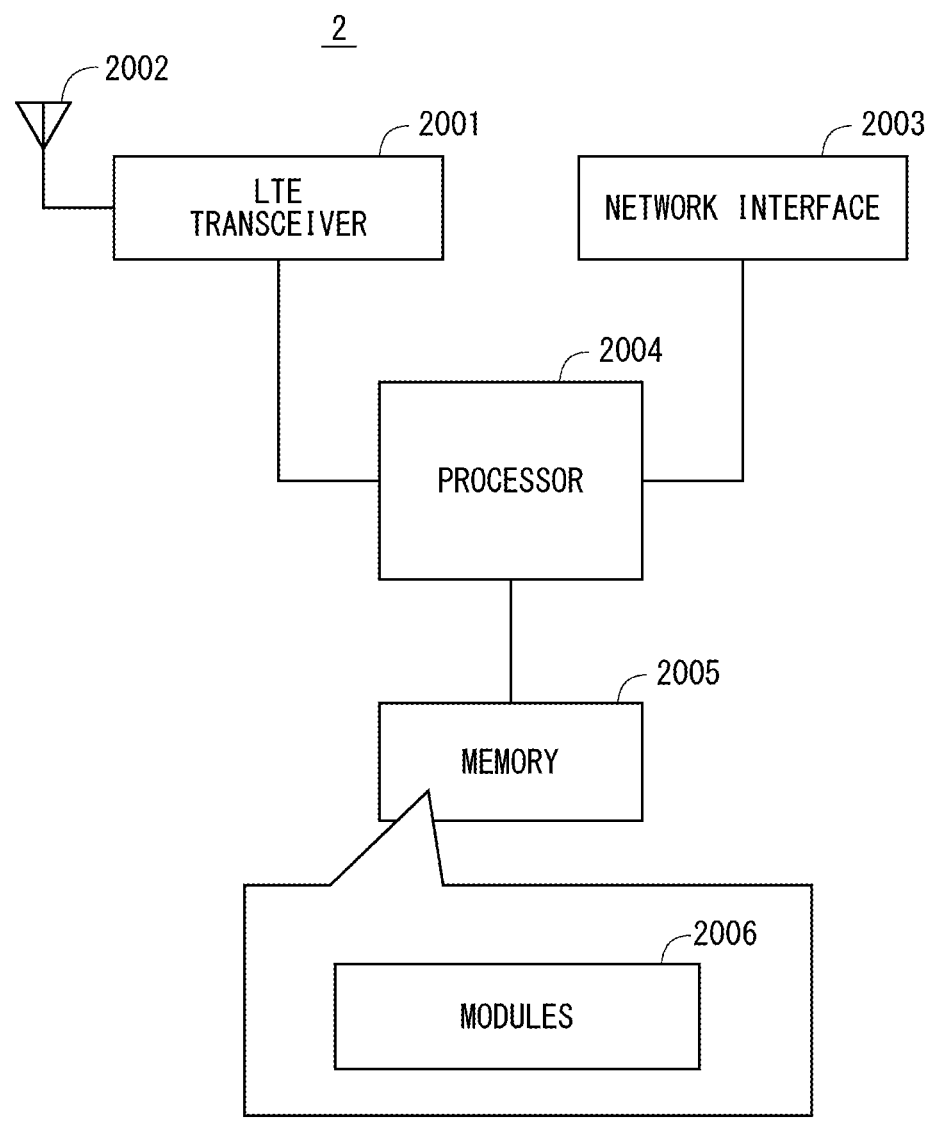
FIG. 20 is a block diagram showing a configuration example of a base station according to some embodiments.

FIG. 20 is a block diagram showing a configuration example of the LTE eNB 2 according to the above-described embodiments. As shown in FIG. 20, the LTE eNB 2 includes an LTE transceiver 2001, a network interface 2003, a processor 2004, and a memory 2005. The LTE transceiver 2001 performs analog RF signal processing to communicate with UEs that support the LTE RAT, including the UE 1. The LTE transceiver 2001 may include a plurality of transceivers. The LTE transceiver 2001 is connected to an antenna 2002 and the processor 2004. The LTE transceiver 2001 receives modulated symbol data (or OFDM symbol data) from the processor 2004, generates a transmission RF signal, and supplies the generated transmission RF signal to the antenna 2002. Further, the LTE transceiver 2001 generates a baseband reception signal based on a reception RF signal received by the antenna 2002 and supplies this signal to the processor 2004.

The network interface 2003 is used to communicate with network nodes (e.g., control nodes and transfer nodes). The network interface 2003 may include, for example, a network interface card (NIC) conforming to the IEEE 802.3 series.

The processor 2004 performs digital baseband signal processing (i.e., data-plane processing) and control-plane processing for radio communication. In the case of LTE or LTE-Advanced, for example, the digital baseband signal processing performed by the processor 2004 may include signal processing of the PDCP layer, RLC layer, MAC layer, and PHY layer. Further, the control-plane processing performed by the processor 2004 may include processing of S1 protocol, RRC protocol, and MAC CE.

The processor 2004 may include a plurality of processors. The processor 2004 may include, for example, a modem processor (e.g., DSP) that performs the digital baseband signal processing and a protocol-stack-processor (e.g., CPU or MPU) that performs the control-plane processing.

The memory 2005 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 2005 may include a storage located separately from the processor 2004. In this case, the processor 2004 may access the memory 2005 through the network interface 2003 or an I/O interface (not shown).

The memory 2005 may store one or more software modules (computer programs) 2006 including instructions and data to perform processing by the LTE eNB 2 described in the above embodiments. In some implementations, the processor 2004 may load the one or more software modules 2006 from the memory 2005 and execute the loaded software modules, thereby performing the processing of the LTE eNB 2 described in the above embodiments.

Figure 21:
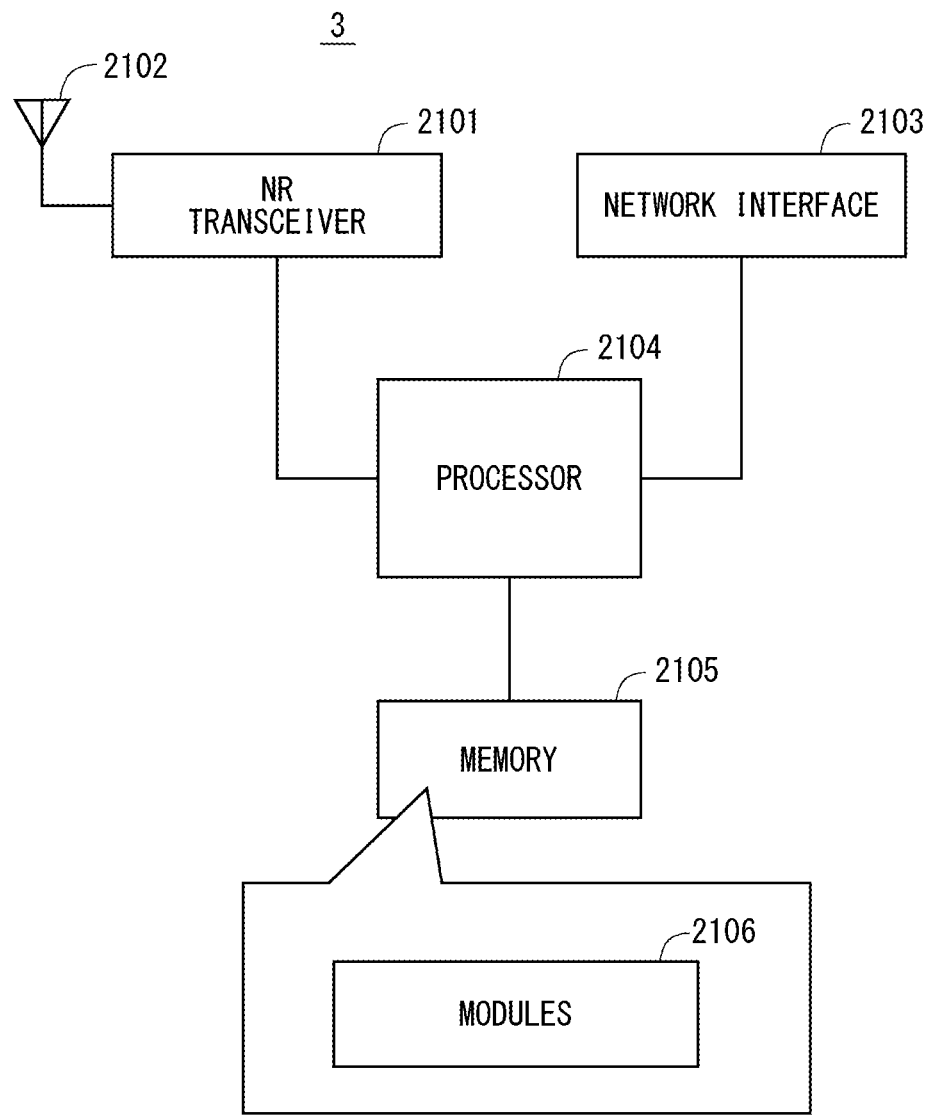
FIG. 21 is a block diagram showing a configuration example of a base station according to some embodiments.

FIG. 21 is a block diagram showing a configuration example of the NR NB 3 according to the above-described embodiments. The NR NBs 6 and 7 may have the configuration shown in FIG. 21. As shown in FIG. 21, the NR NB 3 includes a New Radio (NR) transceiver 2101, a network interface 2103, a processor 2104, and a memory 2105. The NR transceiver 2101 performs analog RF signal processing to communicate with UEs that support the NG RAT, including the UE 1. The NR transceiver 2101 may include a plurality of transceivers. The NR transceiver 2101 is connected to an antenna 2102 and the processor 2104. The NR transceiver 2101 receives modulated symbol data from the processor 2104, generates a transmission RF signal, and supplies the generated transmission RF signal to the antenna 2102. Further, the NR transceiver 2101 generates a baseband reception signal based on a reception RF signal received by the antenna 2102 and supplies this signal to the processor 2104.

The network interface 2103 is used to communicate with network nodes (e.g., the control node and the transfer node in the NG Core 5). The network interface 2103 may include, for example, a network interface card (NIC) conforming to the IEEE 802.3 series.

The processor 2104 performs digital baseband signal processing (i.e., data-plane processing) and control-plane processing for radio communication. The processor 2104 may include a plurality of processors. The processor 2104 may include, for example, a modem processor (e.g., DSP)

that performs the digital baseband signal processing and a protocol-stack-processor (e.g., CPU or MPU) that performs the control-plane processing.

The memory 2105 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 2105 may include a storage located separately from the processor 2104. In this case, the processor 2104 may access the memory 2105 through the network interface 2103 or an I/O interface (not shown).

The memory 2105 may store one or more software modules (computer programs) 2106 including instructions and data to perform processing by the NR NB 3 described in the above embodiments. In some implementations, the processor 2104 may load the one or more software modules 2106 from the memory 2105 and execute the loaded software modules, thereby performing the processing of the NR NB 3 described in the above embodiments.

Figure 22:
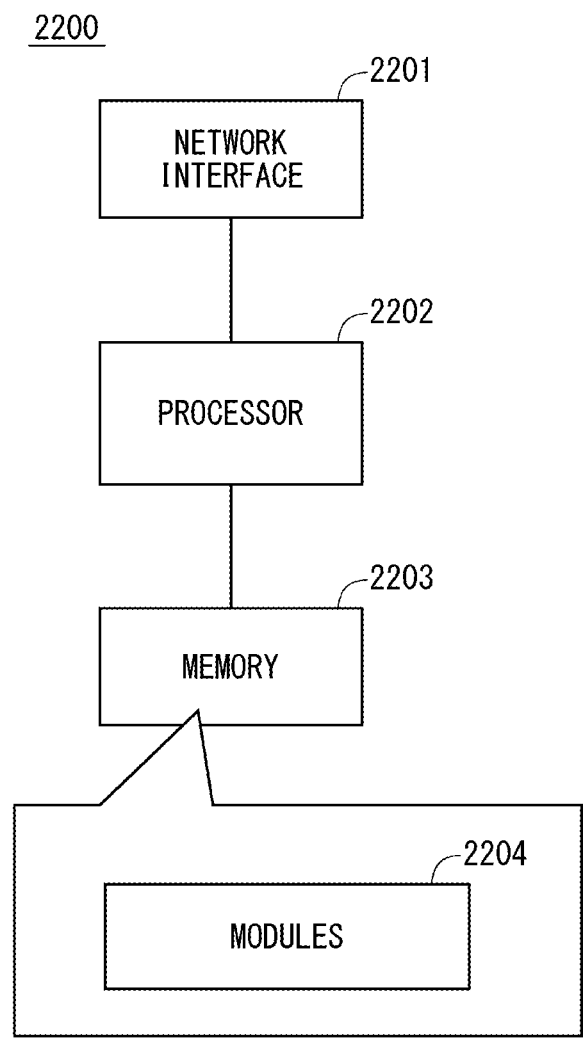
FIG. 22 is a block diagram showing a configuration example of a core network node according to some embodiments.

FIG. 22 is a block diagram showing a configuration example of a core network node 2200 according to the above-described embodiments. The core network node 2200 is, for example, the control node (e.g., Common NFs 51) in the NG Core 5. As shown in FIG. 22, the core network node 2200 includes a network interface 2201, a processor 2202, and a memory 2203. The network interface 2201 is used to communicate with network nodes (e.g., RAN nodes or other core network nodes). The network interface 2201 may include, for example, a network interface card (NIC) conforming to the IEEE 802.3 series.

The processor 2202 may be, for example, a microprocessor, an MPU, or a CPU. The processor 2202 may include a plurality of processors.

The memory 2203 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 2203 may include a storage located separately from the processor 2202. In this case, the processor 2202 may access the memory 2203 through the network interface 2201 or an I/O interface (not shown).

The memory 2203 may store one or more software modules (computer programs) 2204 including instructions and data to perform processing by the core network node (e.g., the control node in the NG Core 5) described in the above embodiments. In some implementations, the processor 2202 may load the one or more software modules 2204 from the memory 2203 and execute the loaded software modules, thereby performing the processing of the core network node described in the above embodiments.

As described above with reference to FIGS. 19 to 22, each of the processors included in the UE 1, the LTE eNB 2, the NR NB 3, and the core network nodes in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Fifth Embodiment

This embodiment provides specific examples of the RRC messages, the control messages between the RAN and the core network (i.e., NG2 messages), and the control messages between the source base station and the target base station (i.e., X3 messages) described in the above embodiments.

FIGS. 23A and 23B show examples of a format of the Mobility from EUTRA command message. In the case of handover from the LTE System to the NG System, the MobilityFromEUTRACommand message includes a purpose set as "handover" and a targetRAT-Type set as "ngutra" corresponding to the NG RAN. Further, the MobilityFromEUTRACommand message includes targetRAT-MessageContainer. The targetRAT-MessageContainer contains an RRCConnectionReconfigurationNR message generated by the target NR NB 3. Furthermore, when the targetRAT-Type is "OTHERRAN", i.e., is "utra", "geran", or "ngutra", the MobilityFromEUTRACommand message includes nasSecurityParamFromEUTRA.

FIG. 24 shows an example of a format of the X3AP: NR Handover Request message sent from the source LTE eNB 2 to the target NR NB 3 on the direct inter-base-station interface 101 (X3 interface) in Step 202 in FIG. 2A and Step 302 in FIG. 3A. This NR Handover Request message includes an identifier (i.e., Globally Unique CNF ID (GU-CNFI)) of a control node (Common NF (CNF)) in the NG Core 5. This NR Handover Request message further includes UE Context Information.

FIG. 25 shows an example of a format of the UE Context Information. In the example shown in FIG. 25, the UE Context Information includes an NE-RABs To Be Setup List. The NE-RABs To Be Setup List indicates a list of radio access bearers (NE-RABs) that should be set up in the target NR NB 3. The format shown in FIG. 25 may be used when the NG System including the NR NB 3 and the NG Core 5 is configured to support a bearer-based transfer using a bearer per QoS class and per PDU session.

The UE Context Information shown in FIG. 25 further includes an RRC Context. The RRC Context includes a RRC Handover Preparation Information message. The RRC Handover Preparation Information message is used by the target NR NB 3 to perform settings related to resources and security for communicating with the UE 1 in the NG system.

Furthermore, the UE Context Information shown in FIG. 25 may include assistance information for network slicing (Assistance Data for Network Slicing). The source LTE eNB 2 may incorporate the Assistance Data for Network Slicing received from the UE 1 or the NG Core 5 into the UE Context Information.

FIG. 26 shows an example of a format of the X3AP: NR Handover Request Acknowledge message sent from the target NR NB 3 to the source LTE eNB on the direct inter-base-station interface 101 (X3 interface) in Step 203 in FIG. 2A. This NR Handover Command message includes a Target to Source Transparent Container. The Target to Source Transparent Container includes radio resource configuration information (e.g., radio parameters) generated by the target NR NB 3. The Target to Source Transparent Container may include an RRC Container containing an RRC NG-UTRA Handover Command message. Further, in the example shown in FIG. 26, the NR Handover Request Acknowledge message includes an NE-RABs Admitted List. The NE-RABs Admitted List indicates a list of radio access bearers (NE-RABs), resources for which have been prepared in the target cell.

FIG. 27 shows an example of a format of the X3AP: NR Handover Request Acknowledge message sent from the target NR NB 3 to the source LTE eNB on the direct inter-base-station interface 101 (X3 interface) in Step 305 in FIG. 3A. The format shown in FIG. 27 differs from the format shown in FIG. 26 in that it includes core network context information (NG Core Context). The NG Core Context may be transmitted to the UE 1 transparently through the source LTE eNB 2. Additionally or alternatively, a part or the whole NG Core Context may be contained in the Target To Source Transparent Container. FIG. 28 shows an example of a format of the NG Core Context. As described in the first embodiment, the NG Core Information includes, for example, slice information and flow information (or PDU session information).

FIG. 29 shows an example of a format of the Slice Information. As described in detail in the first embodiment, the Slice Information includes an identifier of a network slice determined (or selected) for the UE 1 (i.e., Network Slice Instance ID) and an identifier of a network function or a node associated with this network slice (i.e., Network Function ID). The Slice Information may include type information of this network slice (i.e., Multi-Dimensional Descriptor). Further, the Slice Information may include a Mobility Class or a Session Class or both.

FIG. 30 shows an example of a format of the flow information. As described above in detail in the first embodiment, the flow information includes information (e.g., PDU session Information List) about at least one session (i.e., PDU session(s)) established in the NG system to transfer at least one packet flow (i.e., PDU flow(s)) of the UE 1. The flow information includes a session identifier (e.g., PDU Session ID), and also includes address (Transport Layer Address) and uplink (UL) Session Endpoint ID (SIED) of a transfer node in the NG Core 5.

FIG. 31 shows an example of a format of the Session Endpoint ID. As described in detail in the first embodiment, the Session Endpoint ID may be a GTP-TEID, a GRE-TEID, or an identifier of a network function or a node (NF ID).

Other Embodiments

Each of the above embodiments may be used individually, or two or more of the embodiments may be appropriately combined with one another.

The above embodiments have been described based on a configuration example of a network in which both the LTE eNBs 2 and the NR NB 3 are connected to the NG Core 5. Alternatively, the LTE eNB 2 may be connected to an EPC (i.e., enhanced EPC (eEPC)) that is enhanced to perform interworking with the NG System. An (e)MME in the eEPC may be connected to a control node (i.e., CPF node) in the NG Core 5 through a control-plane interface. Further, one or more nodes in the eEPC may be connected to one or more data nodes (i.e., UPF nodes) in the NG Core 5 through a user-plane interface.

The E-URAN and the NG RAN described in the above embodiments may be implemented based on a Cloud Radio Access Network (C-RAN) concept. The C-RAN is also referred to as a Centralized RAN. In this case, processes and operations performed by each of the LTE eNB 2 and the NR NB 3 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), or a Distributed Unit (DU). The DU and the RU may provide the functions of the AS layer provided in the entire RAN while dividing them into functions provided by the DU and those provided by the RU. For example, the DU and the RU may be provided by a configuration in which a part of the AS layer (e.g., layer 2/layer 3 or their sublayers, or a part of the function of the layer) is disposed in the DU and the remaining layers (or the remaining part of the layer) is disposed in the RU. That is, processes and operations performed by each of the LTE eNB 2 and the NR NB 3 described in the above embodiments may be provided by one or more radio stations (or RAN nodes).

The NR NB 3 may be configured to dynamically change the allocation of the AS layers or their functions to the DU and the RU. In other words, the NR NB 3 may be configured to dynamically change a split point of the AS layers or their functions between the DU and the RU. For example, the NR NB 3 may be configured to dynamically select one of a plurality of different functional split options. In this case, in the HO procedure from LTE to NR in the above embodiments, the NG Core 5 may determine allocations of the AS layers or their functions to the DU and the RU of the NR NB 3 in response to receiving a Handover Preparation Required message or an NR Path Switch Request message. Alternatively, the NR NB 3 may determine allocations of the AS layers or their functions to the DU and the RU of the NR NB 3. The NG Core 5 or the NR NB 3 may select one functional split option to be applied to the NR NB 3 from among a plurality of predetermined functional split options.

In an example, the functional split option to be applied to the NR NB 3 may be determined (or selected) based on an E-RAB QoS information IE, e.g., a QCI or an ARP, or flow information included in the Handover Preparation Required message or the NR Path Switch Request message. Additionally or alternatively, the functional split option to be applied to the NR NB 3 may be determined based on a slice created by the NG Core 5 or the NR NB 3, or information about this slice (i.e., slice information). Additionally or alternatively, the functional split option to be applied to the NR NB 3 may be determined based on network slice assistance information included in NAS information transmitted from the UE 1.

Further, in the above embodiments, a UE identifier may be included in a message transferred between nodes. This UE identifier is used in the handover procedure to identify the UE 1 to be handed over.

More specifically, this UE identifier may be a UE identifier used on an interface (e.g., Sn interface or an NG2 interface, n is an integer) between the NR NB 3 and a control node that corresponds to an MME and is included in the NG Core 5. This UE identifier may be expressed as an NR NB UE SnAP ID (NR NB UE Sn Application Protocol Identifier) or an NR NB UE NG2AP ID.

Alternatively, this UE identifier may be a UE identifier used on an interface (e.g., Xn interface, n is an integer) between the NR NB 3 and the LTE eNB 2. This UE identifier may be expressed as an NR NB UE XnAP ID.

Alternatively, this UE identifier may be a UE identifier used on an interface (e.g., Sm interface, m is an integer) between an MME in the EPC 4 and a control node that corresponds to the MME and is included in the NG Core 5. This UE identifier may be expressed as an eMME UE SmAP ID.

Alternatively, this UE identifier may be a UE identifier that is used on an interface (e.g., S1 interface, 1 is an integer) between the LTE eNB 2 and a control node that corresponds to an MME and is included in the NG Core 5, and assigned by the control node. This UE identifier may be expressed as an eMME UE S1AP ID.

Further, these UE identifiers may be transferred among nodes during the handover procedure. Note that, Sn, NG2, Sm, S1 and Xn which are used to identify respective interfaces are merely example and may be expressed by different symbols.

Further, the above-described embodiments are merely examples of applications of the technical ideas obtained by the inventors. These technical ideas are not limited to the above-described embodiments and various modifications may be made thereto.

For example, the whole or part of the embodiments disclosed above can be described as, but not limited to, the following supplementary notes.

(Supplementary Note 1)

A target radio access network (RAN) node associated with a second network, comprising:
  at least one memory; and
  at least one processor coupled to the at least one memory and configured to:
    receive a handover request message on a direct interface from a source RAN node in a first network, the handover request message requesting a handover of a radio terminal from the first network to the second network;
    receive at least one of slice information and flow information from a core network in response to receiving the handover request message; and
    control communication of the radio terminal based on at least one of the slice information and the flow information, wherein
  the slice information relates to a network slice in the second network to which the radio terminal is to be connected, and
  the flow information relates to at least one session to be established in the second network, serving as a bearer-less network, in order to transfer at least one packet flow of the radio terminal.

(Supplementary Note 2)

The target RAN node described in Supplementary note 1, wherein the slice information includes: (a) identification information of the network slice selected for the radio terminal; (b) type information of the network slice selected for the radio terminal; or (c) identification information of a network node or a network function associated with the network slice selected for the radio terminal; or any combination thereof.

(Supplementary Note 3)

The target RAN node described in Supplementary note 1 or 2, wherein the slice information includes at least one of a mobility class and a session class that are supported by the network slice selected for the radio terminal.

(Supplementary Note 4)

The target RAN node described in any one of Supplementary notes 1 to 3, wherein the flow information includes a flow identifier and a flow QoS parameter in respect of each packet flow of the radio terminal.

(Supplementary Note 5)

The target RAN node described in any one of Supplementary notes 1 to 4, wherein the at least one processor is configured to receive at least one of the slice information and the flow information from the core network in a handover completion phase after the radio terminal connects to the target RAN node.

(Supplementary Note 6)

The target RAN node described in Supplementary note 5, wherein
  the handover request message includes a security parameter derived by the source RAN node, and
  the at least one processor is configured to derive an Access Stratum (AS) security key from the security parameter.

(Supplementary Note 7)

The target RAN node described in Supplementary note 5 or 6, wherein
  the at least one processor is configured to send a path switch request message to the core network in the handover completion phase, and
  the path switch request message triggers the core network to select or create a network slice for the radio terminal.

(Supplementary Note 8)

The target RAN node described in Supplementary note 5 or 6, wherein
  the at least one processor is configured to send a path switch request message to the core network in the handover completion phase, and
  the path switch request message triggers the core network to create a bearer-less session for the radio terminal.

(Supplementary Note 9)

The target RAN node described in any one of Supplementary notes 5 to 8, wherein the at least one processor is configured to transmit at least one of the slice information and the flow information to the radio terminal.

(Supplementary Note 10)

The target RAN node described in any one of Supplementary notes 1 to 4, wherein the at least one processor is configured to receive at least one of the slice information and the flow information from the core network in a handover preparation phase before the source RAN node issues a handover instruction to the radio terminal.

(Supplementary Note 11)

The target RAN node described in Supplementary note 10, wherein the at least one processor is configured to determine, based on the slice information, whether to accept a bearer or flow of the radio terminal on a per-bearer or per-flow basis.

(Supplementary Note 12)

The target RAN node described in Supplementary note 10 or 11, wherein the at least one processor is configured to determine, based on the slice information, whether it is possible to accept each network slice.

(Supplementary Note 13)

The target RAN node described in any one of Supplementary notes 10 to 12, wherein the at least one processor is configured to further receive Non-Access Stratum (NAS) security configuration information and a security parameter from the core network in the handover preparation phase, the security parameter being used by the target RAN node to derive an Access Stratum (AS) security key.

(Supplementary Note 14)

The target RAN node described in any one of Supplementary notes 10 to 13, wherein
the at least one processor is configured to send to the source RAN node, on the direct interface, a handover request acknowledge message containing a transparent container, wherein
the transparent container contains at least one of: a predetermined parameter included in at least one of the slice information and the flow information; and radio resource configuration information generated based on at least one of the slice information and the flow information, and the transparent container is to be forwarded to the radio terminal by the source RAN node.

(Supplementary Note 15)

The target RAN node described in any one of Supplementary notes 10 to 14, wherein
the at least one processor is configured to send to the core network, in the handover preparation phase, a request message requesting a transmission of at least one of the slice information and the flow information, wherein
the request message triggers the core network to select or create a network slice for the radio terminal.

(Supplementary Note 16)

The target RAN node described in any one of Supplementary notes 10 to 14, wherein
the at least one processor is configured to send to the core network, in the handover preparation phase, a request message requesting a transmission of at least one of the slice information and the flow information, wherein
the request message triggers the core network to create a bearer-less session for the radio terminal.

(Supplementary Note 17)

A source radio access network (RAN) node associated with a first network, comprising:
at least one memory; and
at least one processor coupled to the at least one memory and configured to:
determine a handover of a radio terminal from the first network to a second network;
send a handover request message on a direct interface to a target RAN node in the second network in response to determination of the handover, the handover request message requesting the handover of the radio terminal to the second network;
receive from the target RAN node, on the direct interface, a handover request acknowledge message containing a transparent container; and
transmit, to the radio terminal, a mobility command message containing the transparent container and indicating the handover to the second network, wherein
the transparent container includes radio resource configuration information needed by the radio terminal to establish a radio connection associated with the second network, and
the radio resource configuration information includes at least one of: (a) first radio resource configuration information generated based on slice information relating to a network slice in the second network to which the radio terminal is to be connected; and (b) second radio resource information generated based on flow information relating to at least one session to be established in the second network, serving as a bearer-less network, in order to transfer at least one packet flow of the radio terminal.

(Supplementary Note 18)

The source radio access network (RAN) node according to claim 17, wherein
the at least one processor is configured to derive a second security parameter to be used in the second network from a first security parameter used in the first network, and incorporate the second security parameter into the handover request message, wherein
the second security parameter is to be used by the target RAN node to derive an Access Stratum (AS) security for the second network.

(Supplementary Note 19)

A method in a target radio access network (RAN) node associated with a second network, the method comprising:
receiving a handover request message on a direct interface from a source RAN node in a first network, the handover request message requesting a handover of a radio terminal from the first network to the second network;
receiving at least one of slice information and flow information from a core network in response to receiving the handover request message; and
controlling communication of the radio terminal based on at least one of the slice information and the flow information, wherein
the slice information relates to a network slice in the second network to which the radio terminal is to be connected, and
the flow information relates to at least one session to be established in the second network, serving as a bearer-less network, in order to transfer at least one packet flow of the radio terminal.

(Supplementary Note 20)

A method in a source radio access network (RAN) node associated with a first network, the method comprising:
sending a handover of a radio terminal from the first network to a second network;
transmitting a handover request message on a direct interface to a target RAN node in the second network in response to determination of the handover, the handover request message requesting the handover of the radio terminal to the second network;
receiving from the target RAN node, on the direct interface, a handover request acknowledge message containing a transparent container; and
transmitting, to the radio terminal, a mobility command message containing the transparent container and indicating the handover to the second network, wherein
the transparent container includes radio resource configuration information needed by the radio terminal to establish a radio connection associated with the second network, and
the radio resource configuration information includes at least one of: (a) first radio resource configuration information generated based on slice information relating to a network slice in the second network to which the radio terminal is to be connected; and (b) second radio resource information generated based on flow information relating to at least one session to be established in the second network, serving as a bearer-less network, in order to transfer at least one packet flow of the radio terminal.

(Supplementary Note 21)

A program for causing a computer to perform a method in a target radio access network (RAN) node associated with a second network, wherein the method comprises:
receiving a handover request message on a direct interface from a source RAN node in a first network, the handover request message requesting a handover of a radio terminal from the first network to the second network;

receiving at least one of slice information and flow information from a core network in response to receiving the handover request message; and controlling communication of the radio terminal based on at least one of the slice information and the flow information, wherein the slice information relates to a network slice in the second network to which the radio terminal is to be connected, and the flow information relates to at least one session to be established in the second network, serving as a bearerless network, in order to transfer at least one packet flow of the radio terminal.

(Supplementary Note 22)

A program for causing a computer to perform a method in a source radio access network (RAN) node associated with a first network, wherein the method comprises:

determining a handover of a radio terminal from the first network to a second network;

sending a handover request message on a direct interface to a target RAN node in the second network in response to determination of the handover, the handover request message requesting the handover of the radio terminal to the second network;

receiving from the target RAN node, on the direct interface, a handover request acknowledge message containing a transparent container; and transmitting, to the radio terminal, a mobility command message containing the transparent container and indicating the handover to the second network, wherein the transparent container includes radio resource configuration information needed by the radio terminal to establish a radio connection associated with the second network, and the radio resource configuration information includes at least one of: (a) first radio resource configuration information generated based on slice information relating to a network slice in the second network to which the radio terminal is to be connected; and (b) second radio resource information generated based on flow information relating to at least one session to be established in the second network, serving as a bearer-less network, in order to transfer at least one packet flow of the radio terminal.

(Supplementary Note 23)

A radio terminal comprising:

at least one memory; and at least one processor coupled to the at least one memory and configured to, during handover from a first network to which the radio terminal is connected to a second network, receive a handover-related message from a radio access network (RAN) node of the first network, the handover-related message containing at least one of slice information about a network slice in the second network and radio resource configuration information based on the network slice in the second network.

(Supplementary Note 24)

The radio terminal described in Supplementary note 23, wherein the at least one processor is configured to:

receive from the RAN node a mobility command message indicating the handover from the first network to the second network, the mobility command message containing the radio resource configuration information generated by a target RAN node associated with the second network, the radio resource configuration information being needed by the radio terminal to establish a radio connection associated with the network slice, which is included in the second network and to which the radio terminal is to be connected; and establish the radio connection with the target RAN node associated with the second network by using the radio resource configuration information.

(Supplementary Note 25)

The radio terminal described in Supplementary note 23 or 24, wherein the handover-related message further includes at least one of flow information and radio resource configuration information derived from the flow information, the flow information relating to at least one session to be established in the second network in order to transfer at least one packet flow of the radio terminal.

(Supplementary Note 26)

A core network node comprising:

at least one memory; and at least one processor coupled to the at least one memory and configured to, during handover of a radio terminal from a first network to a second network, send, to a target radio access network (RAN) node associated with the second network, slice information about a network slice which is included in the second network and to which the radio terminal is to be connected.

(Supplementary Note 27)

The core network node described in Supplementary note 26, wherein the at least one processor is further configured to, during the handover of the radio terminal from the first network to the second network, send flow information to the target RAN node, the flow information relating to at least one session to be established in the second network in order to transfer at least one packet flow of the radio terminal.

(Supplementary Note 28)

The core network node described in Supplementary note 26 or 27, wherein the at least one processor is configured to send the slice information to the target RAN node in a handover preparation phase before the source RAN node issues a handover instruction to the radio terminal.

(Supplementary Note 29)

The core network node described in Supplementary note 26 or 27, wherein the at least one processor is configured to send the slice information to the target RAN node in a handover completion phase after the radio terminal connects to the target RAN node.

This application is based upon and claims the benefit of priority from Japanese patent application No. 2016-158282, filed on Aug. 10, 2016, the disclosure of which is incorporated herein in its entirety by reference.

REFERENCE SIGNS LIST

1 User Equipment (UE)
2 LTE eNodeB (eNB)
3 New Radio (NR) NodeB (NB)
5 NextGen (NG) Core
6 New Radio (NR) NodeB (NB)
7 New Radio (NR) NodeB (NB)
1905 BASEBAND PROCESSOR
1906 APPLICATION PROCESSOR
1908 MEMORY
2004 PROCESSOR
2005 MEMORY
2104 PROCESSOR
2105 MEMORY
2202 PROCESSOR
2203 MEMORY

The invention claimed is:

1. A target radio access network (RAN) node connected to a Fifth Generation Core (5G Core) network, the target RAN node comprising:
   at least one memory; and
   at least one processor coupled to the at least one memory and configured to:
      receive a Handover Request message on an interface between the target RAN node and a source RAN node from the source RAN node connected to the 5G Core network; and
      transmit to the source RAN node a Handover Request Acknowledge message including a transparent container that contains radio resource configuration information which is transferred to a radio terminal via the source RAN node,
   wherein the Handover Request message contains slice information and flow list information indicating at least one flow to be setup,
   wherein the slice information identifies a network slice, the network slice being a logical network,
   wherein the at least one flow indicated in the flow list information is configured within a PDU session, and
   wherein the flow list information includes:
      a flow identifier identifying a flow within the PDU session; and
      a flow QoS parameter corresponding to the flow identified by the flow identifier.

2. The target RAN node according to claim 1, wherein the source RAN node and the target RAN node are 5G base stations.

3. The target RAN node according to claim 1, wherein the radio resource configuration information is created based on the Handover Request message.

4. The target RAN node according to claim 1, wherein the radio resource configuration information is created based on at least one of the flow list information and the slice information.

5. A source radio access network (RAN) node connected to a Fifth Generation Core (5G Core) network, the source RAN comprising:
   at least one memory; and
   at least one processor coupled to the at least one memory and configured to:
      transmit a Handover Request message on an interface between a target RAN node and the source RAN node to the target RAN node, the target RAN node being connected to the 5G Core network;
      receive from the target RAN node, on the interface between the target RAN node and the source RAN node, a Handover Request Acknowledge message including a transparent container that contains radio resource configuration information; and
      transmit the radio resource configuration information to a radio terminal,
   wherein the Handover Request message contains slice information and flow list information indicating at least one flow to be setup,
   wherein the slice information identifies a network slice, the network slice being a logical network,
   wherein the at least one flow indicated in the flow list information is configured within a PDU session, and
   wherein the flow list information includes:
      a flow identifier identifying a flow within the PDU session; and
      a flow QoS parameter corresponding to the flow identified by the flow identifier.

6. The source RAN node according to claim 5, wherein the source RAN node and the target RAN node are 5G base stations.

7. The source RAN node according to claim 5, wherein the radio resource configuration information is created based on the Handover Request message.

8. The source RAN node according to claim 5, wherein the radio resource configuration information is created based on at least one of the flow list information and the slice information.

9. A method of a target radio access network (RAN) node connected to a Fifth Generation Core (5G Core) network, the method comprising:
   receiving a Handover Request message on an interface between the target RAN node and a source RAN node from the source RAN node connected to the 5G Core network; and
   transmitting to the source RAN node a Handover Request Acknowledge message including a transparent container that contains radio resource configuration information which is transferred to a radio terminal via the source RAN node,
   wherein the Handover Request message contains slice information and flow list information indicating at least one flow to be setup,
   wherein the slice information identifies a network slice, the network slice being a logical network,
   wherein the at least one flow indicated in the flow list information is configured within a PDU session, and
   wherein the flow list information includes:
      a flow identifier identifying a flow within the PDU session; and
      a flow QoS parameter corresponding to the flow identified by the flow identifier.

10. The method according to claim 9, wherein the source RAN node and the target RAN node are 5G base stations.

11. The method according to claim 9, wherein the radio resource configuration information is created based on the Handover Request message.

12. The method according to claim 9, wherein the radio resource configuration information is created based on at least one of the flow list information and the slice information.

13. A method of a source radio access network (RAN) node connected to a Fifth Generation Core (5G Core) network, the method comprising:
   transmitting a Handover Request message on an interface between a target RAN node and the source RAN node to the target RAN node, the target RAN node being connected to the 5G Core network;
   receiving from the target RAN node, on the interface between the target RAN node and the source RAN node, a Handover Request Acknowledge message including a transparent container that contains radio resource configuration information; and
   transmitting the radio resource configuration information to the radio terminal,
   wherein the Handover Request message contains slice information and flow list information indicating at least one flow to be setup,
   wherein the slice information identifies a network slice, the network slice being a logical network,
   wherein the at least one flow indicated in the flow list information is configured within a PDU session, and wherein the flow list information includes:
- a flow identifier identifying a flow within the PDU session; and
- a flow QoS parameter corresponding to the flow identified by the flow identifier.

14. The method according to claim 13, wherein
the source RAN node and the target RAN node are 5G base stations.

15. The method according to claim 13, wherein the radio resource configuration information is created based on the Handover Request message.

16. The method according to claim 13, wherein the radio resource configuration information is created based on at least one of the flow list information and the slice information.

* * * * *